(12) United States Patent
Takahashi

(10) Patent No.: US 10,704,899 B2
(45) Date of Patent: Jul. 7, 2020

(54) SHAPE MEASURING DEVICE AND SHAPE MEASURING METHOD

(71) Applicant: Keyence Corporation, Osaka (JP)

(72) Inventor: Shinya Takahashi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/355,884

(22) Filed: Mar. 18, 2019

(65) Prior Publication Data

US 2019/0323830 A1 Oct. 24, 2019

(30) Foreign Application Priority Data

Apr. 20, 2018 (JP) .................................. 2018-081915
Jul. 17, 2018 (JP) .................................. 2018-134224

(51) Int. Cl.
*G01B 11/25* (2006.01)
*G06T 7/529* (2017.01)

(52) U.S. Cl.
CPC .......... *G01B 11/2513* (2013.01); *G06T 7/529* (2017.01)

(58) Field of Classification Search
CPC . G01B 11/2513; G01B 11/25; G01B 11/2545; G06T 7/529
USPC ...................................................... 356/610
See application file for complete search history.

(56) References Cited

U.S. PATENT DOCUMENTS 8,743,374 B2 * 6/2014 Nakatsukasa .......... G01B 11/25
356/603
8,885,176 B2 * 11/2014 Tabuchi ................. G01B 11/24
356/601
9,151,600 B2 * 10/2015 Nakatsukasa .......... G01B 11/25
9,291,450 B2 3/2016 Takahashi
9,404,739 B2 * 8/2016 Nakatsukasa .......... G01B 11/24
9,959,451 B2 * 5/2018 Suenaga ............ G06K 9/00208
(Continued)

FOREIGN PATENT DOCUMENTS

JP 2014109492 A 6/2014

OTHER PUBLICATIONS

U.S. Appl. No. 16/355,876, filed Mar. 18, 2019 (240 pages).
U.S. Appl. No. 16/355,877, filed Mar. 18, 2019 (254 pages).
U.S. Appl. No. 16/355,879, filed Mar. 18, 2019 (254 pages).

*Primary Examiner* — Roy M Punnoose
(74) *Attorney, Agent, or Firm* — Kilyk & Bowersox, P.L.L.C.

(57) ABSTRACT

A shape measuring device includes a stereoscopic-shape-data generating section 212 configured to generate stereoscopic shape data indicating a shape of the measurement object with a pattern projection method, a measurement-setting automatically adjusting section 217 configured to automatically adjust measurement setting for the partial regions on the basis of at least one of stereoscopic shape data of the partial regions and light reception data acquired in the partial regions when the stereoscopic shape data is generated, and a stereoscopic-shape-data coupling section 219 configured to couple, according to the measurement setting for the partial regions adjusted by a measurement setting adjusting section, the stereoscopic shape data of the partial regions generated again by the stereoscopic-shape-data generating section 212 and generate coupled stereoscopic shape data corresponding to the coupled region.

20 Claims, 61 Drawing Sheets

(56) References Cited

U.S. PATENT DOCUMENTS

| | | | |
|---|---|---|---|
| 2014/0071459 A1* | 3/2014 | Nakatsukasa | G01B 11/25 356/611 |
| 2015/0153161 A1* | 6/2015 | Ohta | G01B 11/25 356/601 |
| 2017/0032177 A1* | 2/2017 | Suenaga | G06K 9/00208 |
| 2019/0323829 A1* | 10/2019 | Suenaga | G01B 11/2513 |

* cited by examiner

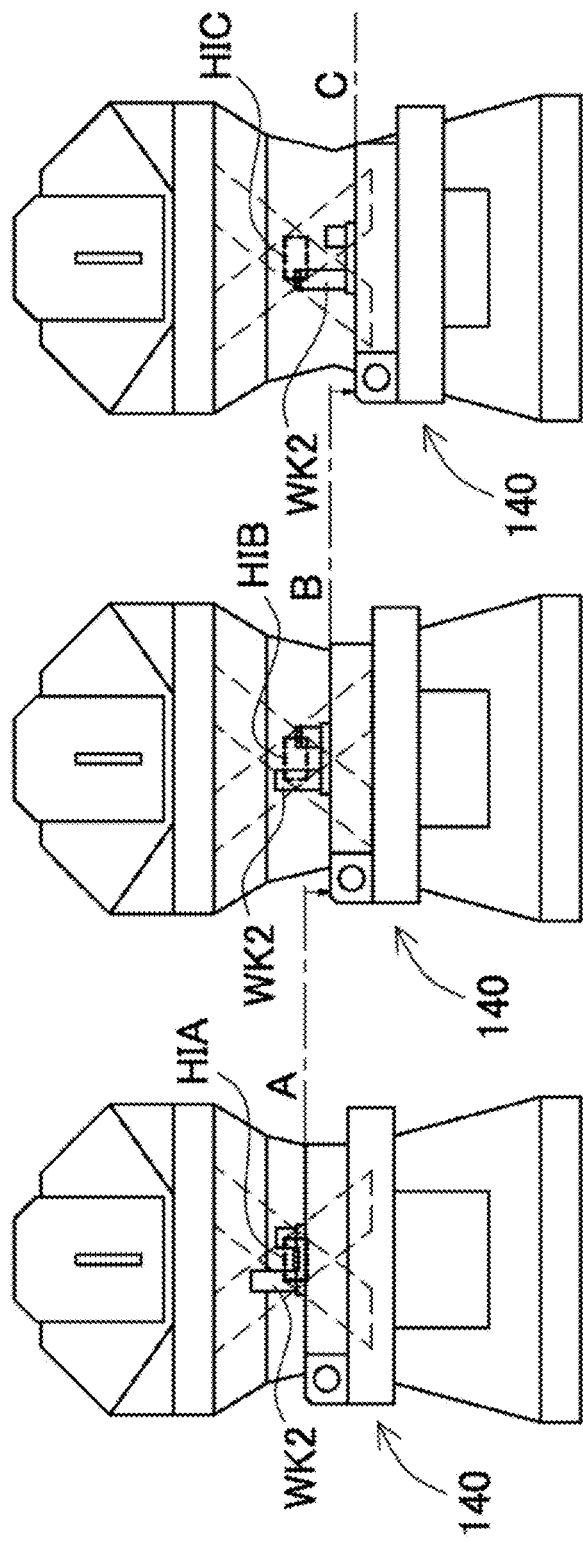

FIG. 14A  FIG. 14B  FIG. 14C
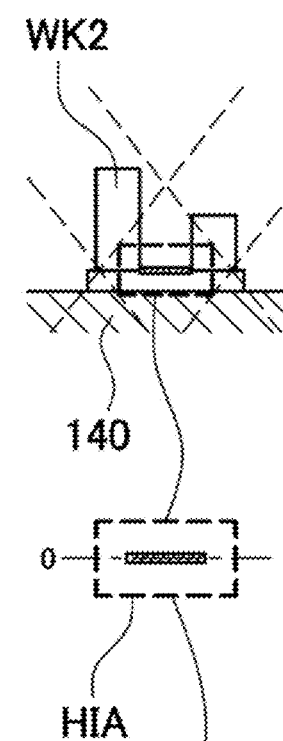
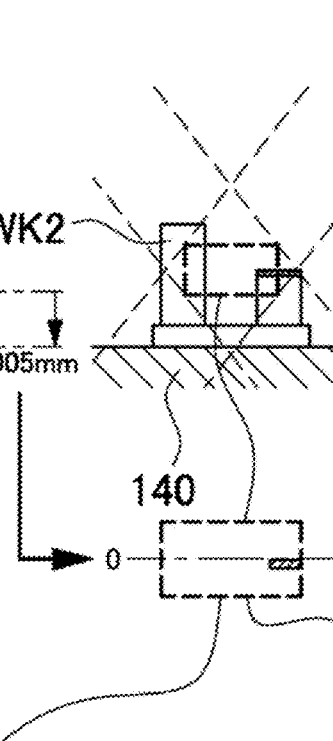
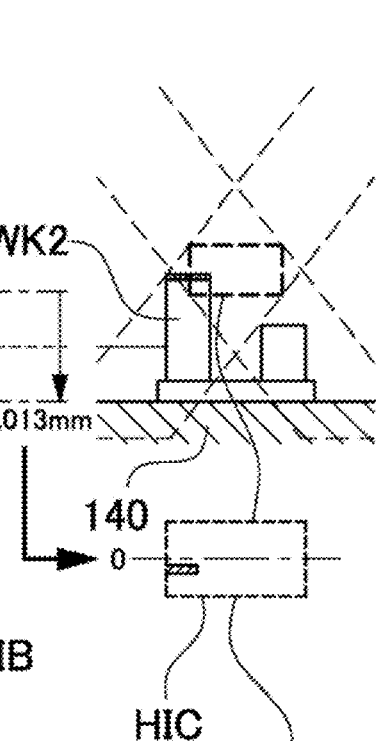
FIG. 14D
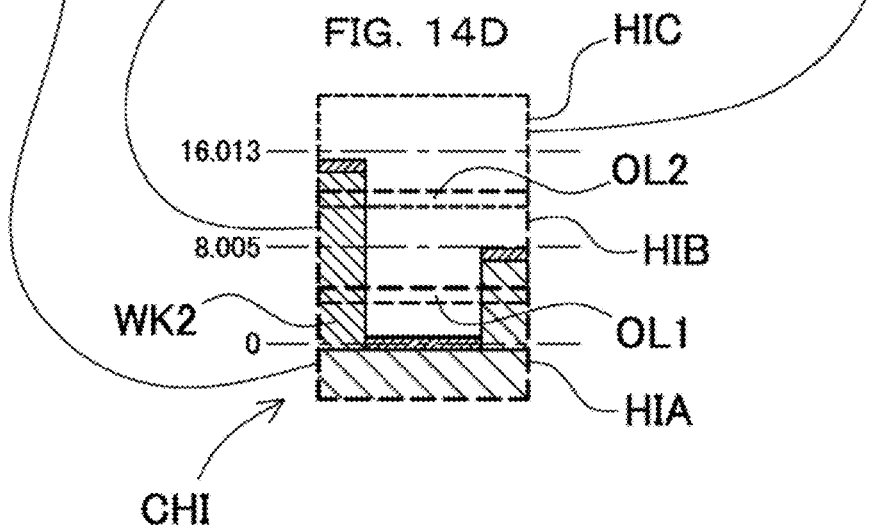

FIG. 15A
FIG. 15B
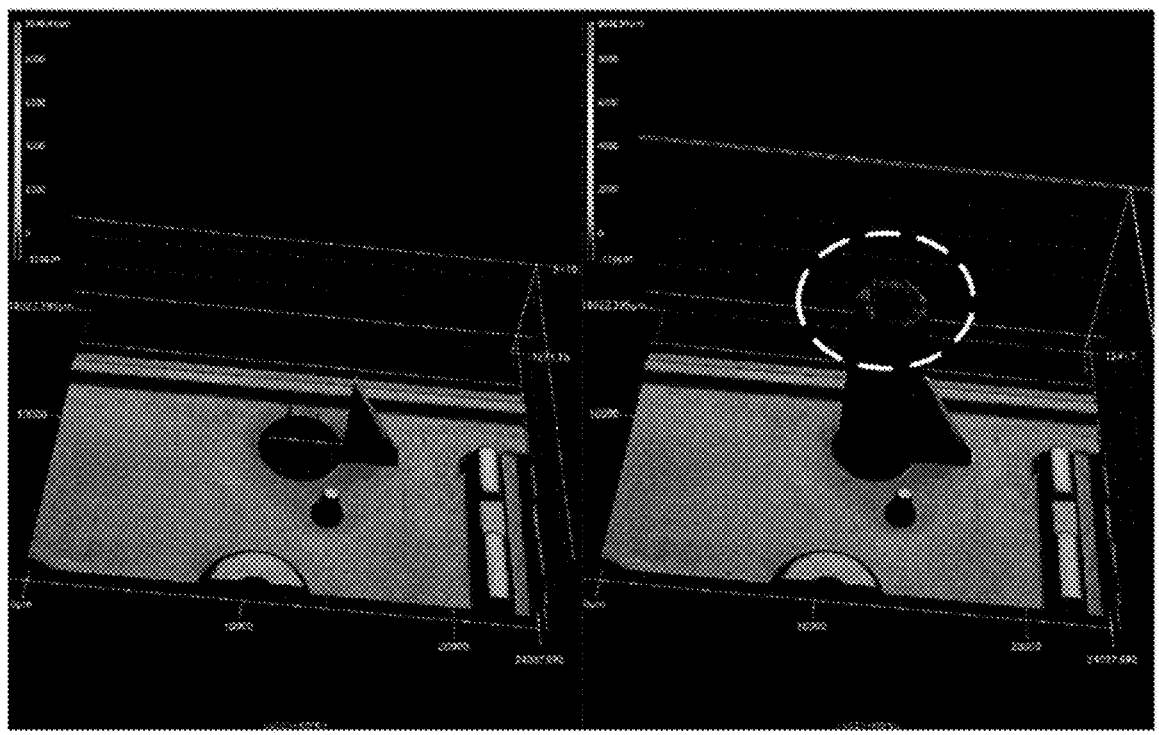
FIG. 16A
FIG. 16B
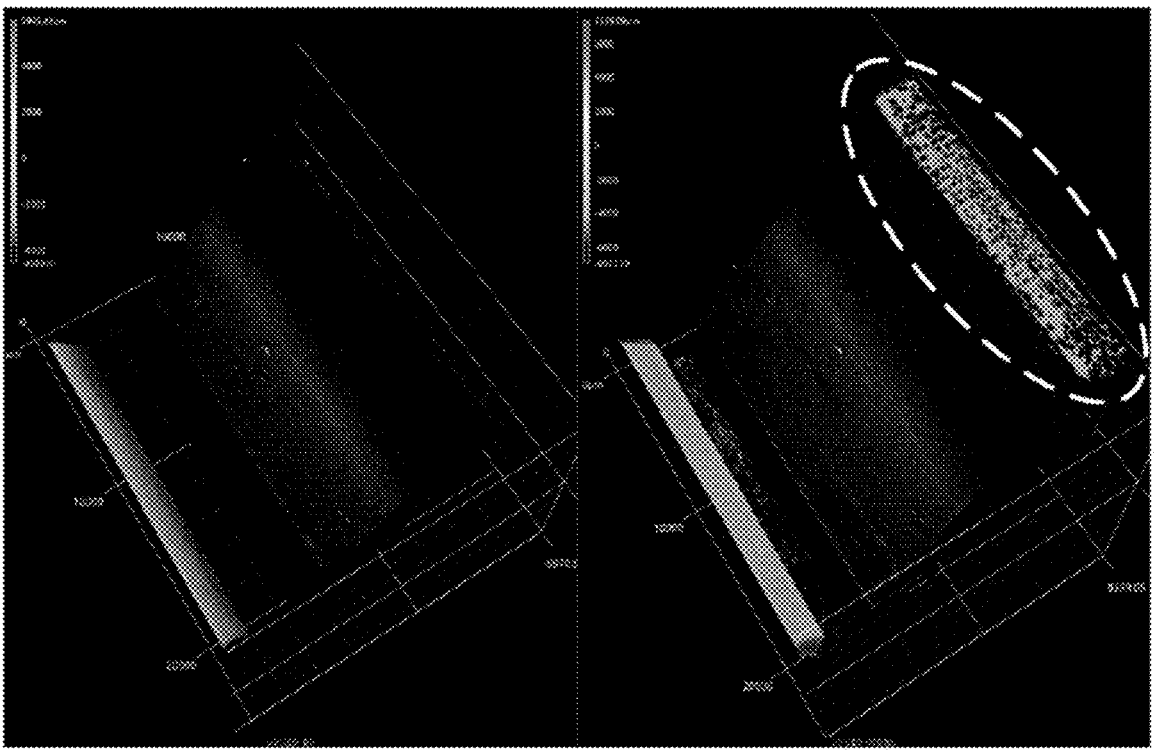

IG1

IG1+IG2

IG1+IG2+IG3

IG1+IG2+IG3+IG4

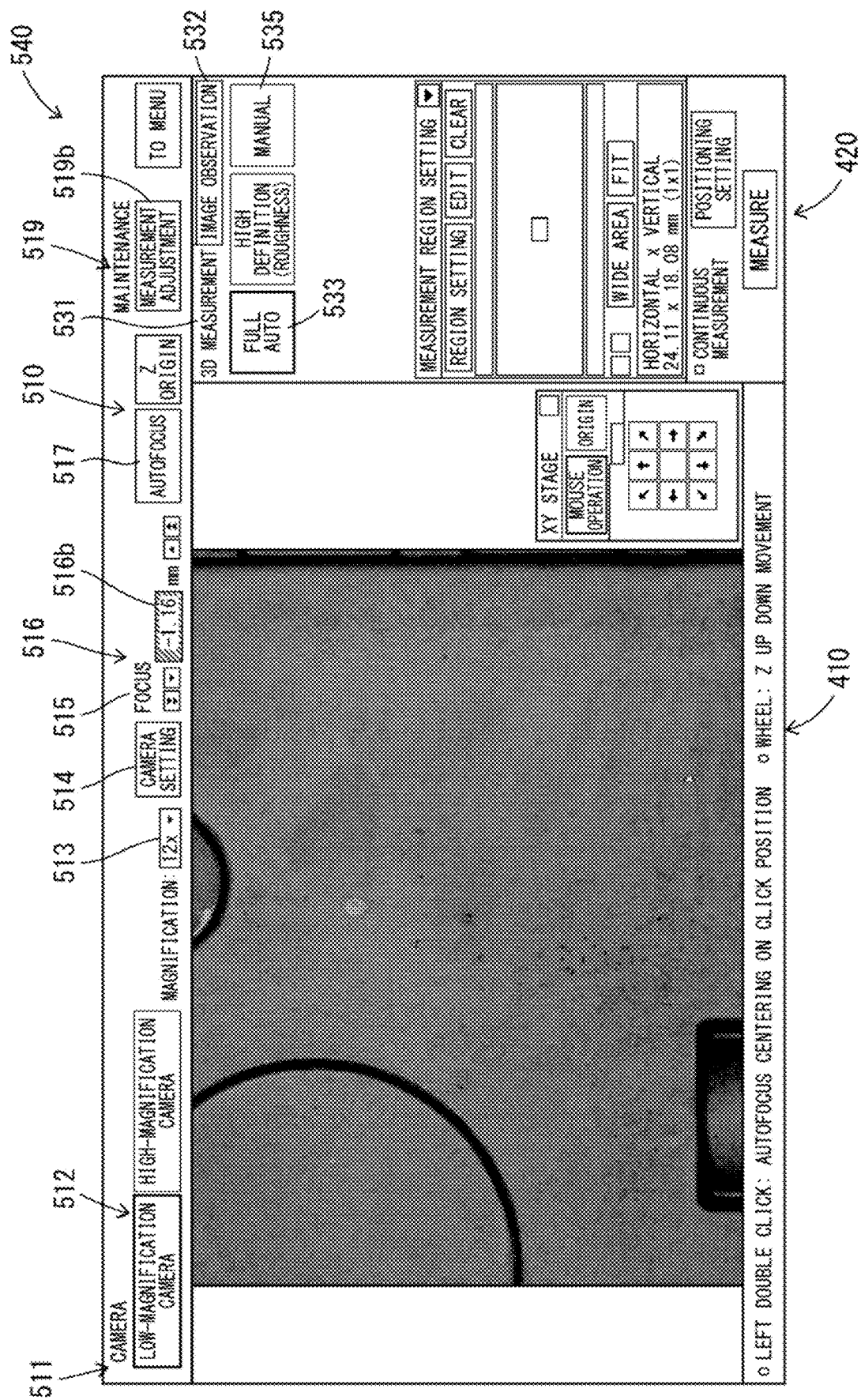

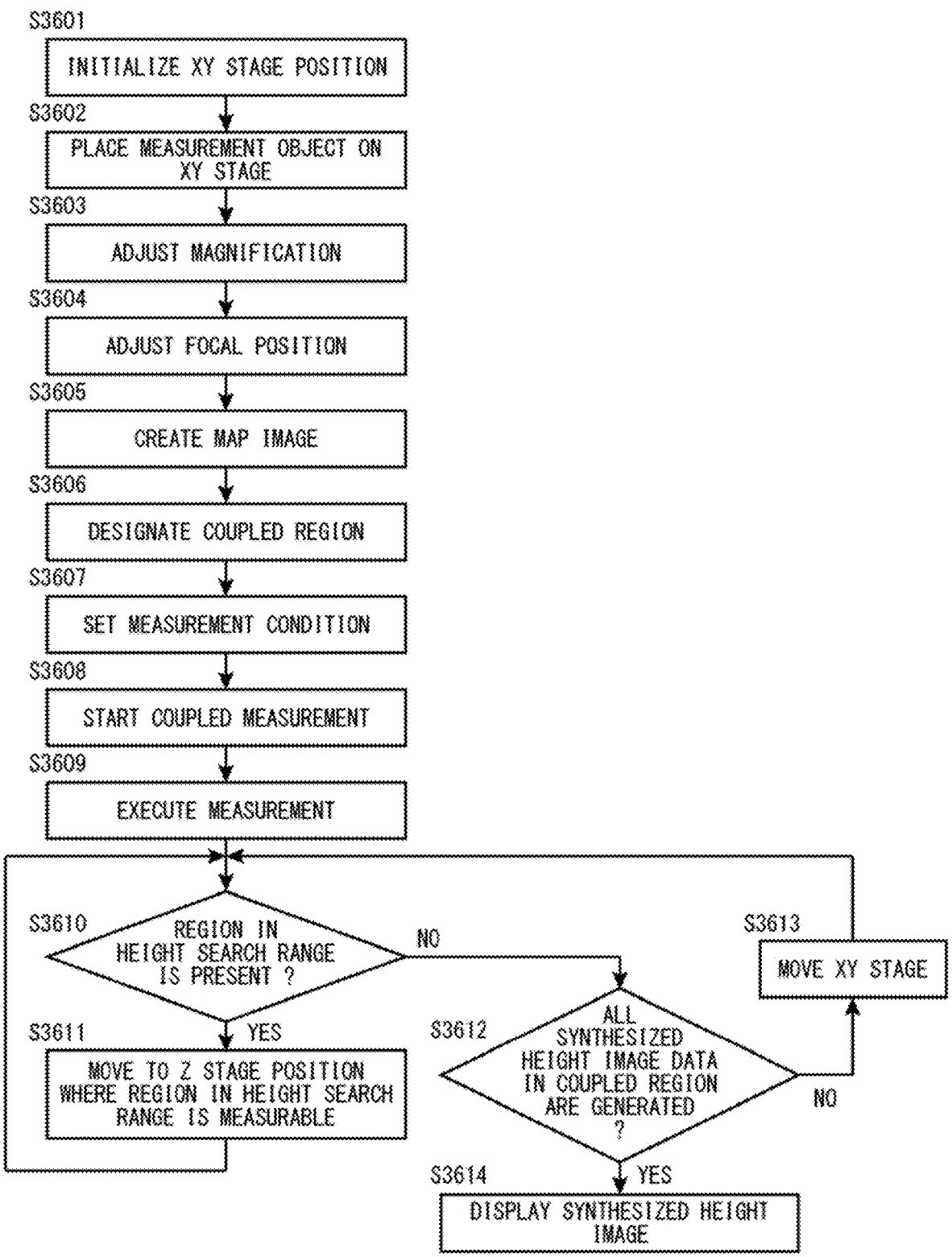

|  | A | B | C | D |
|---|---|---|---|---|
| MEASUREMENT MODE | NORMAL | Fine | NORMAL | NORMAL |
| EXPOSURE LEVEL | 1 | 3 | 3 | 10 |
| Z-MEASUREMENT RANGE | Z0 | Z0 | Z0 | Z0+Z2 |
| LEFT AND RIGHT LIGHT PROJECTION | ON | ON | ON | ON |

SHAPE MEASURING DEVICE AND SHAPE MEASURING METHOD

CROSS-REFERENCE TO RELATED APPLICATIONS

The present application claims foreign priority based on Japanese Patent Application No. 2018-081915, filed Apr. 20, 2018 and No. 2018-134224, filed Jul. 17, 2018, the contents of which is incorporated herein by reference.

BACKGROUND OF THE INVENTION

1. Field of the Invention

The present invention relates to a shape measuring device and a shape measuring method.

2. Description of Related Art

In a two-dimensional or three-dimensional shape measuring device that measures a shape of a measurement object, there is known coupling processing for varying positions in an XY direction of an imaging section and a stage to acquire a plurality of stereoscopic shape data and coupling the plurality of stereoscopic shape data to thereby acquire high-resolution stereoscopic shape data over a wide visual field. In order to perform such coupling processing, first, a user designates, using a wide area image, regions that the user desires to couple. Subsequently, the shape measuring device divides the designated region into a plurality of divided areas, measures the divided areas in order, and couples an acquired plurality of stereoscopic shape data. In such coupling processing, it is necessary to perform measurement setting for performing measurement (see, for example, JP-A-2014-109492 (Patent Literature 1)).

In such coupling processing, when the measurement object includes a portion formed by a different material, the user sometimes desires to perform measurement in different measurement setting for each of the divided areas.

Therefore, a measurement microscope device disclosed in Patent Literature 1 displays stereoscopic shape data after measurement to the user. When the user desires to perform the measurement of the divided area again, the user can change the measurement setting and executes the measurement again. When a desired measurement result is obtained, the user can replace new obtained measurement data as measurement data of the divided area.

However, with this method, the user has to determine whether remeasurement is necessary while confirming a measurement result. Further, the user has to examine how the measurement setting should be changed to obtain the desired measurement result.

SUMMARY OF THE INVENTION

An object of the present invention is to provide a shape measuring device, a shape measuring method, and a shape measuring program and a computer-readable recording medium capable of automatically determining and appropriately performing coupling processing.

In order to achieve the above object, a shape measuring device according to a first aspect of the present invention includes: a stage on which a measurement object is placed; a light projecting section configured to irradiate pattern light on the measurement object placed on the stage; a light receiving section configured to receive the pattern light irradiated from the light projecting section and reflected from the measurement object and output light reception data; an optical-axis-direction driving section configured to relatively move the stage in an optical axis direction with respect to the light receiving section to thereby adjust a focal position of the light receiving section; a stage-plane-direction driving section configured to relatively move the stage in a stage plane direction orthogonal to an optical axis direction of the light receiving section; a measurement setting section for setting measurement setting including light projection setting for the pattern light of the light projecting section and light reception setting of the light receiving section; a coupled-region setting section configured to set, as a region where a relative position of the stage in the stage plane direction is moved by the stage-plane-direction driving section, a coupled region formed by a plurality of partial regions; and a control section configured to execute: stereoscopic-shape-data generation processing for generating, in the partial regions set by the coupled-region setting section, according to the measurement setting set by the measurement setting section, on the basis of the light reception data output by the light receiving section, stereoscopic shape data indicating a shape of the measurement object with a pattern projection method; measurement-setting adjustment processing for automatically adjusting the measurement setting for the partial regions on the basis of at least one of stereoscopic shape data of the partial regions and the light reception data acquired in the partial regions when the stereoscopic shape data is generated; and stereoscopic-shape-data coupling processing for coupling, according to the measurement setting for the partial regions adjusted by the measurement-setting adjustment processing, the stereoscopic shape data of the partial regions generated again by the stereoscopic-shape-data generation processing and generating coupled stereoscopic shape data corresponding to the coupled region. With the configuration explained above, it is possible to change the measurement section for each of the partial regions and generate stereoscopic shape data. In addition, it is possible to cause the shape measuring device to automatically perform the adjustment of the measurement setting for each of the regions. It is possible to perform convenient shape measurement.

According to a second aspect of the present invention, in the shape measuring device, in addition to the configuration explained above, the control section may include, as the measurement setting for the partial regions, a measurement mode in generating the stereoscopic shape data of the measurement object in the stereoscopic-shape-data generation processing, illumination intensity of the light projecting section, an exposure time of the light receiving section, and adjustment of the focal position of the light receiving section.

Further, according to a third aspect of the present invention, in the shape measuring device, in addition to one of the configurations explained above, when detecting at least one of sneaking and multiple reflection of the pattern light from missing data included in the stereoscopic shape data or the light reception data, the control section may select a measurement mode corresponding to the pattern light sneaking or multiple reflection to make it possible to adjust the measurement setting for the partial regions. With the configuration explained above, it is possible to distinguish light sneaking or a void and automatically adjust the measurement setting for the partial regions.

Furthermore, according to a fourth aspect of the present invention, in the shape measurement device, in addition to any one of the configurations explained above, on the basis of presence or absence of a signal component in a change of a luminance value of a pixel forming the light reception data, the control section may determine that the sneaking of the pattern light occurs when a fixed signal component is confirmed and determine that a void is present when the fixed signal component is not confirmed, detect one of sneaking and multiple reflection of light on the basis of a result of the determination, and select a measurement mode corresponding to the sneaking or the multiple reflection of the light to make it possible to adjust the measurement setting for the partial regions. With the configuration explained above, it is possible to distinguish the light sneaking or the void on the basis of a change in a luminance value and automatically adjust the measurement setting for the partial regions.

Furthermore, according to a fifth aspect, in the shape measuring device, in addition to any one of the configurations explained above, the control section may perform adjustment of an exposure time on the basis of the light reception data to make it possible to adjust the measurement setting for the partial regions.

Furthermore, according to a sixth aspect of the present invention, in the shape measuring device, in addition to any one of the configurations explained above, the control section may shift the focal position on the basis of at least one of the light reception data and the stereoscopic shape data to make it possible to adjust the measurement setting for the partial regions.

Furthermore, according to a seventh aspect of the present invention, in the shape measuring device, in addition to any one of the configurations explained above, the control section may expand a depth measurement range, which is a height range in which the pattern light can be irradiated from the light projecting section, to make it possible to adjust the measurement setting for the partial regions.

Furthermore, according to an eighth aspect of the present invention, in the shape measuring device, in addition to any one of the configurations explained above, the light projecting section may include: a first light projecting section configured to irradiate, from a first direction, first pattern light on the measurement object placed on the stage; and a second light projecting section configured to irradiate, from a second direction, second pattern light on the measurement object placed on the stage. The light receiving section may receive the first pattern light irradiated from the first light projecting section and reflected from the measurement object and output first light reception data and receive the second pattern light irradiated from the second light projecting section and reflected from the measurement object and output second light reception data. The stereoscopic-shape-data generating processing may generate first direction stereoscopic shape data of the measurement object on the basis of the first light reception data received by the light receiving section and generate second direction stereoscopic shape data of the measurement object on the basis of the second light reception data received by the light receiving section. The control section may select one or both of the first light projecting section and the second light projecting section on the basis of the light reception data to make it possible to adjust the measurement setting for the partial regions. With the configuration explained above, an effect of reducing a time required for measurement during continuous measurement can be expected.

Furthermore, according to a ninth aspect of the present invention, in the shape measuring device, in addition to any one of the configurations explained above, the shape measuring device may further include a measurement-setting saving section for saving the measurement setting for the partial regions adjusted by the control section. The control section may couple, according to the measurement setting for the partial regions saved in the measurement-setting saving section, the stereoscopic shape data of the partial regions generated again by the stereoscopic-shape-data generation processing and generate the coupled stereoscopic shape data corresponding to the coupled region.

Furthermore, a shape measuring device according to a tenth aspect of the present invention includes: a stage on which a measurement object is placed; a light projecting section configured to irradiate pattern light on the measurement object placed on the stage; a light receiving section configured to receive the pattern light irradiated from the light projecting section and reflected from the measurement object and output light reception data; an optical-axis-direction driving section configured to relatively move the stage in an optical axis direction with respect to the light receiving section to thereby adjust a focal position of the light receiving section; a stage-plane-direction driving section configured to relatively move the stage in a stage plane direction orthogonal to an optical axis direction of the light receiving section; a coupled-region setting section configured to set, as a region where a relative position of the stage in the stage plane direction is moved by the stage-plane-direction driving section, a coupled region formed by a plurality of partial regions; a stereoscopic-shape-data generating section configured to generate, in the partial regions set by the coupled-region setting section, according to the measurement setting set by the measurement setting section, on the basis of the light reception data output by the light receiving section, stereoscopic shape data indicating a shape of the measurement object with a pattern projection method; a measurement setting section for setting, as partial region measurement setting, for each of the partial regions, measurement setting including light projection setting for the pattern light of the light projecting section and light reception setting for a pattern image of the light receiving section; a measurement-setting saving section for saving, in association with the partial regions, partial region measurement setting for the partial regions set by the measurement setting section; and a stereoscopic-shape-data coupling section configured to couple, according to the measurement setting for the partial regions saved in the measurement-setting saving section, the stereoscopic shape data of the partial regions generated again by the stereoscopic-shape-data generating processing and generate coupled stereoscopic shape data corresponding to the coupled region.

Furthermore, according to an eleventh aspect of the present invention, in the shape measuring device, in addition to any one of the configurations explained above, the shape measuring device may further include a measurement-mode selecting section for selecting, as a measurement mode in generating the stereoscopic shape data of the measurement object in the stereoscopic-shape-data generation processing, any one of a normal mode, a fine mode for performing finer measurement than the normal mode, and a halation removal mode for removing halation from the light reception data.

Furthermore, according to a twelfth aspect of the present invention, in the shape measuring device, in addition to anyone of the configurations explained above, the stereoscopic-shape-data generating section may be capable of switching a normal measurement mode for changing partial region measurement setting for each of the partial regions with the control section and generating the stereoscopic shape data and a continuous measurement mode for reading out, for each of the partial regions, the partial region measurement setting saved in the measurement-setting saving section in advance and generating the stereoscopic shape data.

Furthermore, according to a thirteenth aspect of the present invention, in the shape measuring device, in addition to any one of the configurations explained above, the shape measuring device may further include a guiding section configured to output a guiding message to dispose the measurement object on the stage in a same position and a same posture as a reference posture, which is a position and a posture of the measurement object during the acquisition of the measurement setting for the partial regions saved in the measurement-setting saving section.

Furthermore, according to a fourteenth aspect of the present invention, in the shape measuring device, in addition to any one of the configurations explained above, the shape measuring device may further include a measurement-object-position-and-posture detecting section configured to detect a position and a posture of the measurement object placed on the stage. The shape measuring device may drive the stage-plane-direction driving section to adjust, on the basis of a position and a posture of the measurement object during the acquisition of the measurement setting for the partial regions saved in the measurement-setting saving section, the position and the posture of the measurement object detected by the measurement-target-position-and-posture detecting section.

Furthermore, according to a fifteenth aspect of the present invention, in the shape measuring device, in addition to any one of the configurations explained above, the shape measuring device may further include a positioning jig for matching a position and a posture of the measurement object placed on the stage with a position and a posture of the measurement object during the acquisition of the measurement setting for the partial regions saved in the measurement-setting saving section.

Furthermore, according to a sixteenth aspect of the present invention, in the shape measuring device, in addition to any one of the configurations explained above, the shape measuring device may further include a texture-image acquiring section for acquiring a texture image, which is a two-dimensional optical image, having texture information of the measurement object placed on the stage. At least a part of texture image capturing conditions in capturing a plurality of texture images with the texture-image acquiring section may be common to the partial regions. With the configuration explained above, it is possible to make it easy to perform comparison and coupling by fixing brightness and the like concerning the texture image irrespective of the partial regions while optimizing the stereoscopic shape data for each of the partial regions. It is possible to make the texture image capturing conditions suitable for measurement.

Furthermore, according to a seventeenth aspect of the present invention, in the shape measuring device, in addition to any one of the configurations explained above, as one of the texture image capturing conditions in capturing a plurality of texture images with the texture-image acquiring section, an exposure time may be common to the partial regions. As one kind of the partial region measurement setting in generating a plurality of stereoscopic shape data with the stereoscopic-shape-data generation processing, the exposure time may be adjustable by the control section. With the configuration explained above, appropriate measurement is realized by adjusting the stereoscopic shape data to brightness suitable for the shape measurement while maintaining brightness of the texture images constant to make brightness common.

Furthermore, according to an eighteenth aspect of the present invention, in the shape measuring device, in addition to any one of the configurations explained above, the optical-axis-direction driving section may independently adjust relative positions in an optical axis direction of the stage in capturing a plurality of texture images with the texture-image acquiring section and relative positions in the optical axis direction of the stage in generating a plurality of stereoscopic shape data with the stereoscopic-shape-data generation processing. With the configuration explained above, it is possible to perform imaging and measurement suitable for the texture images and the stereoscopic shape data by adjusting focal positions independently for the texture images and the stereoscopic shape data.

Furthermore, according to a nineteenth aspect of the present invention, in the shape measuring device, in addition to any one of the configurations explained above, the shape measuring device may further include: a determination processing section configured to determine, on the basis of the stereoscopic shape data acquired by the stereoscopic-shape-data generating section, according to predetermined determination conditions, whether an unmeasured region not having height information is present in the depth measurement range; a focal-position changing section configured to control the optical-axis-direction driving section to change the focal position of the light receiving section when it is determined by un-measurement determination processing by the determination processing section that the unmeasured region is present; and a synthesis processing section configured to generate a synthesized stereoscopic shape data obtained by combining a plurality of stereoscopic shape data generated by automatically repeating stereoscopic-shape-data acquisition processing by the stereoscopic-shape-data generating section, the un-measurement determination processing by the determination processing section, and focal-position changing processing by the focal-position changing section until it is determined by the un-measurement determination processing by the determination processing section that an unmeasured region is absent or a predetermined end condition is satisfied.

Furthermore, according to a twentieth aspect of the present invention, in the shape measuring device, in addition to any one of the configurations explained above, the stereoscopic shape data may be a height image including height information.

Furthermore, a shape measuring method according to a twenty-first aspect of the present invention is a shape measuring method for performing measurement of a shape of a measurement object, the shape measuring method including: dividing an image showing a measurement object placed on a stage into a plurality of partial regions and relatively moving the stage with a stage-plane-direction driving section in a stage plane direction orthogonal to an optical axis direction of a light receiving section to a first region, which is one of the plurality of divided partial regions; projecting pattern light on the measurement object from a light projecting section according to first region measurement setting, which is measurement setting including light projection setting for the pattern light of the light projecting section and light reception setting of the light receiving section in the first region, receiving the pattern light reflected from the measurement object with the light receiving section and acquiring first light reception data, and generating, on the basis of the first light reception data, with a stereoscopic-shape-data generating section, first stereoscopic shape data indicating a shape of the first region with a pattern projection method; saving the first stereoscopic shape data or the first light reception data in a storing section in association with the first region and automatically adjusting, with a measurement-setting automatically adjusting section, the first region measurement setting to optimized first region adjusted measurement setting on the basis of the first stereoscopic shape data or the first light reception data; relatively moving the stage with a stage-plane-direction driving section to a second region, which is another one of the partial regions; projecting the pattern light on the measurement object from the light projecting section according to second region measurement setting, which is measurement setting including light projection setting for the pattern light of the light projecting section and light reception setting of the light receiving section in the second region, receiving the pattern light reflected from the measurement object with the light receiving section and acquiring second light reception data, and generating, on the basis of the second light reception data, with the stereoscopic-shape-data generation processing, second stereoscopic shape data indicating a shape of the second region with the pattern projection method; saving the second stereoscopic shape data or the second light reception data in the storing section in association with the second region and automatically adjusting, with a control section, the second region measurement setting to optimized second region adjusted measurement setting on the basis of the second stereoscopic shape data or the second light reception data; and coupling, according to a positional relation among the partial regions, a plurality of stereoscopic shape data including the first stereoscopic shape data and the second stereoscopic shape data saved in the storing section and generating, with a stereoscopic-shape-data coupling section, coupled stereoscopic shape data corresponding to the coupled region. Consequently, it is possible to change measurement setting for each of the partial regions and generate stereoscopic shape data. In addition, it is possible to cause the shape measuring device to automatically perform adjustment of the measurement setting for each of the partial region. It is possible to perform convenient shape measurement.

Furthermore, according to a twenty-second aspect of the present invention, in the shape measuring method, in addition to the configuration explained above, the control section may include, as the first region adjusted measurement setting, a measurement mode in generating the stereoscopic shape data of the measurement object in the stereoscopic-shape-data generation processing on the basis of the first stereoscopic shape data or the first light reception data, illumination intensity of the light projecting section, an exposure time of the light receiving section, and adjustment of the focal position of the light receiving section.

Furthermore, according to a twenty-third aspect of the present invention, in the shape measuring method, in addition to one of the configurations explained above, the control section may automatically adjust, as one kind of the first region measurement setting, an exposure time of the light receiving section on the basis of the first light reception data.

Furthermore, according to a twenty-fourth aspect of the present invention, in the shape measuring method, in addition to any one of the configurations explained above, the control section may automatically adjust, as one kind of the first region adjusted measurement setting, on the basis of missing data included in the first stereoscopic shape data or the first light reception data, the first region measurement setting to reduce occurrence of the missing data.

Furthermore, according to a twenty-fifth aspect of the present invention, in the shape measuring method, in addition to anyone of the configurations explained above, when detecting at least one of sneaking and multiple reflection of the pattern light on the basis of missing data included in the first stereoscopic shape data or the first light reception data, the control section may automatically select, as one kind of the first region adjusted measurement setting, a measurement mode corresponding to the pattern light sneaking or multiple reflection.

Furthermore, according to a twenty-sixth aspect of the present invention, in the shape measuring method, in addition to any one of the configurations explained above, the shape measuring method may further include saving, in a measurement-setting saving section, the first region measurement setting and second region measurement setting automatically adjusted for each of the partial regions by the control section. Consequently, by saving the automatically adjusted region measurement setting, it is possible to reuse the region measurement setting when the same measurement object is measured.

Furthermore, according to a twenty-seventh aspect of the present invention, in the shape measuring method, in addition to any one of the configurations explained above, the shape measuring method may further include guiding, when a different measurement object is placed on the stage, the different measurement object to be in a same position and a same posture as a reference posture, which is a position and a posture of the measurement object in saved partial region measurement setting. Consequently, when the same measurement object is measured, by measuring the measurement object in the saved region measurement setting, it is possible to make it unnecessary to perform work for automatically adjusting region setting conditions again.

Furthermore, according to a twenty-eighth aspect of the present invention, in the shape measuring method, in addition to any one of the configurations explained above, the shape measuring device may further include: projecting, according to the first region adjusted measurement setting, the pattern light from the light projecting section on the different measurement object placed in the guided position and posture on the stage, receiving the pattern light reflected on the different measurement object with the light receiving section and acquiring first adjusted light reception data, and generating, on the basis of the first adjusted light reception data, in the stereoscopic-shape-data generation processing, first adjusted stereoscopic shape data indicating a shape of the first region with the pattern projection method; saving the first adjusted stereoscopic shape data or the first adjusted light reception data in a storing section in association with the first region; relatively moving the stage to the second region with the stage-plane-direction driving section; projecting the pattern light on the different measurement object from the light projecting according to the second region adjusted measurement setting, receiving the pattern light reflected on the different measurement object with the light receiving section and acquiring second light reception adjusted data, generating, on the basis of the second adjusted light reception data, with the stereoscopic-shape-data generation processing, second adjusted stereoscopic shape data indicating a shape of the second region with the pattern projection method; saving the second stereoscopic shape data or the second light reception data in a storing section in association with the second region; and coupling, according to a positional relation among the partial regions, a plurality of adjusted stereoscopic shape data including the first adjusted stereoscopic shape data and the second adjusted stereoscopic shape data saved in the storing section and generating adjusted coupled stereoscopic shape data corresponding to the coupled region with a stereoscopic-shape-data coupling section. Consequently, when measurement is performed on a different measurement object having the same shape, by reading out and using the saved adjusted region adjusted measurement setting, it is possible to perform the measurement while omitting work for adjusting the partial region measurement setting for each of the partial regions. Therefore, there is an advantage that simplified and quick measurement processing can be performed.

Furthermore, according to a twenty-ninth aspect of the present invention, in the shape measuring method, in addition to any one of the configurations explained above, the shape measuring method may further include determining whether left and right light projection is performed following a depth measurement range search in a Z direction.

Furthermore, a shape measuring program according to a thirtieth aspect of the present invention causes a computer to realize: a function of dividing an image showing a measurement object placed on a stage into a plurality of partial regions and relatively moving the stage with a stage-plane-direction driving section in a stage plane direction orthogonal to an optical axis direction of a light receiving section to a first region, which is one of the plurality of divided partial regions; a function of projecting pattern light on the measurement object from a light projecting section according to first region measurement setting, which is measurement setting including light projection setting for the pattern light of the light projecting section and light reception setting of the light receiving section in the first region, receiving the pattern light reflected from the measurement object with the light receiving section and acquiring first light reception data, and generating, on the basis of the first light reception data, with a stereoscopic-shape-data generating section, first stereoscopic shape data indicating a shape of the first region with a pattern projection method; a function of saving the first stereoscopic shape data or the first light reception data in a storing section in association with the first region and automatically adjusting, with a measurement-setting automatically adjusting section, the first region measurement setting to optimized first region adjusted measurement setting on the basis of the first stereoscopic shape data or the first light reception data; a function of relatively moving the stage with a stage-plane-direction driving section to a second region, which is another one of the partial regions; a function of projecting the pattern light on the measurement object from the light projecting section according to second region measurement setting, which is measurement setting including light projection setting for the pattern light of the light projecting section and light reception setting of the light receiving section in the second region, receiving the pattern light reflected from the measurement object with the light receiving section and acquiring second light reception data, and generating, on the basis of the second light reception data, with the stereoscopic-shape-data generation processing, second stereoscopic shape data indicating a shape of the second region with the pattern projection method; a function of saving the second stereoscopic shape data or the second light reception data in the storing section in association with the second region and automatically adjusting, with a control section, the second region measurement setting to optimized second region adjusted measurement setting on the basis of the second stereoscopic shape data or the second light reception data; and a function of coupling, according to a positional relation among the partial regions, a plurality of stereoscopic shape data including the first stereoscopic shape data and the second stereoscopic shape data saved in the storing section and generating, with a stereoscopic-shape-data coupling section, coupled stereoscopic shape data corresponding to the coupled region. With the configuration explained above, it is possible to change measurement setting for each of the partial regions and generate stereoscopic shape data. In addition, it is possible to cause the shape measuring device to automatically perform adjustment of the measurement setting for each of the partial region. It is possible to perform convenient shape measurement.

A computer-readable recording medium or a device having a shape measuring program recorded therein according to a thirty-first aspect of the present invention stores the shape measuring program. The recording medium includes a CD-ROM, a CD-R, a CD-RW, a flexible disk, a magnetic tape, magnetic disks such as an MO, a DVD-ROM, a DVD-RAM, a DVD-R, a DVD+R, a DVD-RW, a DVD+RW, a Blu-ray (registered trademark), and an HD DVD (AOD), an optical disk, a magneto-optical disk, a semiconductor memory, and other media capable of storing computer programs. The computer programs include, besides computer programs stored in the recording medium and distributed, computer programs distributed by download through a network line such as the Internet. The recording medium includes a device capable of recording the computer programs, for example, a general-purpose or dedicated device in which the computer programs are implemented in an executable state in a form of software, firmware, or the like. Processing and functions included in the computer program may be executed by program software executable in a computer. Processing of sections may be realized in a form in which hardware such as a predetermined gate array (an FPGA, an ASIC, or a DSP) or program software and a partial hardware module that realizes a part of elements of the hardware are mixed.

BRIEF DESCRIPTION OF THE DRAWINGS

FIG. 12A is a schematic diagram showing a measurement range at height A;

FIG. 12B is a schematic diagram showing a measurement range at height B;

FIG. 12C is a schematic diagram showing a measurement range at height C;

FIG. 14A is a schematic diagram showing a measurement result obtained at the height A of FIG. 12A;

FIG. 14B is a schematic diagram showing a measurement result obtained at the height B of FIG. 12B;

FIG. 14C is a schematic diagram showing a measurement result obtained at the height C of FIG. 12C;

FIG. 14D is a schematic diagram showing a state in which the measurement results are coupled;

FIG. 15A is an image diagram of a synthesized image in which data in a depth search range is not displayed;

FIG. 15B is an image diagram of a synthesized image in which the data in the depth search range is displayed;

FIG. 16A is an image diagram of a synthesized image in which data in the depth search range of another measurement object is not displayed;

FIG. 16B is an image diagram of a synthesized image in which the data in the depth search range is displayed;

FIG. 25 is an image diagram showing a user interface screen of a full auto mode of a shape measuring program;

FIG. 36 is a flowchart showing a procedure of automatic image XY coupling processing;

DESCRIPTION OF EMBODIMENTS

Figure 1:
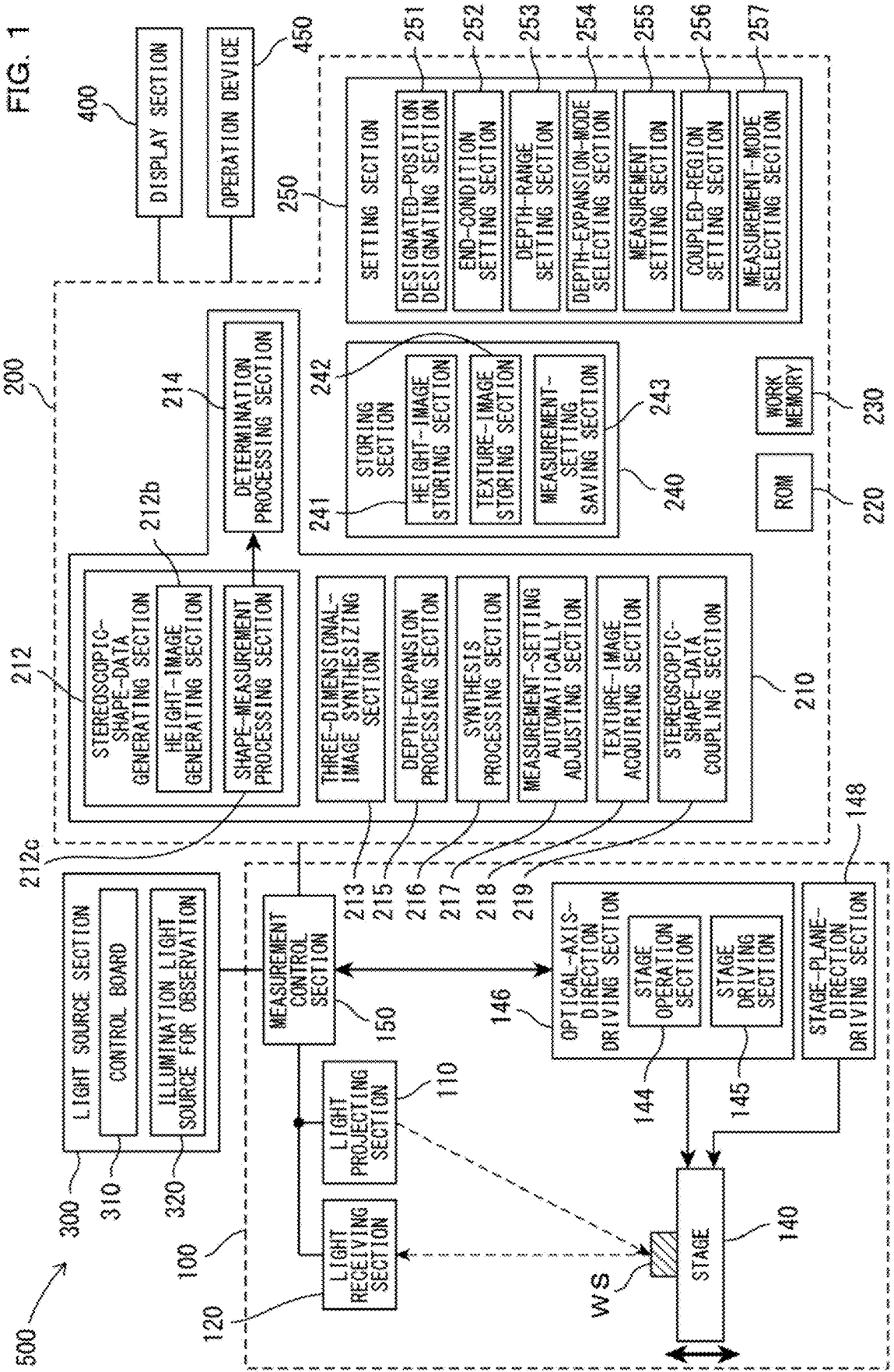
FIG. 1 is a block diagram showing a measurement microscope device according to a first embodiment of the present invention.

Embodiments of the present invention are explained below with reference to the drawings. However, the embodiments explained below are illustrations of a shape measuring device, a shape measuring method, a shape measuring program, and a computer-readable recording medium for embodying the technical idea of the present invention. The present invention does not limit the shape measuring device, the shape measuring method, the shape measuring program, and the computer-readable recording medium to those explained below. This specification does not limit members described in the claims to members described in the embodiments. In particular, dimensions, materials, shapes, relative disposition, and the like of components described in the embodiments are not meant to limit the scope of the present invention to only the dimensions, the materials, the shapes, the relative disposition, and the like unless particularly specifically described otherwise and are mere explanation examples. Sizes, positional relations, and the like of members shown in the drawings are sometimes exaggerated in order to clarify explanation. Further, in the following explanation, the same names and the same signs indicate the same or homogenous members. Detailed explanation of the members is omitted as appropriate. Further, as elements configuring the present invention, a plurality of elements may be configured by the same member and one member may be used as the plurality of elements. Conversely, a function of one member may be shared and realized by a plurality of members.

In this specification, a "texture image" is an observation image having texture information represented by an optical image. On the other hand, a "height image" is an image called a distance image or the like as well and is used in a meaning of an image including height information. Examples of the "height image" include an image displayed as a two-dimensional image by converting the height information into luminance, chromaticity, and the like and an image displayed in a three-dimensional shape by converting the height information into Z coordinate information. A three-dimensional synthesized image obtained by sticking the texture image to such a height image as texture information is also included in the height image. In this specification, a display form of the height image is not limited to two-dimensional display and includes three-dimensional display. Examples of the display form include display of a two-dimensional image obtained by converting the height information of the height image into luminance and the like and three-dimensional display of the height information as the Z coordinate information.

Further, in this specification, a "posture" for placing a measurement object on a stage means a rotation angle of the measurement object. When the measurement object has a point-symmetrical shape in a plan view like a cone, the same result is obtained irrespective of a rotation angle. Therefore, it is unnecessary to specify the posture.

In the embodiments explained below, an example is explained in which a measurement method based on triangulation for, in order to acquire height information of a measurement object, irradiating structured illumination on the measurement object and using a stripe projection image obtained from reflected light reflected on the surface of the measurement object. However, the present invention does not limit a principle and a configuration for acquiring the height information of the measurement object to the measurement method. It is also possible to apply other methods, for example, a triangulation system in which a line laser is used instead of the stripe projection and a slice stack system that makes use of a confocal/interference principle.

First Embodiment

A block diagram showing the configuration of a shape measuring device according to a first embodiment of the present invention is shown in FIG. 1. A shape measuring device 500 includes, as shown in FIG. 1, an imaging section 100, a control section 200, a light source section 300, a display section 400, and an operation device 450. This configuration is an example. Members and functional blocks included in the members can be integrated or divided as appropriate. For example, the light source section may be included in the control section. The control section may be divided into a controller and a general-purpose computer.

Imaging Section 100

The imaging section 100 includes a light projecting section 110, a light receiving section 120, a measurement control section 150, a stage 140, an optical-axis-direction driving section 146, and a stage-plane-direction driving section 148. The light projecting section 110 is a member for irradiating pattern light on a measurement object WK placed on the stage 140. The light receiving section 120 receives the pattern light irradiated from the light projecting section 110 and reflected on the measurement object WK and outputs light reception data. The measurement control section 150 is a member for driving the light projection of the light projecting section 110 and the light reception of the light receiving section 120 and outputting the light reception data of the light receiving section 120. The imaging section 100 measures a shape of the measurement object WK on the basis of a pattern projection method.

Second Embodiment

Figure 2:
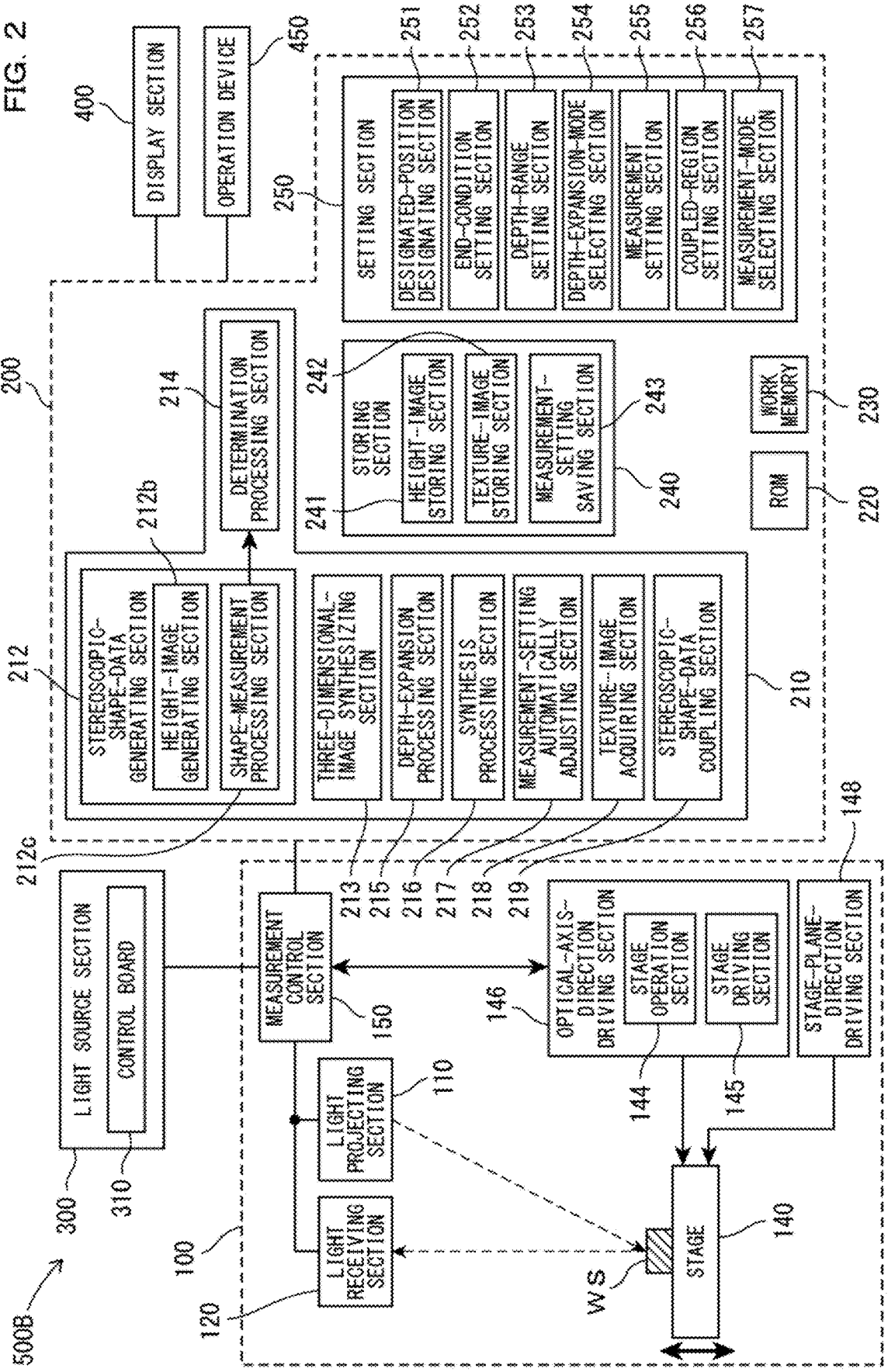
FIG. 2 is a block diagram showing a measurement microscope device according to a second embodiment of the present invention.

In an example shown in FIG. 1, a pattern light projecting system that projects measurement light for acquiring a height image and an illumination light projecting system that irradiates illumination light for capturing a texture image are separately provided. However, the present invention is not limited to a configuration in which the light projecting systems are separately provided. A light projecting system may be used in common. An example of such a light projecting system is shown in a block diagram of FIG. 2 as a second embodiment. In a shape measuring device 500B shown in FIG. 2, the same members as the members shown in FIG. 1 are denoted by the same reference numerals and signs. Detailed explanation of the members is omitted as appropriate.

Compared with the shape measuring device 500 shown in FIG. 1, the shape measuring device 500B according to the second embodiment does not include an illumination-light output section and an illumination light source for observation. In the shape measuring device 500B, the light projecting section 110 irradiates illumination light as well. For example, the light projecting section 110 can be used as a planar light source and irradiate the same light as the illumination light by irradiating all patterns as lighting in projecting the patterns. With this configuration, since the illumination-light output section can be omitted, there is an advantage that the configuration of the shape measuring device can be simplified.

On the other hand, the stage 140 is a member for placing the measurement object WK. The optical-axis-direction driving section 146 is a member for relatively moving the stage 140 in an optical axis direction with respect to the light receiving section 120 to thereby adjust a focal position of the light receiving section 120. In this example, the optical-axis-direction driving section 146 functions as a focus adjusting section that drives the stage 140 side and adjusts a focal length. The optical-axis-direction driving section 146 includes a stage driving section that electrically drives the stage 140 and a stage operation section for manually operating the stage 140. Details of these sections are explained below.

The stage-plane-direction driving section 148 is a member for relatively moving the stage 140 in a stage plane direction orthogonal to the optical axis direction of the light receiving section 120. The stage-plane-direction driving section 148 is a driving section that drives the stage 140 in a horizontal plane. The stage-plane-direction driving section 148 can adjust a visual field range. In an example in which the stage 140 side is driven, the stage-plane-direction driving section 148 is equivalent to an XY stage 141 and the optical-axis-direction driving section 146 is equivalent to a Z stage 142.

Third Embodiment

Figure 3:
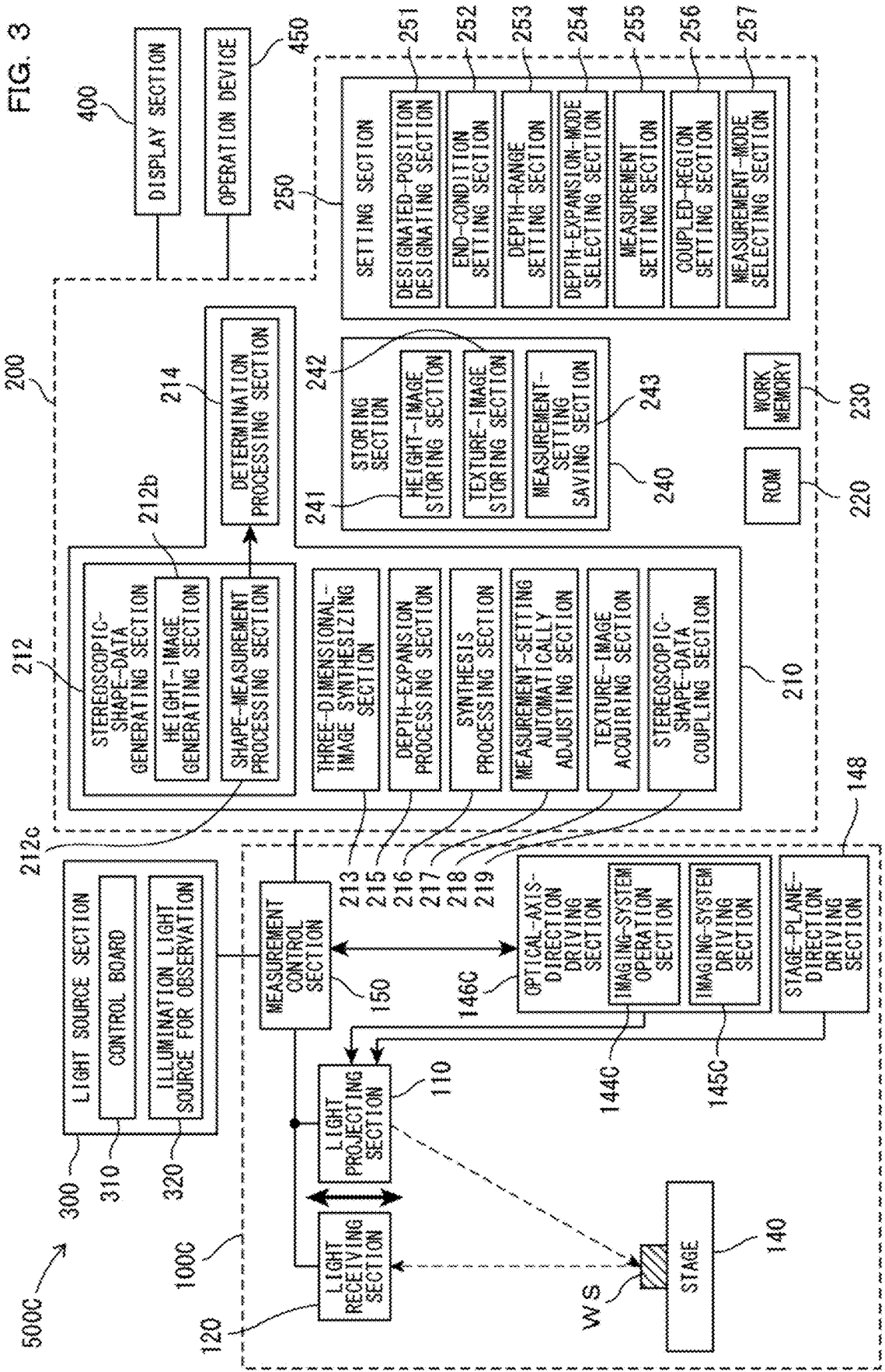
FIG. 3 is a block diagram showing a measurement microscope device according to a third embodiment of the present invention.

However, the present invention does not limit the optical-axis-direction driving section 146 to the movement of the stage 140 side. The optical-axis-direction driving section 146 may move the light projecting section 110 and light receiving section 120 side. Such an example is shown in a block diagram of FIG. 3 as a shape measuring device according to a third embodiment. In a shape measuring device 500C shown in FIG. 3, the same members as the members shown in FIG. 1 and the like are denoted by the same reference numerals and signs. Detailed explanation of the members is omitted.

In the shape measuring device 500C according to the third embodiment, the height on the stage 140 side is fixed in an imaging section 100C. An optical-axis-direction driving section 146C moves the light projecting section 110 and light receiving section 120 side. The optical-axis-direction driving section 146C includes an imaging-system operation section 144C for manually operating imaging systems such as the light projecting section 110 and the light receiving section 120 and an imaging-system driving section 145C for electrically driving the imaging systems. With this configuration, it is possible to adjust a focal position in the same manner. It is possible to constantly maintain height for placing the measurement object WK on the stage 140 by fixing the height of the stage 140. Therefore, there is an advantage that placing work for the measurement object WK can be smoothly performed. Both of the stage side and the projecting section and receiving section side may be movable. In this way, in this embodiment, it is possible to adjust the focal position in the depth direction even when one or both of the stage side and the light projecting section and light receiving section side are moved. Accordingly, "relatively move the stage in the optical direction with respect to the light receiving section" in this specification includes a form in which the stage side is moved, a form in which the light projecting section and light receiving section side are moved, and a form in which both of the sides are moved.

Control Section 200

The control section 200 includes a stereoscopic-shape-data generating section 212, a three-dimensional-image synthesizing section 213, a determination processing section 214, a depth-expansion processing section 215, a synthesis processing section 216, a measurement-setting automatically adjusting section 217, a stereoscopic-shape-data coupling section 219, a storing section 240, and a setting section 250.

Measurement-Setting Automatically Adjusting Section 217

The measurement-setting automatically adjusting section 217 is a member for automatically adjusting measurement setting of partial regions on the basis of at least one of stereoscopic shape data of the partial regions and light reception data acquired in the partial regions when the stereoscopic shape data is generated. The measurement-setting automatically adjusting section 217 automatically adjusts partial region measurement setting in the partial regions and changes the partial region measurement setting to measurement setting of the partial regions according to necessity. When the measurement setting of the partial regions is changed in this way, the stereoscopic-shape-data generating section generates stereoscopic shape data again according to the measurement setting of the partial regions. That is, the light projecting section projects pattern light and the light receiving section receives adjusted light reception data according to the measurement setting of the partial regions after the adjustment. The stereoscopic-shape-data generating section generates adjusted stereoscopic shape data on the basis of the adjusted light reception data. Further, the stereoscopic-shape-data coupling section 219 couples the adjusted stereoscopic shape data and generates coupled adjusted stereoscopic shape data. Consequently, it is possible to generate stereoscopic shape data in measurement setting of the partial regions changed to optimum conditions on the basis of the once acquired light reception data and stereoscopic shape data and perform more accurate measurement.

Stereoscopic-Shape-Data Coupling Section 219

The stereoscopic-shape-data coupling section 219 is a member for coupling, according to the measurement setting for the partial regions adjusted by a measurement-setting adjusting section, the stereoscopic shape data of the partial regions generated again by the stereoscopic-shape-data generation processing and generating coupled stereoscopic shape data corresponding to a coupled region.

Stereoscopic-Shape-Data Generating Section 212

The stereoscopic-shape-data generating section 212 is a member for generating, with a pattern projection method, according to the measurement setting set by a measurement setting section 255 and on the basis of the light reception data output by the light receiving section, stereoscopic shape data indicating the shape of a measurement object in the partial regions set by a coupled-region setting section 256. In the example shown in FIG. 1 and the like, the stereoscopic-shape-data generating section 212 acquires, on the basis of a plurality of light reception data output by the light receiving section 120 by receiving, a plurality of times, light sequentially phase-shifted and projected by the light projecting section 110 and reflected from the surface of the measurement object WK, phase data changed according to a surface shape of the measurement object WK and measures, on the basis of the phase data, with the pattern projection method, a shape of the measurement object WK present in a stage plane orthogonal to the optical axis of the light receiving section 120 and acquires stereoscopic shape data. The stage plane is designated in a planar shape and designated on, for example, an XY plane. The stereoscopic shape data is desirably acquired for each of pixels. The stereoscopic shape data means data with which height information can be measured. For example, a height image, in which pixels showing a measurement object indicate three-dimensional coordinates of the measurement object, is included in the stereoscopic shape data. That is, the stereoscopic shape data is not always required to directly have height information. For example, a stripe image measured by the pattern projection method before measurement of height information, phase data, and data obtained by measuring height information indicating a three-dimensional coordinate (e.g., an XYZ coordinate) of the measurement object for each of pixels from the stripe image are also included in the stereoscopic shape data.

The stereoscopic-shape-data generating section 212 can also generate a height image. Therefore, the stereoscopic-shape-data generating section 212 can include a height-image generating section 212b that generates a height image and a shape-measurement processing section 212c that performs measurement on the height image. In this way, the stereoscopic-shape-data generating section 212 may be configured to generate a height image, in which the pixels showing the measurement object indicate the three-dimensional coordinates, included in the stereoscopic shape data.

Determination Processing Section 214

The determination processing section 214 is a member for determining, on the basis of the stereoscopic shape data acquired by the stereoscopic-shape-data acquiring section 212, according to a predetermined determination condition, whether an unmeasured region not having height information is present in a depth measurement range. In the pattern projection method, even if contrast of stripe patterns is low, it is possible to acquire stereoscopic shape data if the stripe patterns have contrast enough for distinguishing a bright part and a dark part adjacent to each other. Therefore, the depth measurement range indicates a range having certain fixed width in the optical axis direction of the light receiving section 120 in which height information can be acquired without relatively moving the stage 140 with respect to the light receiving section 120 or the light projecting section 110 or both of the light receiving section 120 and the light projecting section 110. More specifically, the depth measurement range has a fixed range vertically in the optical axis direction with respect to a position where stripe patterns projected on the measurement object WK by the light projecting section 110 are imaged at the largest contrast. The fixed range is a range in which the stripe patterns projected from the light projecting section 110 can be at least imaged by the light receiving section 120. When a plurality of the light projecting sections 110 that project pattern lights from different directions are present, the fixed range may be defined on the basis of a range in which stripe patterns projected from all the light projecting sections 110 are imaged. The unmeasured region indicates data, height information of which cannot be acquired, in the stereoscopic shape data. Examples of the unmeasured region include a region formed by a pixel or a plurality of pixels on which stripe patterns of stripe projection are not reflected. Examples of the predetermined determination condition include contrast of a stripe image included in the stereoscopic shape data and whether luminance has reached a predetermined value.

That is, when a pixel in which a luminance value enough for determining that a pattern is projected is obtained is present among pixels for which final stereoscopic shape data is not obtained, the determination processing section 214 determines that a measurement target object is present, changes the depth measurement range on the basis of the determination, and attempts to acquire stereoscopic shape data.

The determination processing section 214 can determine whether an unmeasured region not having height information is present in the depth measurement range by determining on the basis of such a determination condition whether stripe patterns are obtained enough for performing measurement of height.

The determination processing section 214 can accumulate acquired pixels in which height information can be measured in the depth measurement range and determine on the basis of a cumulative image obtained by accumulating the acquired pixels whether an unmeasured pixel is present.

Further, the determination processing section 214 may determine which part in the depth measurement range has the stereoscopic shape data and determine presence or absence of an unmeasured pixel. In this way, if a pixel, the height of which can be measured, is present in the depth measurement range, the determination processing section 214 may automatically expand depth. That is, if at least one point can be measured in the depth measurement range, the determination processing section 214 can be controlled to expand the depth measurement range.

Depth-Expansion Processing Section 215

The depth-expansion processing section 215 is a member for controlling the optical-axis-direction driving section 146 and changing the focal position of the light receiving section 120 when it is determined by un-measurement determination processing by the determination processing section 214 that an unmeasured region is present.

Setting Section 250

The setting section 250 includes a position designating section 251, an end-condition setting section 252, a depth-range setting section 253, a depth-expansion-mode selecting section 254, a measurement setting section 255, a coupled-region setting section 256, and a measurement-mode selecting section 257.

Position Designating Section 251

The position designating section 251 is a member for designating an XY position on an image of the measurement object WK displayed on the display section 400.

End-Condition Setting Section 252

The end-condition setting section 252 is a member for setting a predetermined end condition for ending focal-position-changing processing for controlling the optical-axis-direction driving section 146 and changing the focal position of the light receiving section 120.

Examples of the predetermined end condition by the determination processing section 214 include a physical limit of a moving range, that is, a state in which the stage 140 reaches a position where the stage 140 cannot further move. Examples of the predetermined end condition also include a state in which a shape is not measured but a stripe image cannot be acquired besides a state in a shape cannot be measured in the first place.

When causing the optical-axis-direction driving section 146 to operate, the depth-expansion processing section 215 desirably causes the optical-axis-direction driving section 146 to operate in a direction in which the distance between the light receiving section 120 and the stage 140 increases. Consequently, it is possible to avoid a situation in which the measurement object WK placed on the stage 140 comes into contact with the light receiving section 120. In this case, since the light receiving section 120 and the stage 140 operate only in one direction in which the light receiving section 120 and the stage 140 separate, unless an initial position of the stage 140 is appropriately set, the entire measurement object WK cannot be measured. A user sets, while moving the stage 140 in the optical axis direction of the light receiving section 120, the initial position of the stage 140 in a position where measurement of the lowest position (a position where the light receiving section 120 is away most) of the measurement object WK that the user desires to measure is possible and a position where the highest position (a position closest to the light receiving section 120) of the measurement object WK does not collide with the light receiving section 120. The user can perform this work by confirming the stereoscopic shape data displayed on the display section 400 or visually confirming an actual distance between the stage 140 and the light receiving section 120.

On the other hand, the depth-expansion processing section 215 desirably includes a mechanism for preventing a situation in which the measurement object WK on the stage 140 comes into contact with a camera or the like when the operation of the optical-axis-direction driving section 146 is also allowed in a direction in which the distance between the light receiving section 120 and the stage 140 decreases. For example, rough height of the highest part of the measurement object WK is acquired in advance. The operation of the optical-axis direction driving section 146 is limited by the depth-expansion processing section 215 to prohibit the light receiving section 120 and the stage 140 from approaching a distance shorter than the height. When the movement of the stage 140 is allowed in both of the direction in which the distance between the light receiving section 120 and the stage 140 decreases and the direction in which the distance between the light receiving section 120 and the stage 140 increases, first, the stage 140 is moved in one of the directions from the initial position of the stage 140. When the end condition by the determination processing section 214 is not satisfied, the stage 140 is moved in the other direction. This reciprocating operation is performed until the end condition is satisfied.

The depth-range setting section 253 is a member for setting a range for controlling the optical-axis-direction driving section 146 and changing the focal position of the light receiving section 120.

The depth-expansion-mode selecting section 254 is a member for switching whether focal-position-changing processing for controlling the optical-axis-direction driving section 146 and changing the focal position of the light receiving section 120 is performed in a predetermined range or the depth is automatically extended.

Measurement Setting Section 255

The measurement setting section 255 is a member for setting a coupled region. The coupled region is divided into a plurality of partial regions. The partial regions correspond to a visual field measurable by the shape measuring device or a region slightly narrower than the visual field. In this way, the coupled region is divided into the plurality of partial regions. The stage is moved to the partial regions by the plane-direction driving section. Stereoscopic shape data respectively generated in the partial regions are coupled in the XY plane direction. Consequently, it is possible to obtain a wide area image in which a visual field limited in hardware specification is enlarged.

Coupled-Region Setting Section 256

The coupled-region setting section 256 is a member that sets, as a region in which a relative position of the stage 140 in the plane direction is moved by the plane-direction driving section, the coupled region formed by the plurality of partial regions.

Measurement-Mode Selecting Section 257

The measurement-mode selecting section 257 is a member for selecting, as a measurement mode in generating stereoscopic shape data of a measurement object in the stereoscopic-shape-data generating section, anyone of a normal mode, a fine mode for performing measurement finer than measurement in the normal mode, and a halation removal mode for removing halation from light reception data.

Synthesis Processing Section 216

The synthesis processing section 216 is a member for generating a synthesized height image obtained by combining a plurality of height images generated by automatically repeating stereoscopic-shape-data acquisition processing by the stereoscopic-shape-data generating section 212, the un-measurement determination processing by the determination processing section 214, and focal-position-changing processing by the depth-expansion processing section 215 until it is determined by the un-measurement determination processing by the determination processing section 214 that an unmeasured region is absent or the predetermined end condition is satisfied.

With such a shape measuring device, it is possible to expand a measurement range in the depth direction in respective visual fields.

Acquiring Method for Height Information

In this embodiment, the pattern projection method based on the principle of triangulation is used as the method for acquiring height information. In this method, the position of the measurement object or the shape measuring device is physically or optically moved and measurement is repeated on the basis of the triangulation system in which a depth measurement range in one time of measurement is wide. By combining obtained measurement results, it is possible to expand total height in the depth direction by a distance of movement of the depth measurement range that can be realized by one time of measurement. As a result, it is possible to quickly measure a wider range than the triangulation system. Consequently, the shape measuring device and the shape measuring method capable of measuring a wider visual field with higher resolution are realized.

XY Image Coupling Function

The synthesis processing section 216 can also couple, on the XY plane, a plurality of height images having different XY coordinates captured by moving the stage 140 in the XY direction. In the case of such XY coupling, the stage 140 is moved in the horizontal direction by the stage-plane-direction driving section 148. Images captured in different visual field ranges are coupled in the horizontal direction. For example, texture images showing different parts captured a plurality of times by a texture-image acquiring section 218 are coupled by an XY coupling section. A coupled image serving as a large texture image can be used as a reference target image and an inspection target image. In particular, in a shape measuring device capable of capturing a high-magnification optical image and the like, the ability of the shape measuring device sometimes cannot be sufficiently exerted with a low-magnification texture image. It is possible to realize highly accurate image inspection by generating a high-magnification and high-definition texture image with an image coupling function. Alternatively, since a high-magnification image has a narrow visual field, it is also possible to obtain a coupled image having an enlarged visual field by coupling images captured in different visual fields. The image coupling function, that is, the XY coupling function is not limitedly executed on the texture image and can also be executed on a height image and a synthesized height image or a synthesized image obtained by combining the texture image and the height image. When a plurality of stereoscopic shape data acquired by moving the stage 140 in the XY direction are coupled, the depth expansion processing by the depth-expansion processing section 215 is automatically performed in respective XY positions. A generated plurality of stereoscopic shape data are coupled. Consequently, even if the measurement object WK is large in the XY direction and has large undulation in the height direction, it is possible to easily perform measurement of the entire measurement object WK. When the undulation in the height direction of the measurement object WK is different in the XY positions, presence or absence or the number of times of the depth expansion processing by the depth-expansion processing section 215 is different in the XY positions. For example, in an XY position where the measurement object WK is rather flat and the entire measurement object WK falls within the measurement depth range in one time of measurement, stereoscopic shape data can be generated without performing the depth expansion processing. In an XY position where the undulation of the measurement object WK is large and the depth expansion processing is necessary, stereoscopic shape data is generated by performing a plurality of times of the depth expansion processing. The stereoscopic shape data can be coupled in the XY direction.

In executing the image coupling, it is easier to perform work when a wide area image of the measurement object is photographed beforehand and then setting is performed on the wide area image. However, a photographing visual field imageable in the light receiving section is physically restricted. Whereas it is necessary to perform photographing at low magnification if a wide visual field is imaged and used, the magnification of the light receiving section is limited. The size of an imaging element such as a CCD configuring the light receiving section is also limited. Further, when the imaging optical system is a telecentric optical system, since the telecentric optical system does not have an angle of view, a visual field cannot be enlarged even if a working distance is increased. Therefore, by changing the photographing visual field to capture a plurality of images and arranging the plurality of images in the XY direction in a tile shape, it is possible to obtain a wide area image surpassing the physical restriction of the visual field. Such a wide area image obtained by coupling the plurality of images in the tile shape is referred to as navigation image herein.

Figure 45:
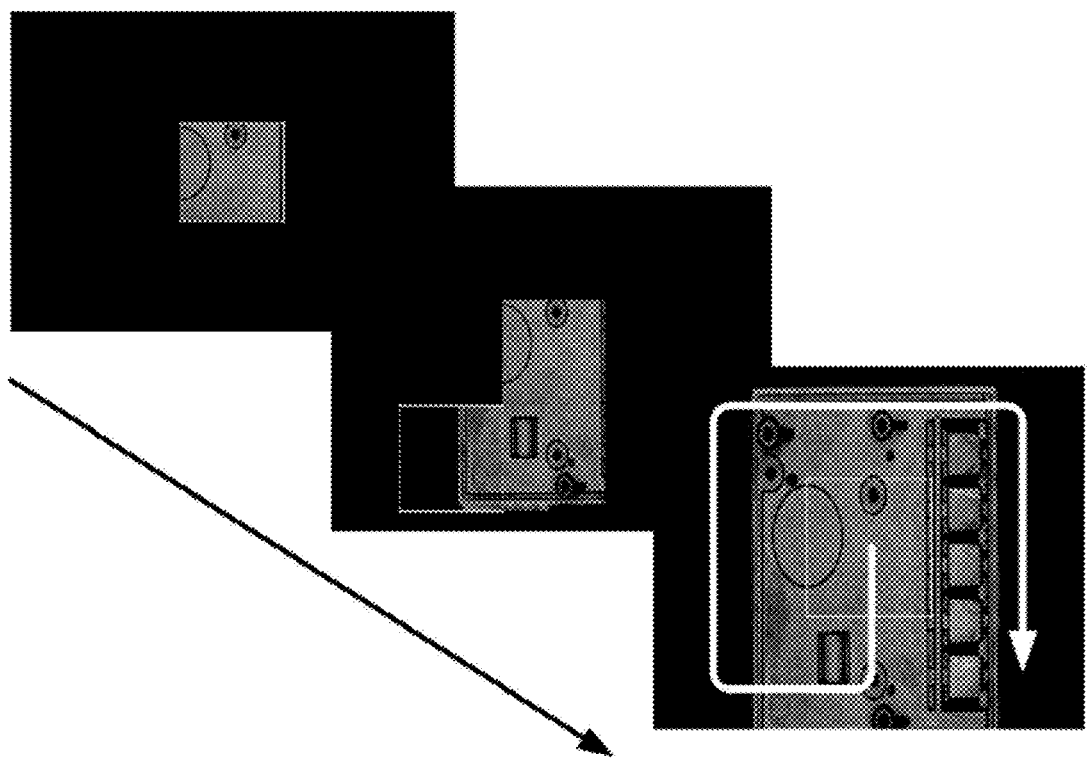
FIG. 45 is a schematic diagram showing a state in which image coupling is performed in a swirl shape.

The navigation image can be manually created. However, since it takes labor and time to manually create the navigation image, it is desirable to automatically create the navigation image. As a method of automatically generating the navigation image, there is known a method of moving the photographing visual field in a swirl shape as shown in FIG. 45. In this swirl coupling method, the user manually locates the photographing visual field in the center of a measurement object that the user desires to image. After an image is captured, images are captured and sequentially coupled while the photographing visual field is automatically moved in a swirl shape. At a point in time when an entire view of the measurement object is obtained, the user instructs an end of the processing. In this method, first, the user has to manually set the photographing visual field in the center of the measurement object. The user has to instruct an end of the imaging while confirming an obtained coupled image. Therefore, this method takes labor and time.

Generation Procedure for the Navigation Image

Figure 46:
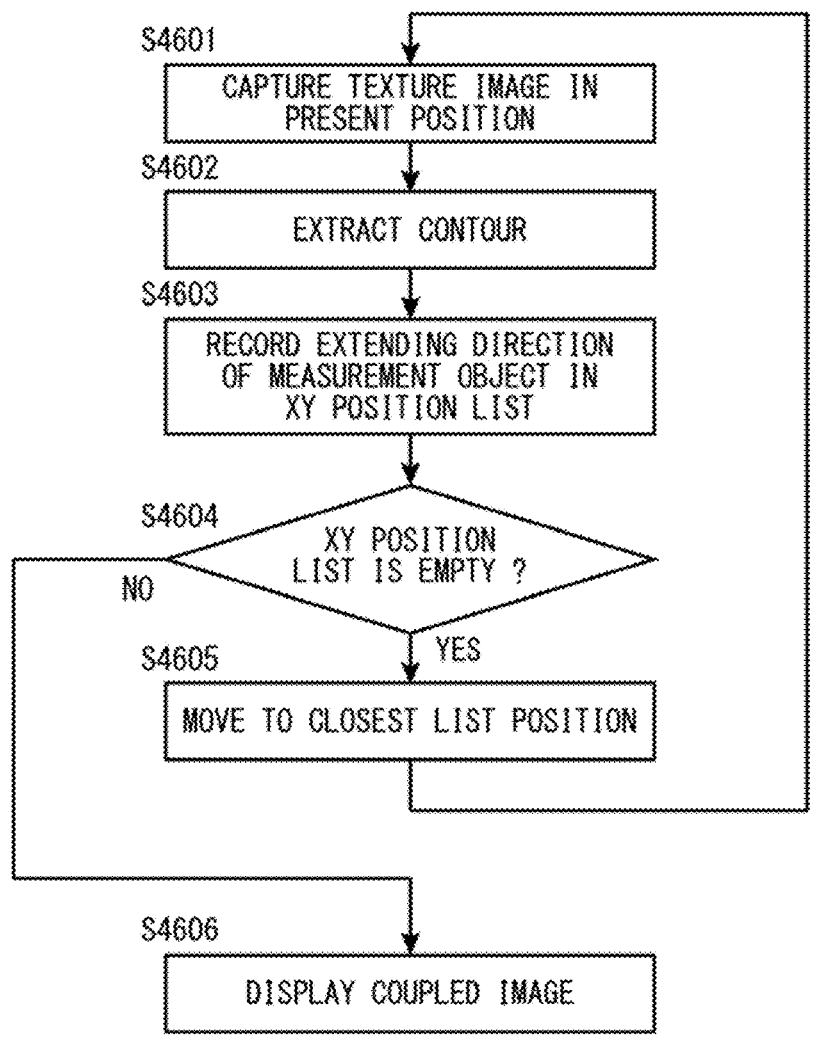
FIG. 46 is a flowchart showing a generation procedure for a navigation image.

Therefore, in this embodiment, as an automatic creation method for the navigation image with reduced labor and time, a method of analyzing an image of the measurement object and specifying a moving direction of the photographing visual field is adopted. Such an automatic creation method for the navigation image is explained with reference to FIG. 46 and FIGS. 47A and 47B. A procedure for, in order to obtain a navigation image shown in FIG. 47A, moving the photographing visual field as indicated by arrows in a binary image shown in FIG. 47B and coupling sequentially captured images to enlarge a visual field is explained with reference to a flowchart of FIG. 46.

Photographing Processing

Figure 48A:
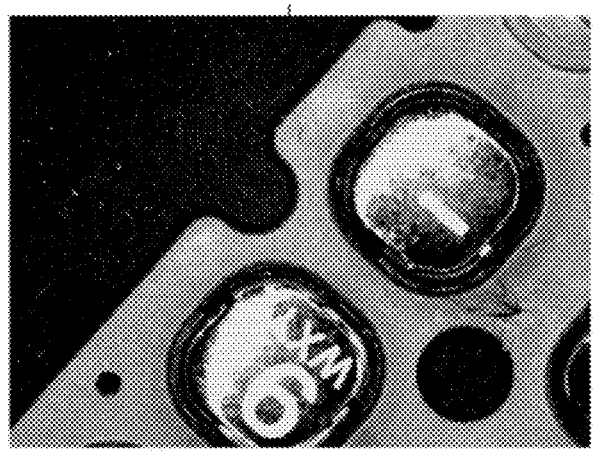
FIG. 48A is an image diagram of a texture image of a certain photographing visual field.

First, in step S4601, the shape measuring device photographs a texture image in the present position. The shape measuring device captures a texture image in any position of the measurement object using the texture-image acquiring section shown in FIG. 1 and the like. Consequently, a texture image in a photographing visual field in the present XY stage position shown in FIG. 48A is obtained.

Contour Extraction Processing

Figure 48B:
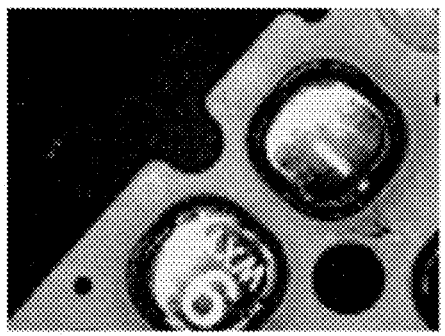
FIG. 48B is an image diagram of an image obtained by reducing FIG. 48A in size and reducing noise.
Figure 48C:
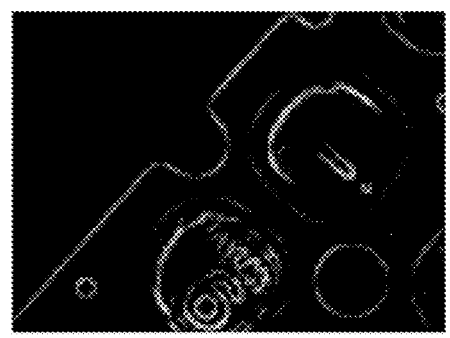
FIG. 48C is an image diagram of a Sobel filter image of in FIG. 48B.
Figure 48D:
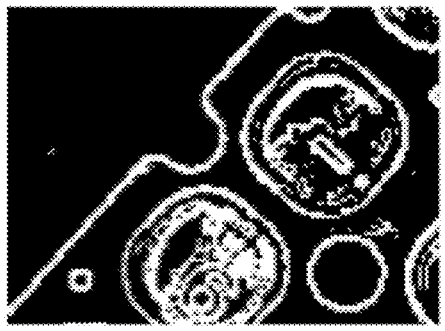
FIG. 48D is an image diagram of a binary image of FIG. 48C.
Figure 48E:
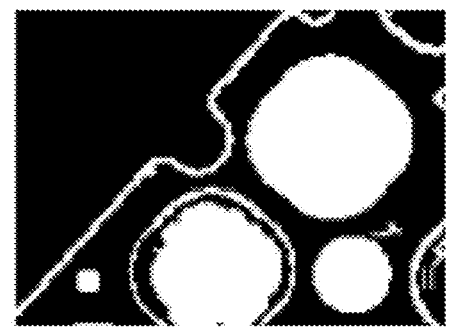
FIG. 48E is an image diagram of a binary image obtained by performing image processing of FIG. 48D.

Subsequently, in step S4602, the shape measuring device converts the texture image into a binary image. When converting texture image into the binary image with the control section, the shape measuring device applies necessary image processing to the texture image. In this example, the shape measuring device applies a median filter to the texture image to reduce noise. Further, the shape measuring device reduces an image. The shape measuring device reduces the texture image shown in FIG. 48A to ⅛ to obtain an image shown in FIG. 48B. Subsequently, the shape measuring device applies a horizontal direction Sobel filter and a vertical direction Sobel filter to respective R, G, and B images and adds up the R, G, and B images to create a Sobel filter image shown in FIG. 48C. Further, the shape measuring device creates a histogram from the Sobel filter image, calculates a threshold of binarization from the histogram, and binarizes the Sobel filter image as shown in FIG. 48D. Finally, the shape measuring device performs a contour search, performs processing for painting out the inside of the Sobel filter image, and excludes a small contour to obtain a binary image shown in FIG. 48E.

The shape measuring device determines a portion having a large difference as the measurement object using the Sobel filter (a differential filter). Therefore, a portion, which is not the measurement object, that is, a top plate on the stage corresponding to a background portion needs to be a texture having a small difference. Therefore, it is desirable to form the top surface of the stage in a flat shape having less undulation. It is desirable to form the upper surface as a smooth surface. However, a certain degree of robustness is secured by the median filter, a reduction in size, exclusion of a small shape, and the like.

In the example explained above, the Sobel filter is used in order to convert the texture image into the binary image. However, the present invention is not limited to the Sobel filter. Other differential filters such as a Prewitt filter can be used.

Extension Determination Processing

Figure 49:
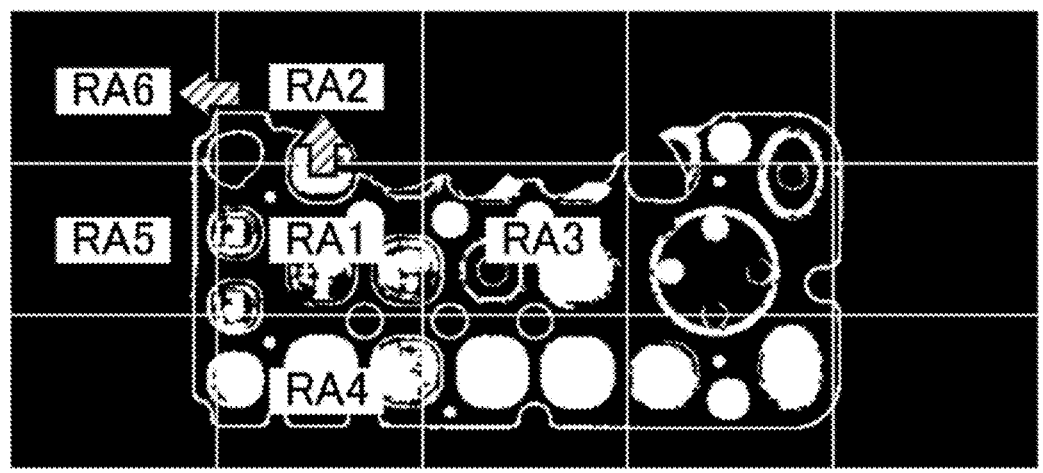
FIG. 49 is a schematic diagram showing a state in which a rectangular region set in FIG. 47A is moved.
Figure 50:
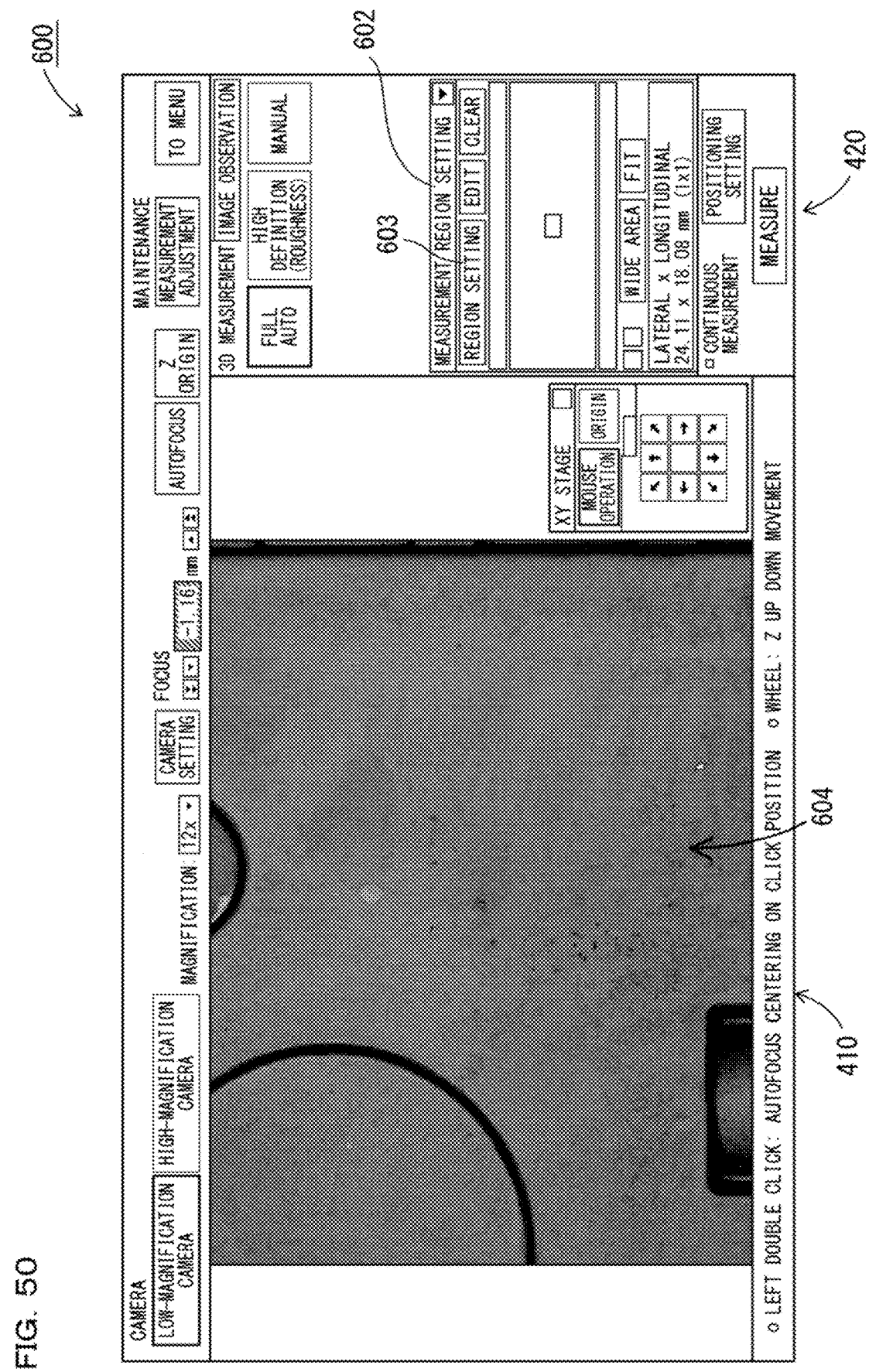
FIG. 50 is an image diagram showing a 3D measurement screen on which a measurement region setting window is displayed.

The shape measuring device extracts only a contour portion of the measurement object by converting the texture image into the binary image. Subsequently, in step S4603 in FIG. 46, the shape measuring device determines, from the binary image, in which of upper, lower, left, and right directions the measurement object extends. The shape measuring device saves the position of the measurement object. As shown in FIG. 49, the present photographing visual field of the light receiving section is represented as a rectangular region RA1. A state is assumed in which rectangular regions having the same size as this rectangular region are arranged in an X direction and a Y direction orthogonal to the optical axis of the light receiving section. The shape measuring device determines, on the basis of the extracted contour of the measurement object, whether the measurement object is present in rectangular regions RA2, RA3, RA4, and RA5 adjacent to the present photographing visual field, that is, the rectangular region RA1 among such a plurality of rectangular regions. It is possible to determine presence or absence of the measurement object according to from which side to which side the contour extends among four sides forming the rectangular region. In an example shown in FIG. 49, it is determined that the measurement object is present in all of the rectangular regions RA2, RA3, RA4, and RA5 located on all sides of the rectangular region RA1.

Storage Processing

When one or more partial regions where it is determined by this extension determination processing that the measurement object is present are present, the shape measuring device causes the storing section to store coordinate positions of the partial regions. XY position information of the rectangular regions RA2, RA3, RA4, and RA5 is saved iii an XY position list of a saving section of the storing section. The XY position information saved in the XY position list may be coordinates of a rectangular region, for example, coordinates of four corners, a coordinate of the center, or a specific coordinate of the upper left or the lower right or may be a moving direction.

Subsequently, in step S4604, the shape measuring device determines whether the XY position information is included in the XY position list. When the XY position information is included in the XY position list, in step S4605, the shape measuring device moves the photographing visual field to an XY position closest to the present position in the XY position list. Since all of the rectangular regions RA2, RA3, RA4, and RA5 are in the same distance, the photographing visual field is moved to any one of the rectangular regions RA2, RA3, RA4, and RA5, for example, the rectangular region RA2. The shape measuring device returns to step S4601 and repeats the photographing processing, the contour extraction processing, the extension determination processing, and the storage processing in the same manner. As a result, a visual field of the texture image is enlarged from the rectangular region RA1 to RA1+RA2. Among the rectangular regions adjacent to the rectangular region RA2, rectangular regions to which the measurement object extends are the rectangular regions RA1 and RA6. Since the rectangular region RA1 is already imaged, the rectangular region RA1 is excluded. XY position information of the rectangular region RA6 is added to the XY position list. In this way, in the addition of the XY position information, an already captured XY position is excluded. As a result, the rectangular regions RA3, RA4, RA5, and RA6 are saved in the XY position list. Among the rectangular regions RA3, RA4, RA5, and RA6, the rectangular region closest to the present rectangular region RA2 is the rectangular region RA6. Therefore, the photographing visual field is moved to the rectangular region RA6 and the same processing is performed. Such processing is continued until the XY position list becomes empty.

Figure 47A:
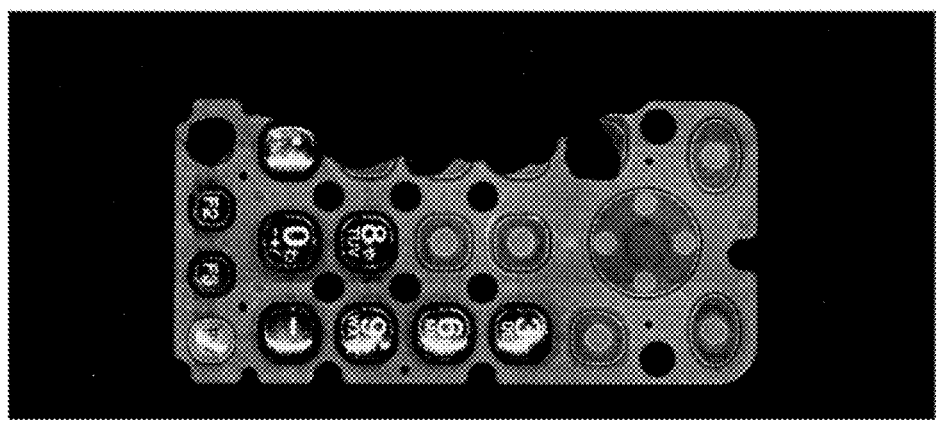
FIG. 47A is a generated navigation image.
Figure 47B:
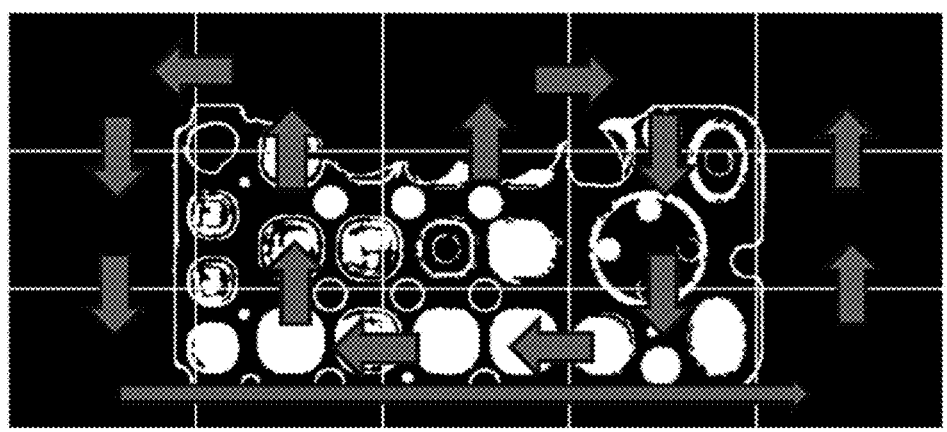
FIG. 47B is a binary image of FIG. 47A.

When determining in step S4604 that the XY position information is not included in the XY position list, the shape measuring device proceeds to step S4606 and causes the display section to display a coupled image of the measurement object. A coupled image obtained by coupling texture images captured in the rectangular regions as shown in FIG. 47A is displayed on the display section as the navigation image. The coupling processing for images and the display processing on the display section may be displayed in a state in which a final navigation image is obtained. Besides, the coupling processing and the display processing may be updated at any time at a point in time when the texture image is captured in the rectangular region.

In this way, an image in a wider area than a physical photographing visual field of the light receiving section can be displayed as the navigation image. In this state, the user can perform observation and measurement, condition setting for the observation and the measurement, and the like, for example, designate a region where the user desires to designate measurement of stereoscopic shape data. The navigation image only has to be a simple image for performing overall display and setting. Therefore, it is desirable to make it possible to quickly perform processing such as generation and display by, for example, reducing resolution and magnification. On the other hand, if an image captured according to conditions set on the navigation image is an image generated according to advanced processing for, for example, setting higher definition and higher magnification or including height information in the image, it is possible to efficiently perform display, setting, and generation of the image. The size of the rectangular region is set to maximum size or size close to the maximum of the photographing region determined by the specifications of the light receiving section. In an example shown in FIG. 47B, the navigation image is generated by arranging five rectangular regions and three rectangular regions laterally and longitudinally in a tile shape. However, the numbers of lateral and longitudinal rectangular regions change according to the size and the like of the measurement object. In some case, one lateral rectangular region or one longitudinal region is formed.

In a state in which the navigation image is generated, the user can designate, with an XY-position designating section, any position on the navigation image. As the XY-position designating section, an input device such as a mouse or a touch panel can be used. It is possible to move the stage to change the photographing visual field to the position designated by the XY-position designating section in this way.

Image XY Coupling Processing

The shape measuring device can also perform image XY coupling processing. For example, as a unit for performing imaging in the light receiving section on the navigation image displayed on the display section, the shape measuring device sets, with an XY-coupled-region setting section, a plurality of partial regions on the XY plane. The control section generates, for each of the partial regions set by the XY-coupled-region setting section, three-dimensional stereoscopic shape data on the basis of an image of the measurement object captured by the photographing processing and couples stereoscopic shape data adjacent to one another to generate coupled stereoscopic shape data in coupled-image generation processing.

Figure 51:
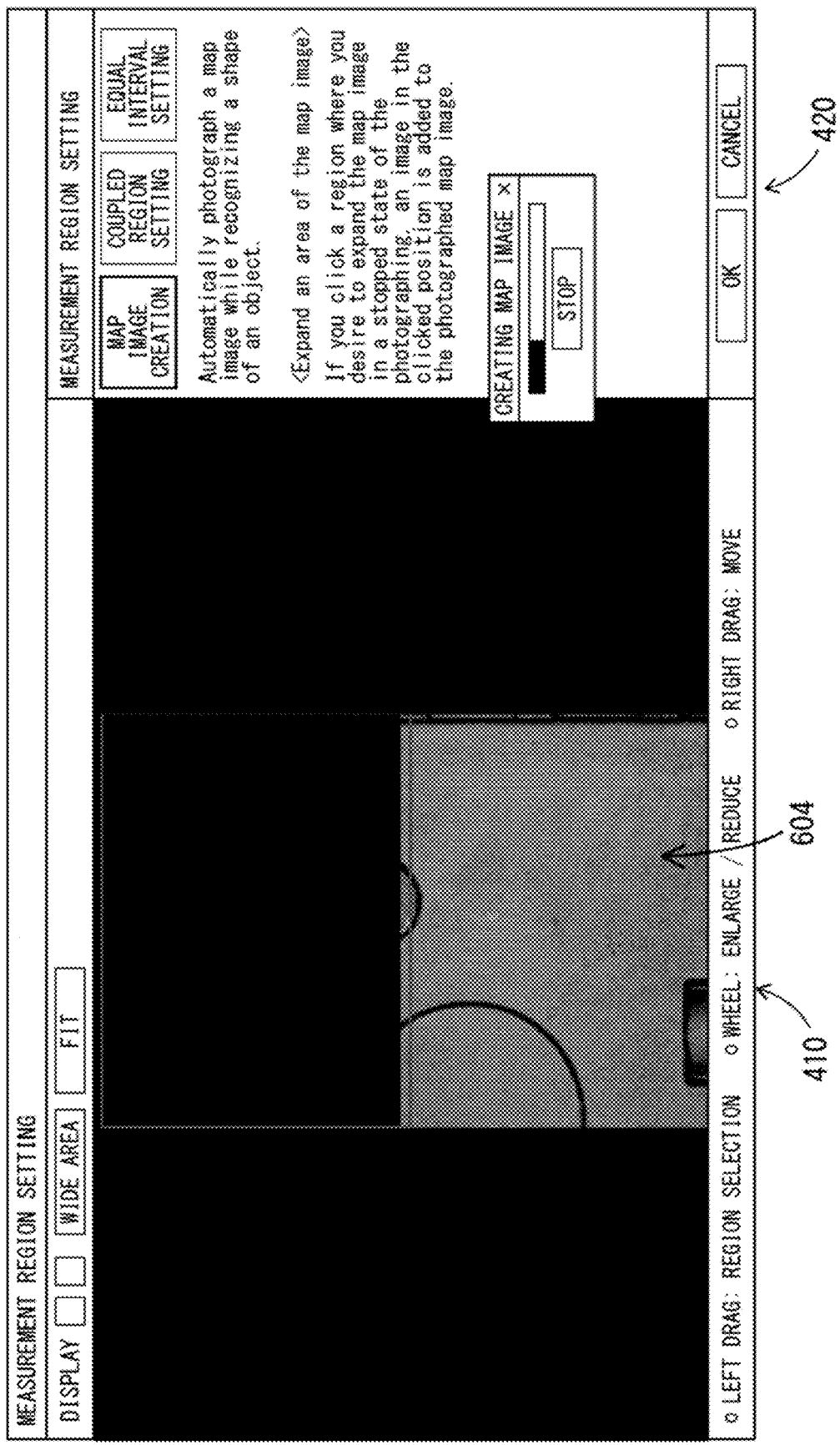
FIG. 51 is an image diagram showing a screen halfway in map image creation.
Figure 52:
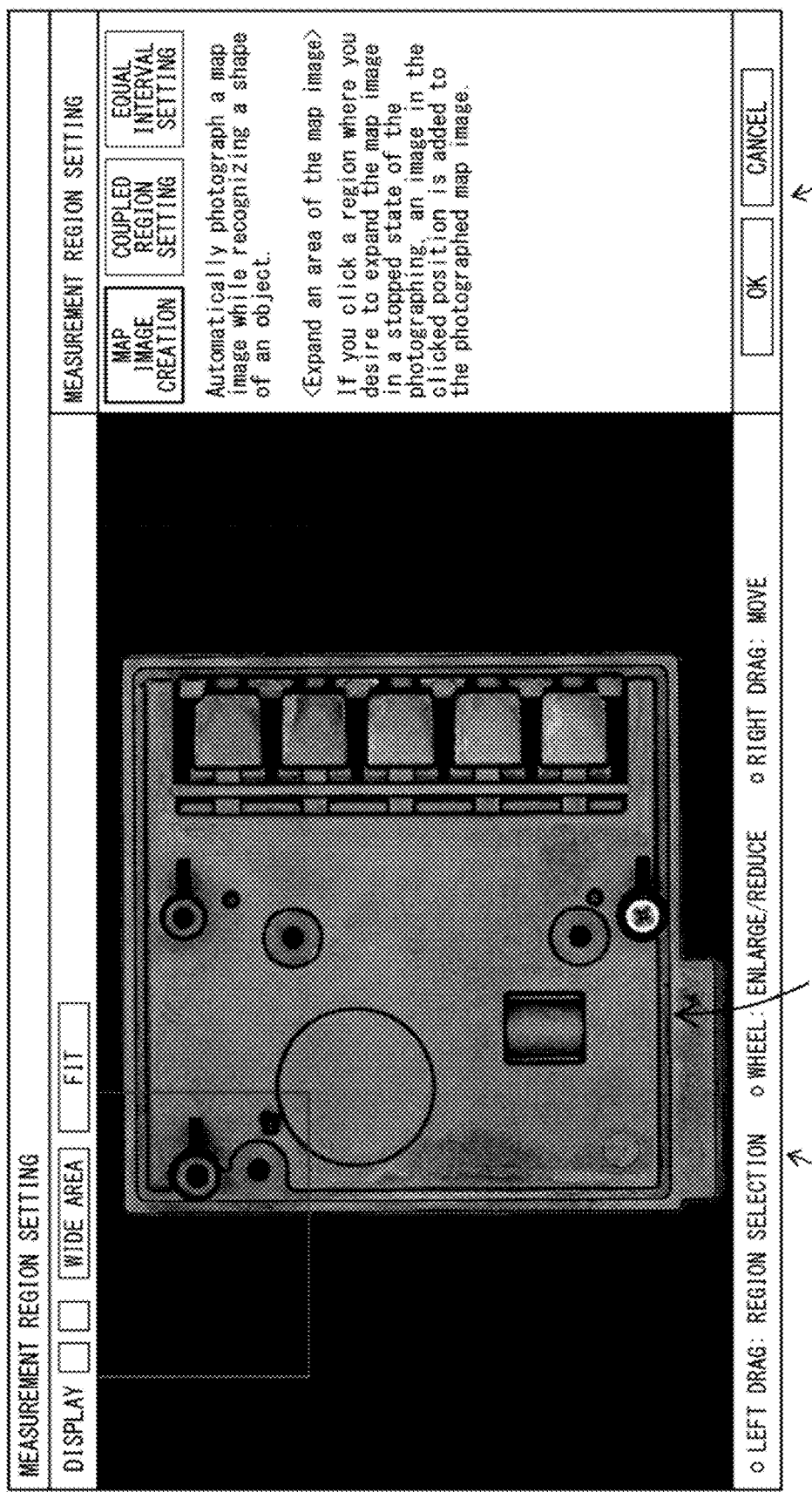
FIG. 52 is an image diagram showing a map image creation screen.

Operation Example of a Shape Measuring Program for Generating a Coupled Height Image A procedure for generating a navigation image and generating a coupled height image (a map image) as coupled stereoscopic shape data is explained with reference to a user interface screen of a shape measuring program shown in FIGS. 50 to 59. First, on a 3D measurement screen 600 shown in FIG. 50, the shape measuring device displays a texture image of a measurement object in an image display region 410. In this state, the user presses a "region setting" button 603 of a measurement-region setting window 602 provided in an operation region 420. Consequently, execution of automatic generation of a navigation image is instructed. As shown in FIG. 51, the XY stage is automatically moved. Continuously from a photographing visual field shown in FIG. 50, the photographing visual field is automatically switched to a direction in which the measurement object is present. A new navigation image is captured and coupled. A state in which the photographing visual field is enlarged in this way is updated in the image display region 410 on a real-time basis. A movement amount of the XY stage is desirably set such that the XY stage partially overlaps the preceding photographing visual field 604 as shown in FIG. 51. As explained above, the imaging is sequentially repeated and the photographing visual field is enlarged until no XY position is left in the XY position list. Finally, as shown in FIG. 52, a coupled texture image 605 showing the entire measurement object is generated and displayed in the image display region 410. In the display of the coupled texture image 605, it is desirable to automatically adjust display magnification such that the entire view of the coupled texture image is displayed.

In this way, it is possible to automatically create a navigation image exceeding a photographing visual field that can be physically imaged at a time. Subsequently, a map image obtained by coupling height images in this state is created. The map image is automatically captured by recognizing the shape of the measurement object. In a measurement-region setting screen 610 shown in FIG. 52, the user can designate a region where the user desires to create the map image. The user can also enlarge the region of the map image. For example, by clicking, in the image display region 410, the region where the user desires to create the map image, an image of the designated position is captured and added to the map image.

Figure 53:
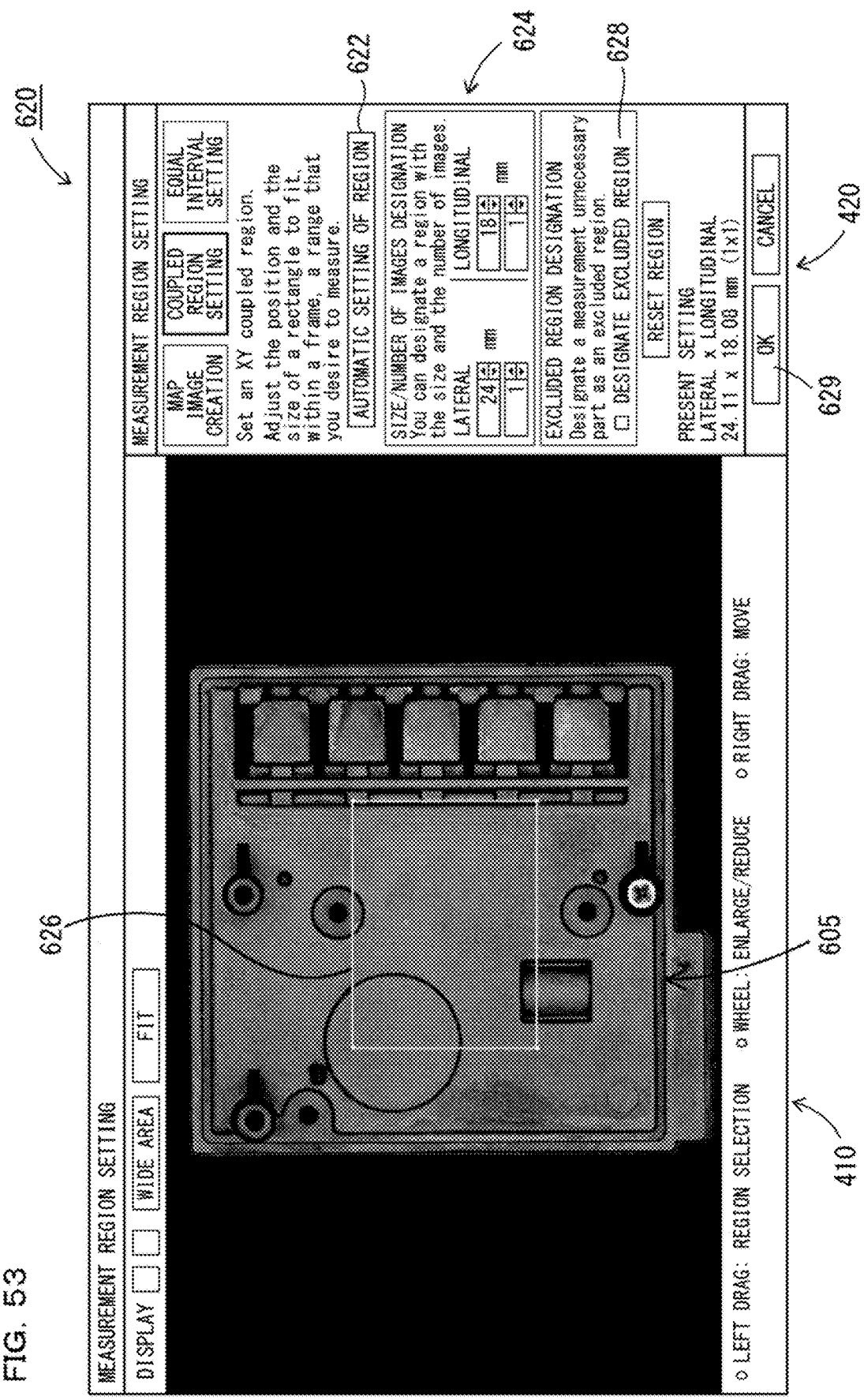
FIG. 53 is an image diagram showing an XY-coupled region setting screen.
Figure 54:
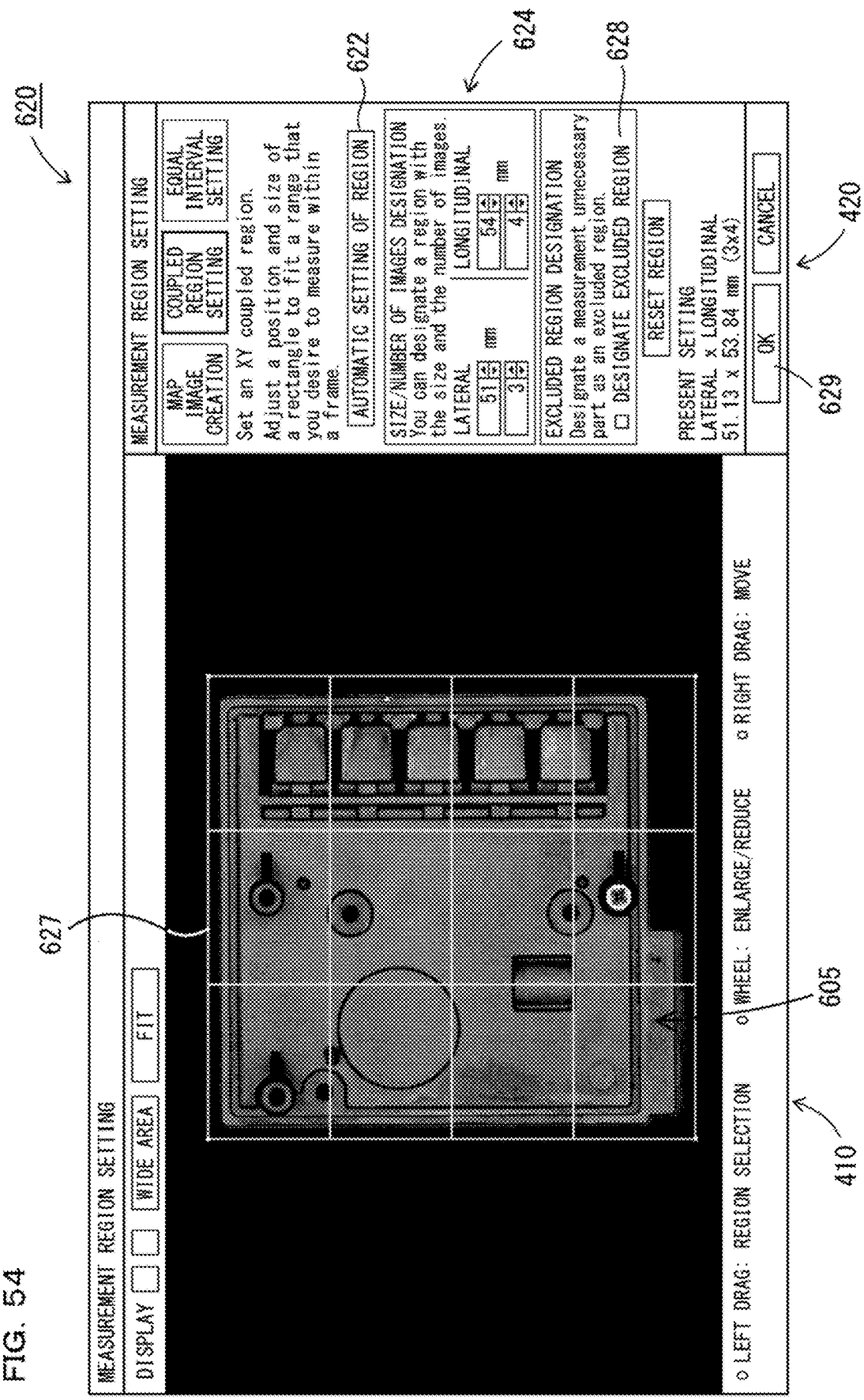
FIG. 54 is an image diagram showing the XY-coupled region setting screen.
Figure 55:
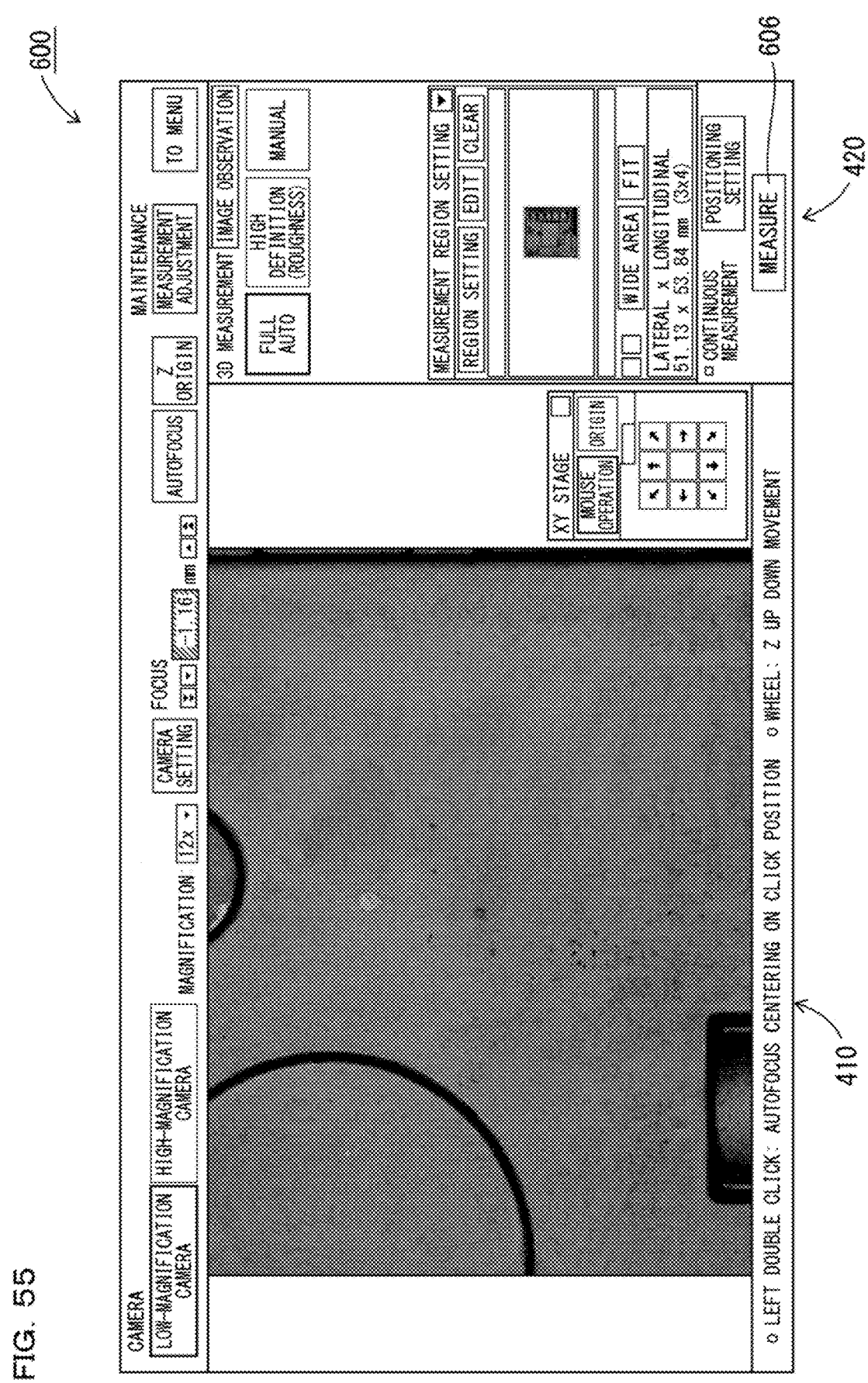
FIG. 55 is an image diagram showing a 3D measurement screen.

An XY-coupled-region setting screen 620 for setting an XY-coupled region in image coupling is shown in FIG. 53. On this screen, an XY-coupled region for performing image XY coupling is set. The XY-coupled region is divided into rectangular partial regions. The divided regions are set to size, the upper limit of which is the photographing visual field. For example, the user displays a rectangular partial region setting frame in the image display region 410 and adjusts the position and the size of the rectangle such that a region that the user desires to measure fits within the partial region setting frame. The partial regions can also be automatically set. In this example, when the user presses a "region automatic setting" button 622 provided in the operation region 420, the automatic setting of the partial regions is executed. Alternatively, the user can designate the size and the number of the partial regions as numerical values. The user can designate longitudinal and lateral sizes and longitudinal and lateral numbers of the partial regions from a "size/number designation" field 624. For example, in an example shown in FIG. 53, a state is shown in which only one divided region 626 is designated. In an example shown in FIG. 54, a state is shown in which a lateral number and a longitudinal number of divided regions 627 are respectively set to three and four.

Figure 56:
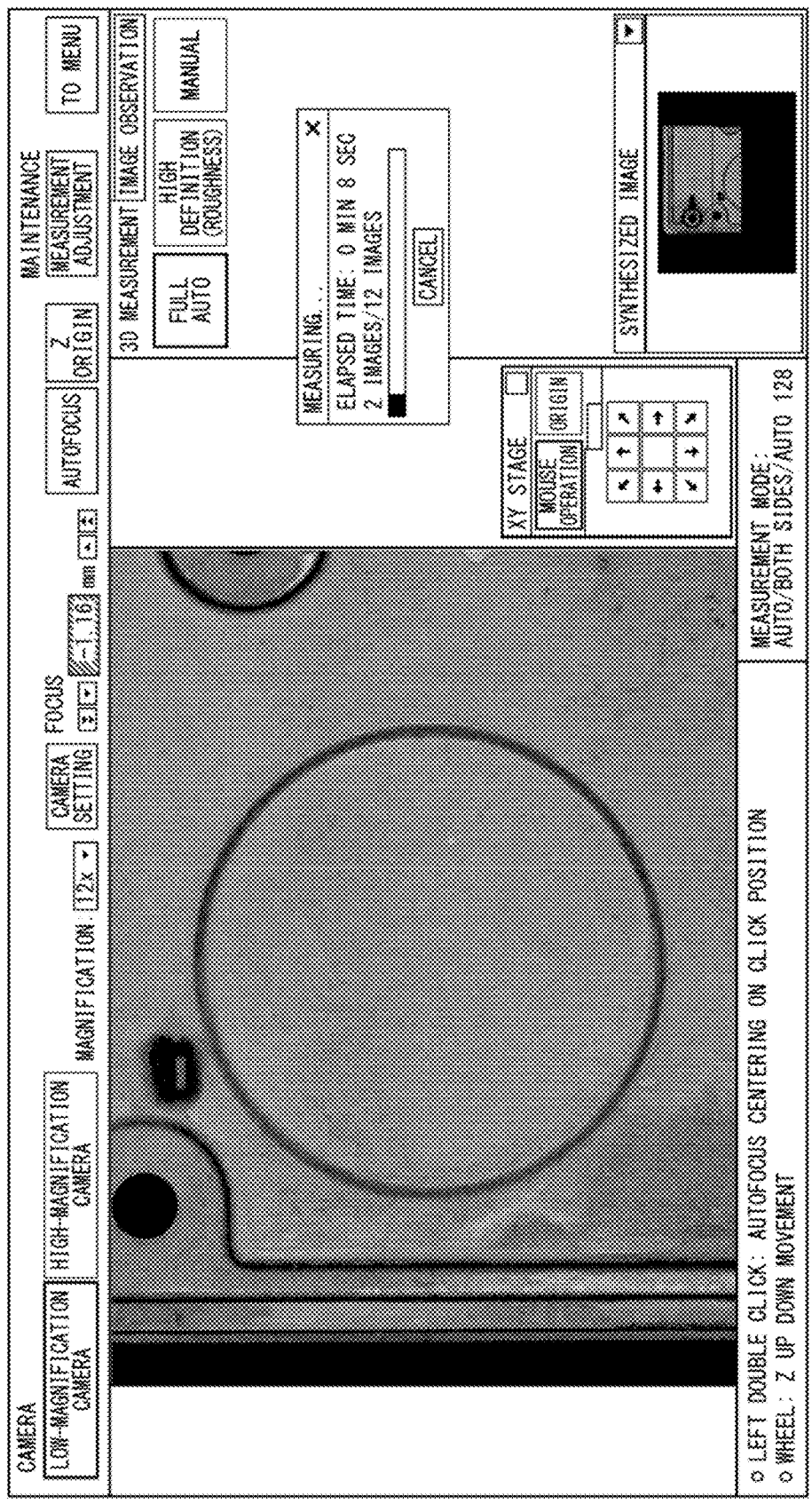
FIG. 56 is an image diagram halfway in generation of a coupled height image (a map image)
Figure 57:
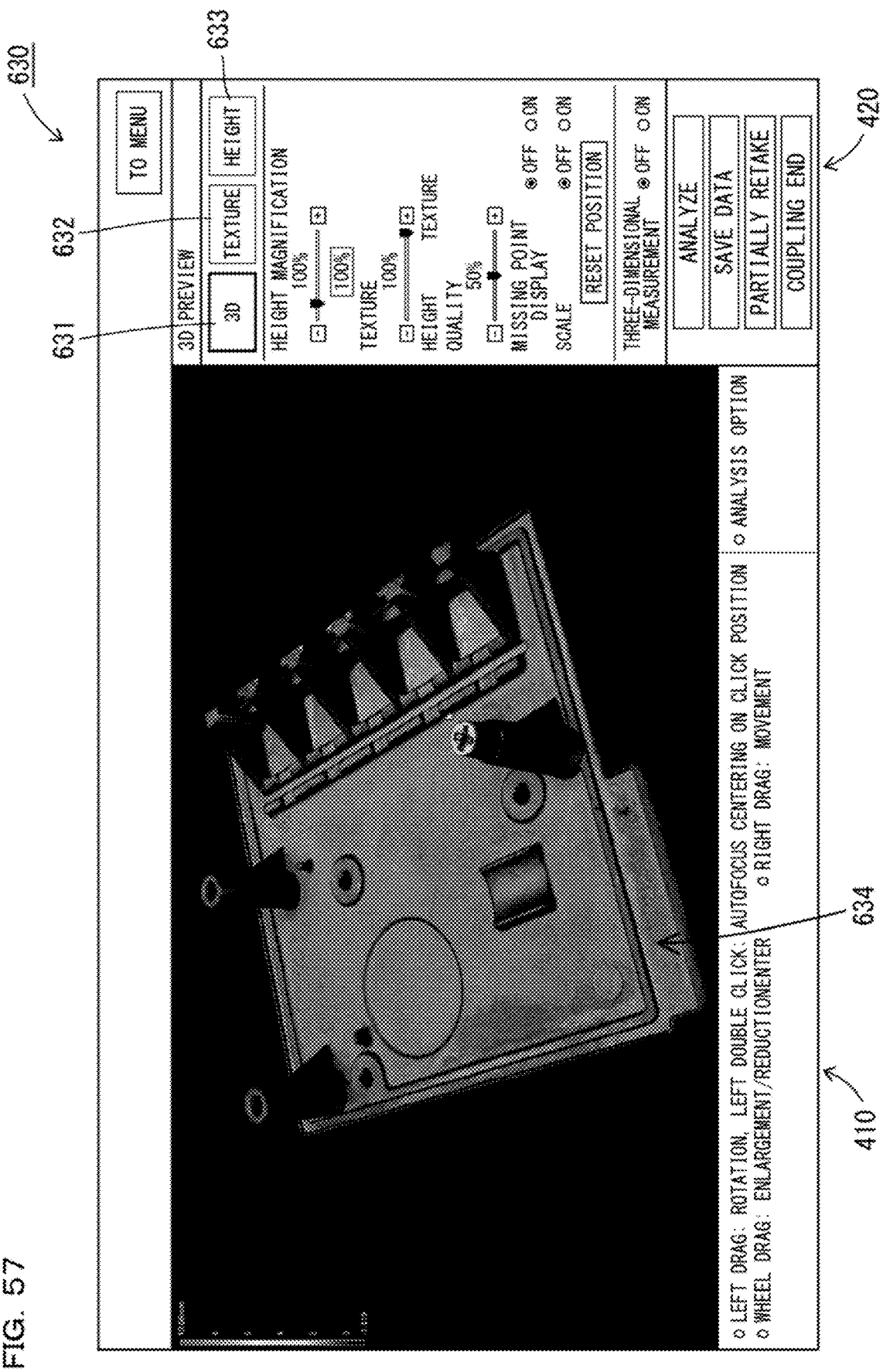
FIG. 57 is an image diagram showing a 3D preview screen.
Figure 58:
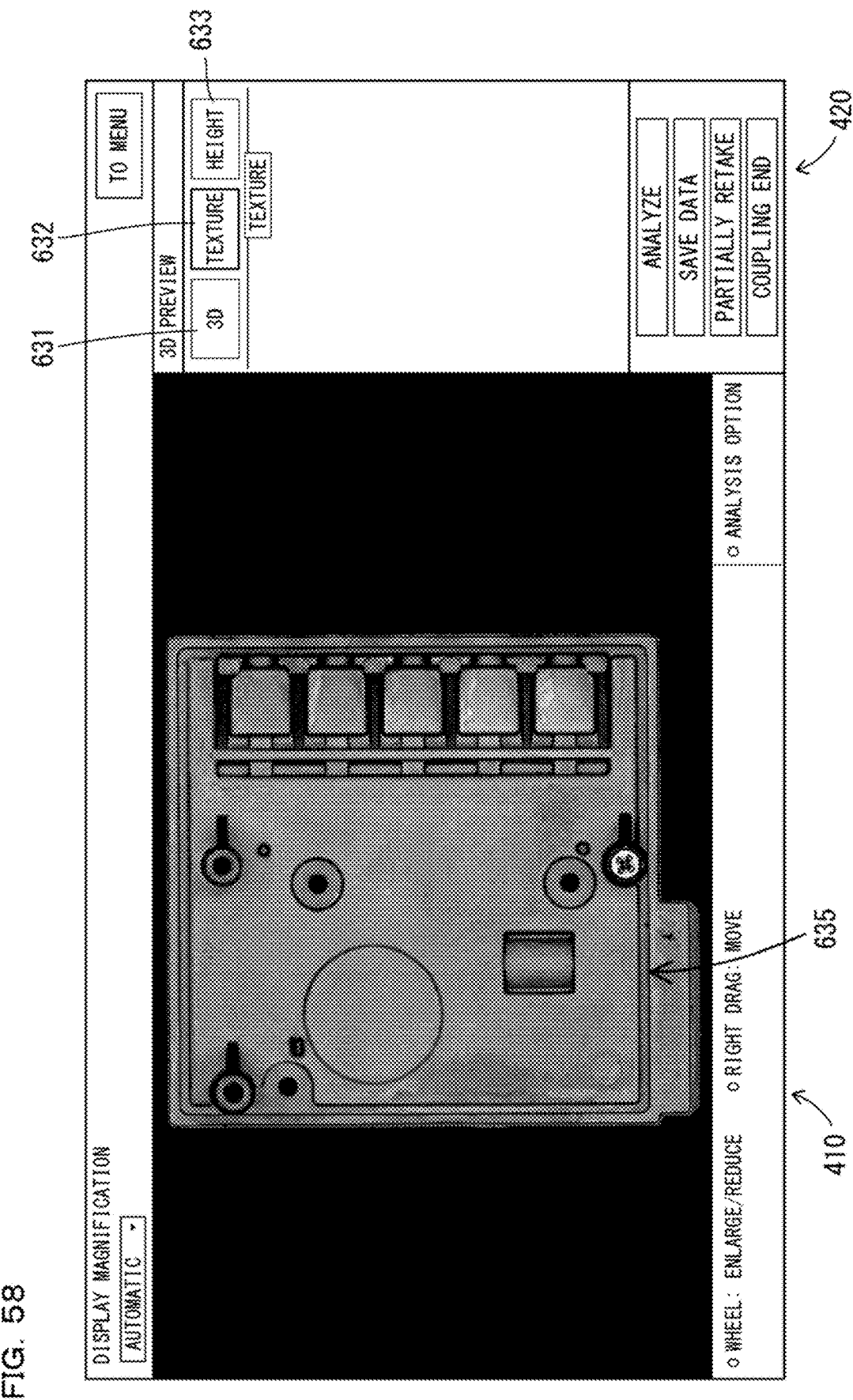
FIG. 58 is an image diagram showing a texture image preview screen.
Figure 59:
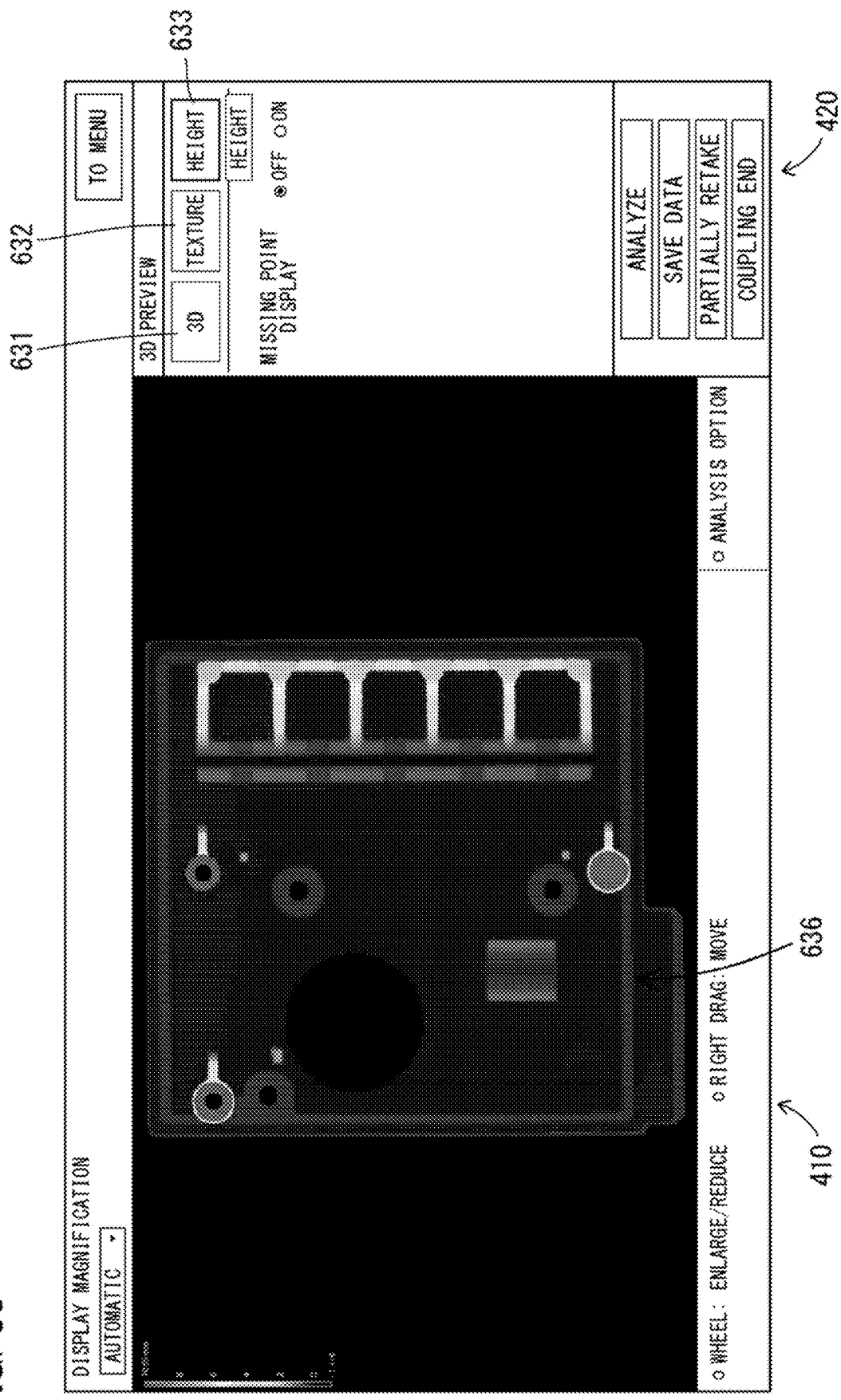
FIG. 59 is an image diagram showing a height image preview screen.

Further, the user can also set a mask region where imaging is not performed. The user can check an "excluded region designation" field 628 and designate an excluded region in the image display region 410 in a rectangular shape. When ending the setting of the XY-coupled region in this way, the user presses an OK button 629 and returns to the 3D measurement screen 600 shown in FIG. 55. In this state, the navigation image and a set measuring instrument are displayed on the measurement-region setting window 602. When the user presses a "measurement" button 606 in this state, generation of a coupled height image (a map image) is started as shown in FIG. 56. When the coupled height image is generated, a 3D preview screen 630 is displayed as shown in FIG. 57. In this state, the user can optionally adjust the position, the posture, the magnification, and the like of a coupled height image 634 displayed in the image display region 410. When the user switches a "3D" button 631 to a "texture" button 632 provided in an upper part of the operation region 420, the coupled height image is switched to a texture image 635 as shown in FIG. 58. When the user presses a "height" button 633, the texture image 635 is switched to a height image 636 as shown in FIG. 59. In this way, it is possible to generate coupled stereoscopic shape data having height information. Therefore, it is possible to operate an analysis, saving of image data, partial retaking, or the like according to necessity.

Further, such image XY coupling processing can also be automatically performed other than being manually performed. For example, the shape measuring device performs, with the control section, partial-region setting processing for automatically setting a plurality of partial regions on the XY plane as a unit for performing imaging with the light receiving section on the navigation image displayed on the display section. For each of the partial regions set in the partial-region setting processing, as coupled-image generation processing, the shape measuring device generates three-dimensional stereoscopic shape data on the basis of images of the measurement object photographed by the photographing processing and couples stereoscopic shape data adjacent to one another to generate coupled stereoscopic shape data in coupled-image generation processing.

The storing section 240 is a member for saving various data and storing setting values. A semiconductor storage device or the like can be used as the storing section 240. The storing section 240 includes a height-image storing section 241 that saves a height image, a texture-image storing section 242 that saves a texture image, and a measurement-setting saving section 243 for saving measurement setting of partial regions adjusted by the measurement-setting automatically adjusting section 217.

The display section 400 is a member for displaying an acquired image or the like. For example, an LCD, an organic EL, or a CRT can be used as the display section 400.

The operation device 450 is a member for receiving, for example, an input of the user. An input device such as a mouse, a keyboard, or a console can be used as the operation device 450. By using a touch panel in the display section 400, the display section 400 can also be used as an operation device.

Block Diagram

Figure 4:
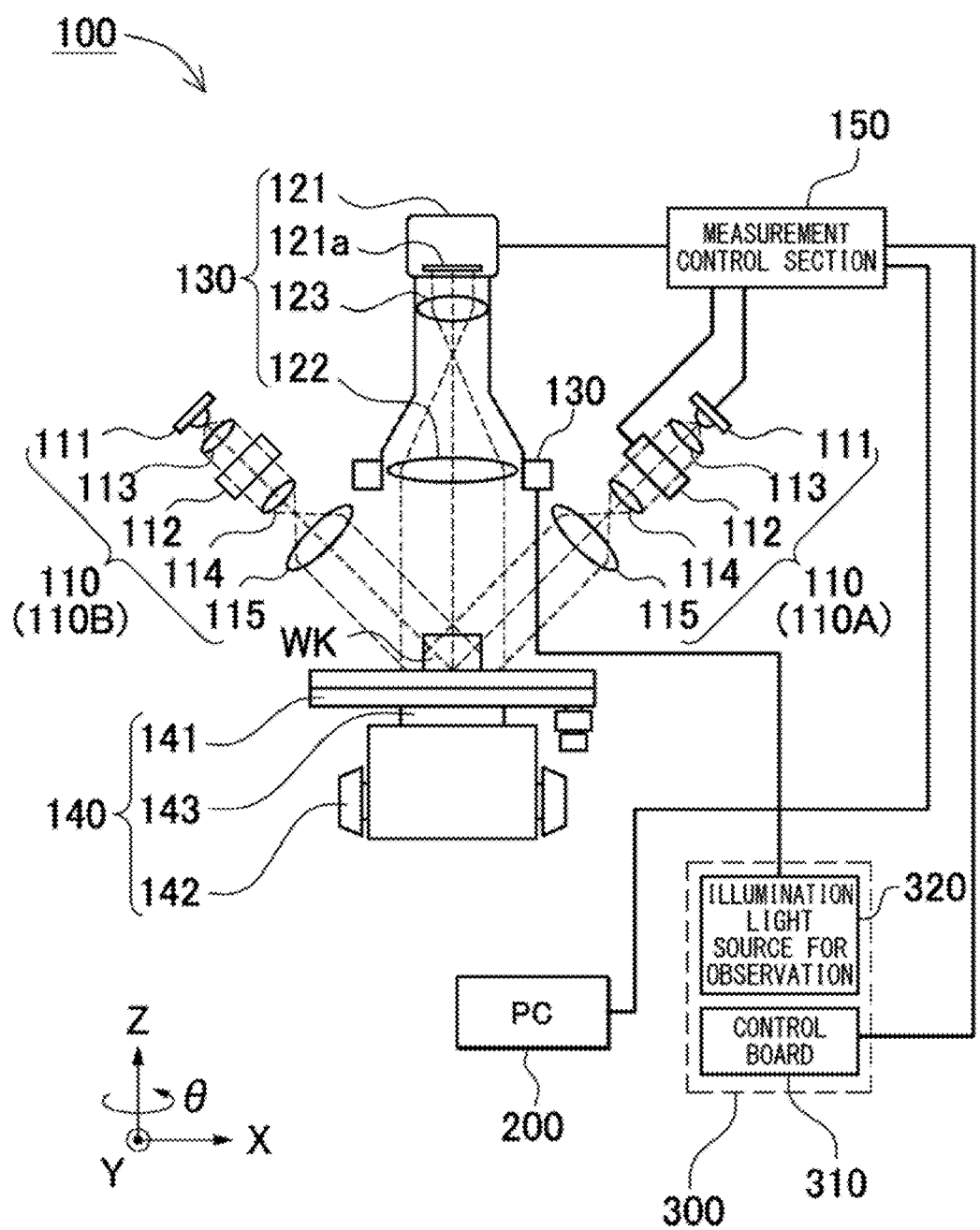
FIG. 4 is a block diagram showing the configuration of an imaging section shown in FIG. 1.

A configuration example of the imaging section 100 of the shape measuring device 500 shown in FIG. 1 is shown in a block diagram of FIG. 4. The imaging section 100 includes the light projecting section 110, the light receiving section 120, an illumination-light output section 130, the stage 140, and the measurement control section 150. The light projecting section 110 includes a measurement light source 111, a pattern generating section 112, and a plurality of lenses 113, 114, and 115. The light receiving section 120 includes a camera 121 and a plurality of lenses 122 and 123. The measurement object WK is placed on the stage 140.

Light Projecting Section 110

The light projecting section 110 is disposed obliquely above the stage 140. The imaging section 100 may include a plurality of light projecting sections 110. In the example shown in FIG. 4, the imaging section 100 includes two light projecting sections 110. A first light projecting section 110A (on the right side in FIG. 4) capable of irradiating pattern line on the measurement object WK from a first direction and a second light projecting section 110B (on the left side in FIG. 4) capable of irradiating pattern light on the measurement object WK from a second direction different from the first direction are respective disposed. The first light projecting section 110A and the second light projecting section 110B are symmetrically disposed across the optical axis of the light receiving section 120. Three or more light projecting sections may be provided or only one light projecting section may be provided.

Alternatively, it is also possible to project light while varying a direction of illumination by relatively moving the light projecting section and the stage. Further, in the example shown in FIG. 4, an irradiation angle of illumination light projected by the projecting section 110 with respect to the vertical direction is fixed. However, the irradiation angle can be varied.

The light receiving section 120 shown in FIG. 4 receives first pattern light irradiated from the first light projecting section 110A and reflected from the measurement object WK and outputs first light reception data. On the other hand, the light receiving section 120 receives second pattern light irradiated from the second light projecting section 110B and reflected from the measurement object WK and outputs second light reception data. The light reception data output by the light receiving section 120 is, for example, a stripe image based on a fringe projection method.

The stereoscopic-shape-data acquiring section 212, which receives the light reception data, generates a first height image of the measurement object WK on the basis of the first light reception data received by the light receiving section 120. On the other hand, the stereoscopic-shape-data acquiring section 212 generates a second height image of the measurement object WK on the basis of the second light reception data received by the light receiving section 120.

Depth Measurement Range

In a stage plane on which an imaging visual field of the light receiving section 120 is located on the stage 140, a common height range in which the first pattern light and the second pattern light can be respectively irradiated from the first light projecting section 110A and the second light projecting section 110B is set as a depth measurement range. The synthesis processing section 216 combines the first height image and the second height image having stereoscopic shape data in the depth measurement range and generates a synthesized height image.

Depth Search Range

On the other hand, in the stage plane of the light receiving section 120 on the stage 140, a height range including a region in which the first pattern light or the second pattern light can be irradiated only from one of the first light projecting section 110A and the second light projecting section 110B is set as a depth search range. The determination processing section 214 can set, as a determination condition, a condition that a surface region of the measurement object WK is present in the depth search range.

Measurement Light Source 111

The measurement light source 111 of each of the first light projecting section 110A and the second light projecting section 110B is, for example, a halogen lamp that emits white light. The measurement light source 111 may be another light source such as a white LED (light emitting diode) that emits white light. Light emitted from the measurement light source 111 (hereinafter referred to as "measurement light") is appropriately condensed by the lens 113 and thereafter made incident on the pattern generating section 112.

The pattern generating section 112 is, for example, a DMD (digital micromirror device). The pattern generating section 112 may be an LCD (liquid crystal display), an LCOS (liquid crystal on silicon: reflective liquid crystal device), or a mask. The measurement light made incident on the pattern generating section 112 is converted into a pattern set in advance and intensity (brightness) set in advance and emitted. The measurement light emitted by the pattern generating section 112 is converted into light having a diameter larger than an observable and measurable visual field of the light receiving section 120 by the plurality of lenses 114 and 115 and thereafter irradiated on the measurement object WK on the stage 140.

Disposition shown in FIG. 4 is an example. The disposition of the optical system members can be changed as appropriate. For example, the pattern generating section 112 may be disposed on an emission surface side of the lens 115.

Light Receiving Section 120

The light receiving section 120 is disposed above the stage 140. The measurement light reflected to above the stage 140 by the measurement object WK is condensed and focused by the plurality of lenses 122 and 123 of the light receiving section 120 and thereafter received by the camera 121.

Camera 121

The camera 121 is, for example, a CCD (charge coupled device) camera including an imaging element 121a and a lens. The imaging element 121a is, for example, a monochrome CCD (charge coupled device). The imaging element 121a may be another imaging element such as a CMOS (complementary metal oxide semiconductor) image sensor. In a color imaging element, pixels need to be associated with received lights for red, green, and blue. Therefore, measurement resolution is low compared with a monochrome imaging element. Since color filters need to be provided in the pixels, sensitivity decreases. Therefore, in this embodiment, the monochrome CCD is adopted as the imaging element. A color image is acquired by irradiating, in a time division manner, lights respectively corresponding to R, G, and B from the illumination-light output section 130 to perform imaging. With such a configuration, it is possible to acquire a color image of a measurement object without deteriorating measurement accuracy.

However, it goes without saying that the color imaging element may be used. In this case, although the measurement accuracy and the sensitivity are deteriorated, it is unnecessary to irradiate, in a time division manner, the lights respectively corresponding to R, G, and B from the illumination-light output section 130. A color image can be acquired by simply irradiating the white light. Therefore, the illumination optical system can be simply configured. Analog electric signals corresponding to a light reception amount (hereinafter referred to as "light reception signals") are output from the pixels of the imaging element 121a to the measurement control section 150.

Measurement Control Section 150

An A/D converter (analog/digital converter) and an FIFO (first in first out) memory are mounted on the measurement control section 150. A light reception signal output from the camera 121 is sampled at a predetermined sampling cycle by the A/D converter of the measurement control section 150 and converted into a digital signal on the basis of control by the light source section 300. Digital signals output from the A/D converter are sequentially accumulated in the FIFO memory. The digital signals accumulated in the FIFO memory are sequentially transferred to the control section 200 as pixel data.

Control Section 200

As shown in FIG. 1, the control section 200 includes a CPU (central processing unit) 210, a ROM (read only memory) 220, a work memory 230, a storing section 240, and a setting section 250. As the control section 200, a computer such as a PC (personal computer) or a work station can be used. A dedicated controller may be prepared. Alternatively, the control section 200 may be constructed by combining a general-purpose computer and the dedicated controller. In this example, the control section 200 is configured by a computer installed with a shape measuring program.

The setting section 250 is operated by the operation device 450. The operation device 450 includes a keyboard and a pointing device. As the pointing device, a mouse, a joystick, or the like is used. The operation device 450 can be integrated with the display section 400. For example, by using a touch panel in the display section 400, it is possible to impart a function of an operation section to the display section 400.

A system program is stored in the ROM 220. The work memory includes a RAM (random access memory) and used for processing of various data. The storing section 240 includes a hard disk. An image processing program and a shape measuring program are stored in the storing section 240. The storing section 240 is used for saving various data such as pixel data given from the measurement control section 150.

The CPU 210 generates image data on the basis of the pixel data given from the measurement control section 150. The CPU 210 performs various kinds of processing on the generated image data using the work memory 230 and causes the display section 400 to display an image based on the image data. Further, the CPU 210 gives a driving pulse to a stage driving section 145 explained below. Further, the CPU 210 realizes functions of the stereoscopic-shape-data generating section 212, the determination processing section 214, the synthesis processing section 216, the three-dimensional-image synthesizing section 213, and the depth-expansion processing section 215.

Display Section 400

The display section 400 is a member for displaying a measurement image acquired by the imaging section 100 and a captured observation image. The display section 400 is configured by, for example, an LCD panel or an organic EL (electroluminescence) panel.

Stage 140

The stage 140 is a member for placing the measurement object WK on the upper surface thereof. The stage 140 includes, as shown in FIG. 1, a stage operation section 144 for the user to manually move the stage 140 and the stage driving section 145 for electrically moving the stage 140.

In FIG. 4, two directions orthogonal to each other in a plane on the stage 140 on which the measurement object WK is placed (hereinafter referred to as "placement surface") are defined as an X direction and a Y direction and respectively indicated by arrows X and Y. A direction orthogonal to the placement surface of the stage 140 is defined as a Z direction and indicated by an arrow Z. A direction of rotation around an axis parallel to the Z direction is defined as a θ direction and indicated by an arrow θ. A rotation axis of a θ stage does not need to be parallel to an optical axis parallel to the Z direction and may be, for example, inclined 45° with respect to the optical axis.

The stage 140 include an XY stage 141, a Z stage 142, and a θ stage 143. The XY stage 141 includes an X-direction moving mechanism and a Y-direction moving mechanism as a stage-plane-direction driving section. The Z stage 142 includes a Z-direction moving mechanism. The θ stage 143 includes a θ-direction rotating mechanism. The stage 140 is configured by the XY stage 141, the Z stage 142, and the θ stage 143. The stage 140 further includes a fixing member (a clamp) that fixes the measurement object WK to the placement surface. The stage 140 may further include a tilt stage including a mechanism capable of rotating around an axis parallel to the placement surface.

Stepping motors are respectively used in the X-direction moving mechanism, the Y-direction moving mechanism, the Z-direction moving mechanism, and the θ-direction rotating mechanism of the stage 140. The X-direction moving mechanism, the Y-direction moving mechanism, the Z-direction moving mechanism, and the θ-direction rotating mechanism of the stage 140 are driven by the stage operation section 144 or the stage driving section 145 shown in FIG. 1.

The user can relatively move the placement surface of the stage 140 in the X direction, the Y direction, or the Z direction with respect to the light receiving section 120 or rotate the placement surface of the stage 140 in the θ direction by manually operating the stage operation section 144. The stage driving section 145 can relatively move the stage 140 in the X direction, the Y direction, or the Z direction with respect to the light receiving section 120 or rotate the stage 140 in the θ direction by supplying an electric current to the stepping motors of the stage 140 on the basis of a driving pulse given from the control section 200.

As shown in FIG. 4, a relative positional relation among the light receiving section 120, the light projecting section 110, and the stage 140 is decided such that the center axes of the left and right light projecting sections 110 and the center axis of the light receiving section 120 cross one another on a focus plane on which the stage 140 comes into focus most. The center of a rotation axis in the θ direction coincides with the center axis of the light receiving section 120. Therefore, when the stage 140 is rotated in the θ direction, the measurement object WK does not move out of a visual field and rotates in the visual field around the rotation axis. The X, Y, and θ and tilt moving mechanisms are supported with respect to the Z-direction moving mechanism. That is, even in a state in which the stage 140 is rotated in the θ direction or tilted, deviation does not occur between the center axis of the light receiving section 120 and the moving axis in the Z direction. With such a stage mechanism, even in a state in which the position and the posture of the measurement object WK are changed, it is possible to move the stage 140 in the Z direction and capture a plurality of images in different focal positions and combine the images. In this embodiment, the electric stage that can be driven by the stepping motors is explained as the example. However, the stage 140 may be a manual stage that can be only manually moved.

Light Source Section 300

The light source section 300 includes a control board 310 and an illumination light source for observation 320. A CPU is mounted on the control board 310. The CPU of the control board 310 controls the light projecting section 110, the light receiving section 120, the measurement control section 150 on the basis of a command from the CPU 210 of the control section 200. This configuration is an example. Other configurations may be adopted. For example, the light projecting section 110 and the light receiving section 120 may be controlled by the measurement control section 150 or the light projecting section 110 and the light receiving section 120 may be controlled by the control section 200 and the control board may be omitted. Alternatively, a power circuit for driving the imaging section 100 may be provided in the light source section 300.

Illumination Light Source for Observation 320

The illumination light source for observation 320 includes, for example, LEDs of three colors that emit red light, green light, and blue light. Light of any color can be generated from the illumination light source for observation 320 by controlling illuminance of the lights emitted from the LEDs. The light generated from the illumination light source for observation 320 (hereinafter referred to as "illumination light") is output from the illumination-light output section 130 of the imaging section 100 through a light guide member (a light guide).

The illumination light output from the illumination-light output section 130 is irradiated on the measurement object WK while being switched to the red light, the green light, and the blue light in a time division manner. Consequently, it is possible to combine observation images respectively captured by the R, G, and B lights, obtain a color observation image, and cause the display section 400 to display the color observation image.

When the color observation image is displayed in this way, if a switching frequency for switching the color of the illumination light is matched with a frame rate at the time when display content is updated (a screen is rewritten) on the display section 400, flickering becomes conspicuous when the frame rate is low (e.g., approximately several hertz). In particular, if color switching by the primary colors of R, G, and B is conspicuous, an unpleasant feeling is sometimes given to the user. Therefore, such a problem can be avoided by setting the switching frequency for switching the illumination lights of R, G, and B to a high frequency (e.g., several hundred hertz) that the user cannot recognize. The switching of the colors of the illumination light is performed by the illumination-light output section 130 or the like. Although R, G, and B of the illumination light is switched at high speed, timing for actually imaging the measurement object WK with the imaging section 100 is set to timing of the update of the display content on the display section 400. That is, it is unnecessary to completely match the timing of the imaging of the observation image and the timing of the switching of the illumination light. The timings can be matched by being linked to a degree for enabling imaging of the observation images of R, G, and B by the imaging element, in other words, such that a switching cycle of R, G, and B of the illumination light is a multiple of an imaging cycle. With this method, it is possible to accelerate the timing of the switching of the illumination light. It is possible to reduce the unpleasant feeling given to the user without improving a frame rate that can be processed by the imaging element 121*a*.

In the example shown in FIG. 1, the illumination light source for observation 320 is externally attached to the imaging section 100. The illumination light source for observation 320 is disposed in the light source section 300. Consequently, it is possible to avoid a situation in which heat generation of the illumination light source for observation 320 affects the optical system of the imaging section 100. However, it is also possible to provide an illumination light source for observation on the imaging section side by, for example, using an illumination light source for observation with a small heat value or providing an appropriate heat radiating mechanism on the imaging section side. In this case, it is possible to integrate the illumination-light output section and the illumination light source for observation, for example, incorporate the illumination light source for observation in the illumination-light output section. It is possible to make it unnecessary to provide the light guide member for optically connecting the light source section and the imaging section. It is possible to simplify a configuration. Similarly, concerning the light projecting section, the light source for projection can be incorporated in the imaging section or can be externally attached to the light source section side.

The illumination-light output section 130 shown in FIG. 4 has a ring shape and is disposed above the stage 140 to surround the light receiving section 120. Consequently, illumination light is irradiated on the measurement object WK from the illumination-light output section 130 not to form a shadow. Besides being ring-shaped ring illumination, the illumination-light output section 130 can be coaxial epi-illumination, side spot illumination, transmission illumination, or the like or can be a combination of these kinds of illumination. The illumination-light output section may be omitted by irradiating uniform light from the light projecting section 110 as the illumination light. For example, the light projecting section 110 can be used as the illumination-light output section as well by enabling white pattern image projection using a two-dimensional array. In this way, when the white pattern image projection of the two-dimensional array of the light projecting section 110 is used as the illumination light source for observation, a pixel grid of the two-dimensional array may be prevented from being reflected on the measurement object WK by projecting light, which is transmitted through or reflected on the two-dimensional array, on the measurement object WK through a diffusion plate.

Example of a GUI

Figure 5:
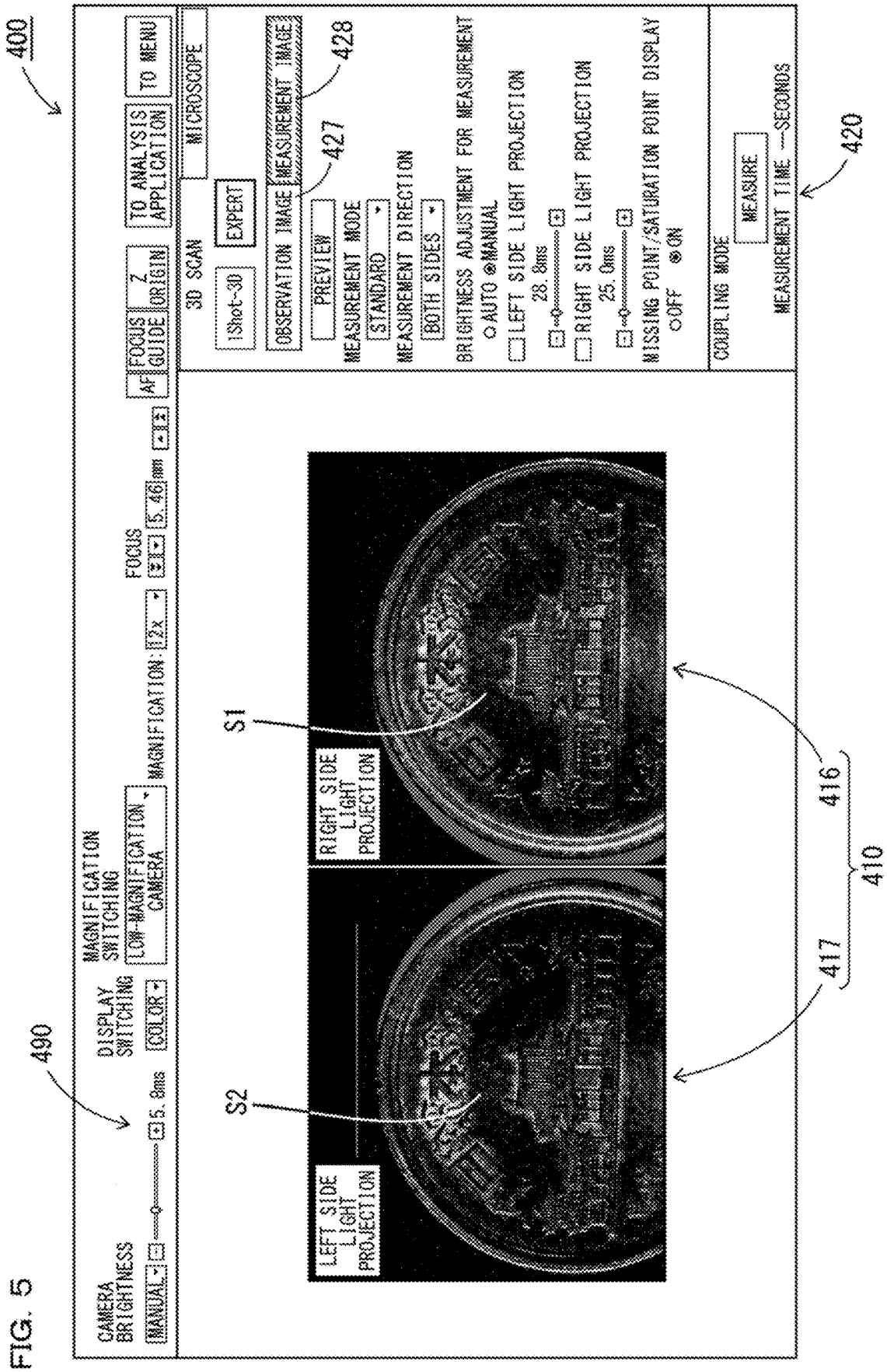
FIG. 5 is an image diagram showing an example of a GUI of a measurement microscope device operation program.

An operation program for operating the shape measuring device 500 is installed in a PC, which is the control section 200. A GUI (graphical user interface) for operating the shape measuring program is displayed on the display section 400. An example of such a GUI screen is shown in FIG. 5. In this example, a first measurement image S1 of the measurement object WK on which first measurement light is irradiated from the first light projecting section 110A and a second measurement image S2 of the measurement object WK on which second measurement light is irradiated from the second light projecting section 110B are displayed side by side on the display section 400. In this example, a first display region 416 is provided on the right side and a second display region 417 is provided on the left side of an image display region 410 provided on the left side of the display section 400. By adopting such two-screen display, it is possible to confirm states of measurement images obtained by the measurement lights, in particular, regions or the like forming shadows while comparing the states and the regions or the like. A division example of the image display regions is not limited to the configuration in which the image display regions are disposed side by side on the left and the right. Any configuration can be used as appropriate in which, for example, the image display regions are vertically disposed or the image display regions are configured as separate screens.

An image switching section capable of switching a displayed image to an observation image and a measurement image is provided in the operation program of the shape measuring device. In this example, when an "observation image" button 427 is pressed as the image switching section, an observation image captured using the illumination light source for observation is displayed in the image display region 410. When a "measurement image" button 428 is pressed, a measurement image acquired using a measurement-light projecting section is displayed in the image display region 410. The user can change the brightness of the measurement lights emitted from the first light projecting section 110A and the second light projecting section 110B or camera exposure times corresponding to the first light projecting section 110A and the second light projecting section 110B by operating, with the operation device 450 of the control section 200 shown in FIG. 1, an operation region 420 provided in the GUI and performing, for example, brightness adjustment. Parameters for changing the brightness of the illumination lights are the camera exposure times. Imaging conditions of the observation image are set according to necessity. An observation-image-capturing-condition setting section 490 for setting such imaging conditions of the observation image is provided in an upper part of the image display region 410 shown in FIG. 5. The observation-image-capturing-condition setting section 490 includes setting of, for example, shutter speed switching for capturing the observation image, magnification of the imaging, and focus adjustment. In the example shown in FIG. 5, the brightness of the imaging section is selected from "auto" and "manual". When the "manual" is selected, the brightness of the imaging section is adjusted by a camera brightness adjustment slider.

As explained above, in the image display region 410, images of the measurement object WK in the case in which the measurement lights are respectively irradiated by the first light projecting section 110A and the second light projecting section 110B are displayed side by side. Therefore, the user can appropriately adjust the brightness of the measurement lights respectively emitted from the first light projecting section 110A and the second light projecting section 110B or the camera exposure times corresponding to the respective light projecting sections 110 by respectively moving the positions of brightness adjustment sliders 444 and 446 while viewing the images of the measurement object WK displayed in the image display region 410.

A correlation is sometimes present between appropriate brightness of the measurement lights emitted from the first light projecting section 110A and the second light projecting section 110B and appropriate brightness of the illumination light emitted from the illumination-light output section 130 or camera exposure times corresponding to the respective light projecting sections 110. In this case, the brightness of the measurement lights respectively emitted from the first light projecting section 110A and the second light projecting section 110B or the camera exposure times corresponding to the respective light projecting sections 110 may be automatically adjusted on the basis of the brightness of the illumination light emitted from the illumination-light output section 130 or the camera exposure time corresponding to the illumination light.

Alternatively, an adjustment guide for appropriately adjusting the brightness of the measurement lights respectively emitted from the first light projecting section 110A and the second light projecting section 110B or the camera exposure times corresponding to the respective light projecting sections 110 on the basis of the brightness of the illumination light emitted from the illumination-light output section 130 or the camera exposure time corresponding to the illumination light may be displayed on the display section 400. In this case, the user can appropriately adjust the brightness of the measurement lights respectively emitted from the first light projecting section 110A and the second light projecting section 110B or the camera exposure times corresponding to the respective light projecting sections 110 by respectively moving the positions of the brightness adjustment sliders 444 and 446 on the basis of the adjustment guide.

If an irradiating direction of light is different, a reflecting direction of the light is also different. Therefore, the brightness of an image obtained as a result is different depending on the irradiating direction of the light even in the same part. That is, the brightness of measurement light suitable for measurement and an exposure time of the imaging element are different depending on the irradiating direction. In this embodiment, it is possible to set appropriate brightness of the measurement lights or appropriate exposure times for each of irradiating directions by making it possible to individually adjust the brightness of respective images captured by irradiating lights from the plurality of first and second light projecting sections 110A and 110B. An image, the brightness of which is being adjusted, is displayed while being updated in the image display region 410. Therefore, it is possible to adjust the brightness while confirming the image after the adjustment. In this case, it is also possible to more clearly indicate whether the brightness can be appropriately adjusted for the user by distinguishably displaying a portion of white void due to excessive brightness and a portion of black solid due to excessive darkness in the image displayed in the image display region 410.

Telecentric Both Side Light Projecting Optical System

Figure 6:
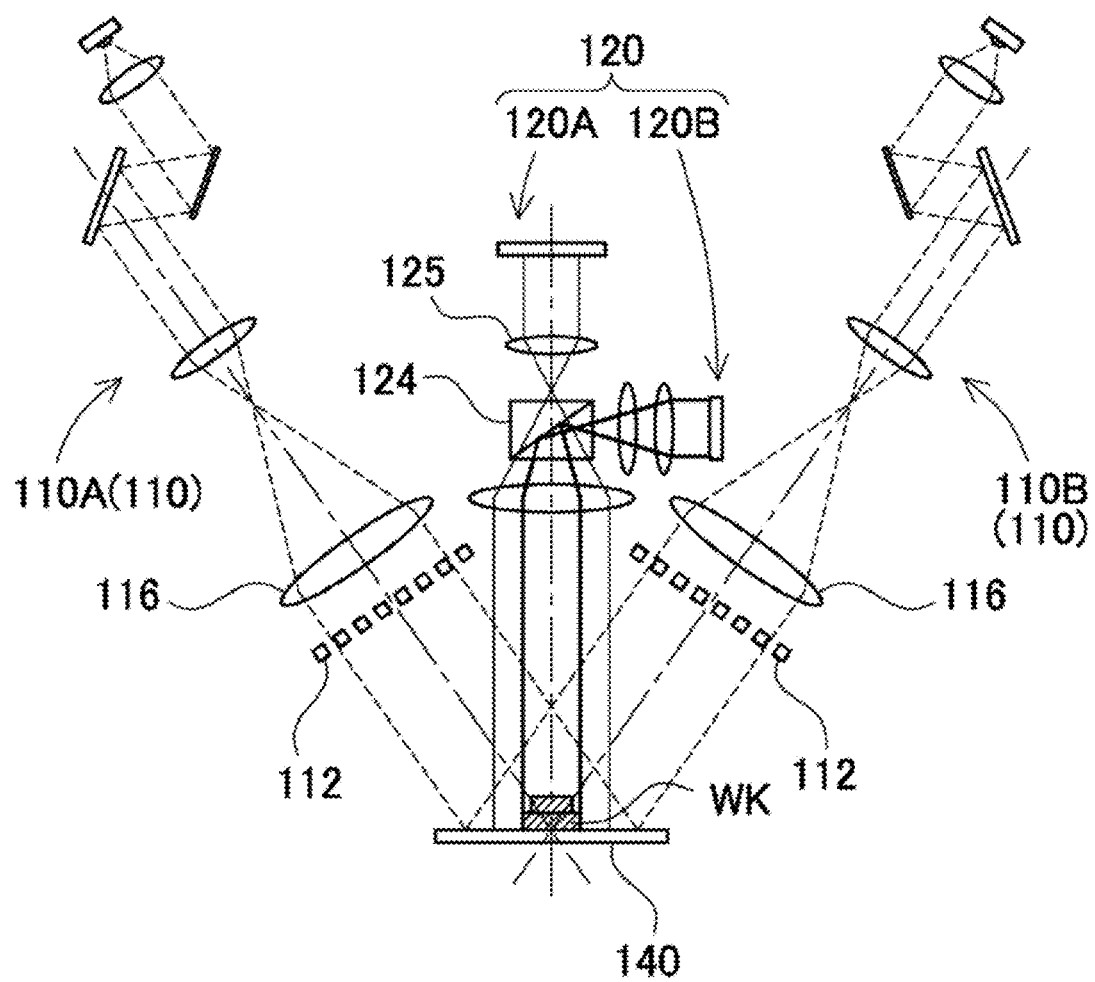
FIG. 6 is a schematic diagram showing an optical system of telecentric both side light projection.

A schematic diagram of a telecentric both side light projecting optical system is shown in FIG. 6. As shown in FIG. 6, a right light projecting optical system configured by the first light projecting section 110A and a left light projecting optical system configured by the second light projecting section 110B are respectively disposed as light projecting optical systems configuring the light projecting section 110 that projects light on the measurement object WK placed on the stage 140. By providing the light projecting optical systems respectively on the left and the right, there are advantages such as a reduction of a region where pattern light forms a shadow to disable measurement.

On the other hand, a light receiving optical system configuring the light receiving section 120 includes an imaging element for low magnification 120A and an imaging element for high magnification 120B. A bifurcation both side telecentric light receiving lens 125 is provided above a prism 124 in the center. The imaging element for high magnification 120B is disposed on the right side of the prism 124. As shown in FIG. 6, the light projecting optical system irradiates light more widely than a visual field.

The light receiving optical system is configured by a light receiving lens and a camera unit. With priority given to accuracy, the light receiving lens is a telecentric optical system having fixed magnification. However, the light receiving lens may be a zoom lens and cover wide magnification. The shape measuring device adopts a bifurcation fixed focus both side telecentric optical system. The shape measuring device includes two cameras, that is, a camera for low magnification and a camera for high magnification. Consequently, it is possible to change magnification through electric switching rather than mechanical switching for a zoom lens. It is possible to realize stable measurement performance without occurrence of measurement accuracy deviation or the like due to mechanical positioning accuracy.

A measurement range by left and right both side light projection is explained with reference to a schematic diagram of FIG. 7. The shape measuring device is configured to be capable of projecting pattern light in directions symmetrical across the light receiving lens in order to minimize a shadow region (an unmeasurable region). Pattern light projecting optical systems are respectively disposed on the left and the right.

As the light receiving lens, the bifurcation both side telecentric light receiving lens 125 is adopted. It is possible to acquire an image without a magnification change due to the height of the measurement object WK and without distortion when viewed from right above. When combined with the configuration of the both side telecentric light projecting lens, an effect of simplifying measurement setting, that is, fixing a light projecting and receiving angle anywhere in a visual field is exerted. As shown in FIG. 7, the bifurcation both side telecentric light receiving lens 125 has a visual field where two magnifications are coaxial. There is an advantage that visual field adjustment can be made unnecessary even if magnification is switched.

Two-dimensional pattern lights are irradiated on the measurement object WK from the left and right light projecting lenses 116 as parallel light beams at equal light projecting angles on the left and the right. Examples of an advantage of symmetrically irradiating the two-dimensional pattern lights across the light receiving lens from the left and the right include not only the effect of minimizing a shadow explained above but also an effect that, for example, it is possible to reduce errors, which respectively occur on the left and the right, by combining respective measurement results on the left and the right (e.g., average processing).

Figure 7:
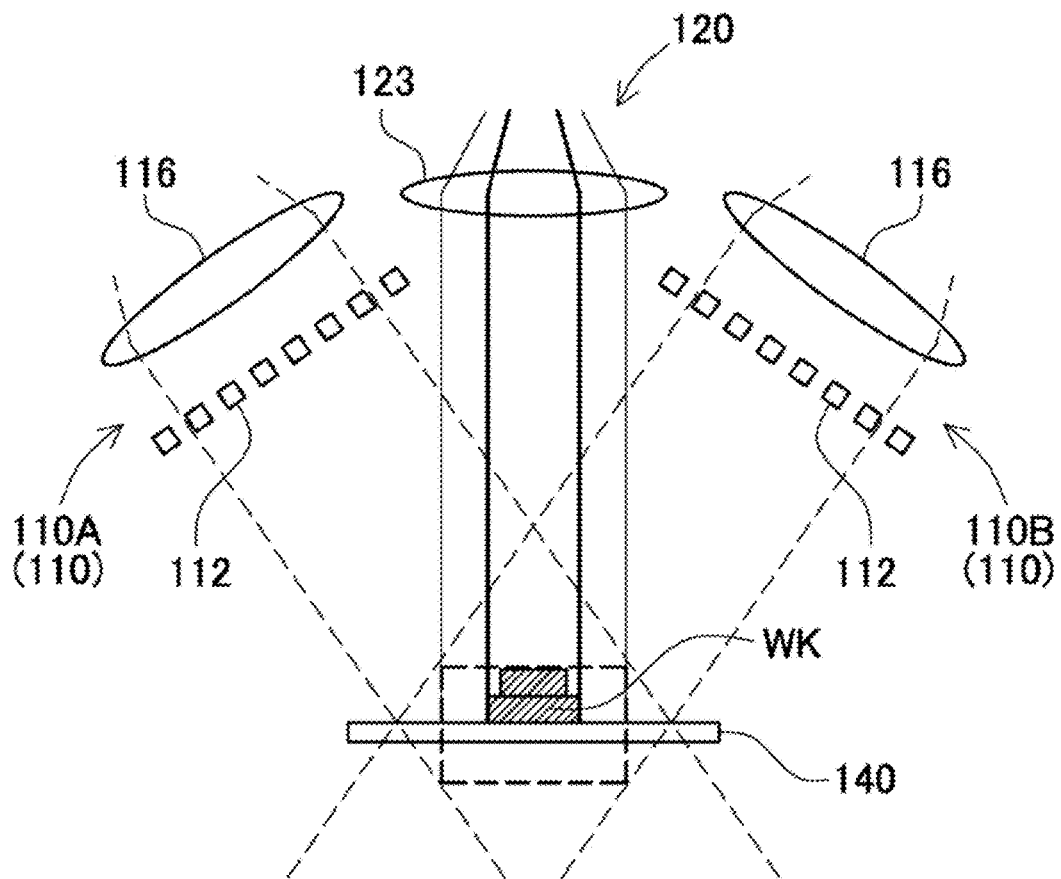
FIG. 7 is a schematic diagram showing a relation between left and right light projection and a measurement range.

As shown in the schematic diagram of FIG. 7, in a relation between left and right light projection and a measurement range, the breadth of a measurement visual field (in the XY direction) is determined by the width of the light beam of the light receiving lens (the width of a beam indicated by a thin line (low magnification) or a thick line (high magnification) in FIG. 7). A range of height measurement using one set of pattern projections is determined from relationship between light projection and light reception. Like a region of a dotted line frame in FIG. 7, a depth measurement range is defined as a common region of a received light beam and projected light beams from the left and the right. That is, the common region of the left and right projected light irradiations indicated by the dotted line frames indicates a range of measurable height. By determining the depth measurement range in this way, irradiation of lights from the left and the right is uniform irrespective of where the irradiation of the lights is measured in the depth measurement range. An effect of stabilizing measurement by averaging measurements on the left and the right can be realized in the entire region of the depth measurement range.

XY Stage 141

The XY stage 141 includes an inclination sensor and the stage driving section 145 (a microcomputer, an FPGA, and a motor driver) on the inside. The XY stage 141 is electrically connected to the stage driving section 145 on the inside of the base housing 149 through the stage supporting section 152. The electric connection of the stage supporting section 152 and the XY stage 141 is configured by a connector. Consequently, the XY stage 141 is configured to be detachably attachable. The XY stage 141 can be changed to a different visual field adjustment stage such as a tilt/rotation stage.

Flow of Measurement by the Fringe Projection Method

An overview of a flow of operation for measuring a shape is explained with reference to FIG. 4. It is assumed that the entire following explanation is explanation in "one-shot measurement" in which the Z stage 142 is fixed in the height direction.

First, the user places the measurement object WK, which the user desires to measure, on the stage 140 and adjusts, with an illumination-condition adjusting section, a focus, a visual field position, brightness, and the like while viewing an optical image projected on the display section 400. Ring illumination is used as the illumination-light output section 130. However, the illumination-light output section 130 is not limited to the ring illumination. For example, uniform illumination light may be irradiated from the light projecting section 110 configuring a light-projecting-system illumination section.

Subsequently, the user switches the illumination light from the ring illumination to the light projecting section 110 and adjusts the brightness of light projecting system illumination light. Since the illumination light by the light projecting section 110 is obliquely irradiated, a shadow due to the shape of the measurement object WK is formed. Depending on a surface state of the measurement object WK, the measurement object WK is seen better when the illumination light is inclined more or less. To incline the illumination light, for example, a tilt stage capable of inclining the stage 140 is used or an inclining mechanism is provided in the light projecting section 110. To prevent the influence of the shadow of the illumination light and the surface state, the user readjusts the position and the posture of the measurement object WK according to necessity.

In such an adjusting process in the light projecting section 110, when the measurement object WK is moved, the user switches the illumination light to the ring illumination again and performs, for example, confirmation of how the measurement object WK is seen in the ring illumination light and readjustment of the brightness of the ring illumination light. This work can be omitted if unnecessary.

When the posture, the position, the focus, and an illumination condition for measurement of the measurement object WK are decided, the control section 200 transmits a command for a measurement start to the measurement control section 150. The control section 200 is configured by the computer installed with the shape measuring program as explained above. Receiving the command, the measurement control section 150 synchronously controls a pattern generating unit in the light projecting section 110 and the imaging section 100, acquires, with the imaging section 100, a plurality of images of the measurement object WK while projecting a plurality of patterns, applies appropriate processing to the control board 310, and thereafter transmits image data to the control section 200.

Generation of a Height Image

The image data received by the control section 200 is appropriately processed and analyzed by a measurement algorithm in the shape measuring program. Stereoscopic shape data is generated. Specifically, a height image having height information is generated by the height-image generating section 212b.

Generation of a Texture Image

On the other hand, the imaging section 100 irradiates illumination light on the measurement object WK and acquires a texture image, which is an image showing a surface state of the measurement object WK. For example, the imaging section 100 irradiates ring illumination on the measurement object WK or irradiates, from the light projecting section 110, a light projection pattern (totally white) with all pixels turned on to capture an optical image with uniform illumination light and form a texture image.

The texture image is not limited to one. A plurality of texture images may be captured. In this case, the plurality of texture images can be combined to generate an HDR (high dynamic range) image or a depth synthesis image. The HDR image is an image generated by capturing a plurality of texture images while changing an exposure time of a camera and thereafter performing high-dynamic range (HDR) combination of the texture images. When a level difference of a measurement target portion of the measurement object WK exceeds a depth of field, the depth synthesis image is an image synthesized by extracting only a focused portion out of observation images individually captured by varying a height direction.

Generation of a Synthesized Image

The obtained texture image is also transferred to the control section 200. The control section 200 combines the texture image and the height image to generate a synthesized image. For example, the control section 200 maps, with the shape measuring program, the texture image to the height image, which is the stereoscopic shape data, and generates synthesized image data with the three-dimensional-image synthesizing section. The synthesized image is displayed on the display section 400. In this state, desired measurement and analysis can be performed on the synthesized image.

Shape Measuring Method

Figure 9:
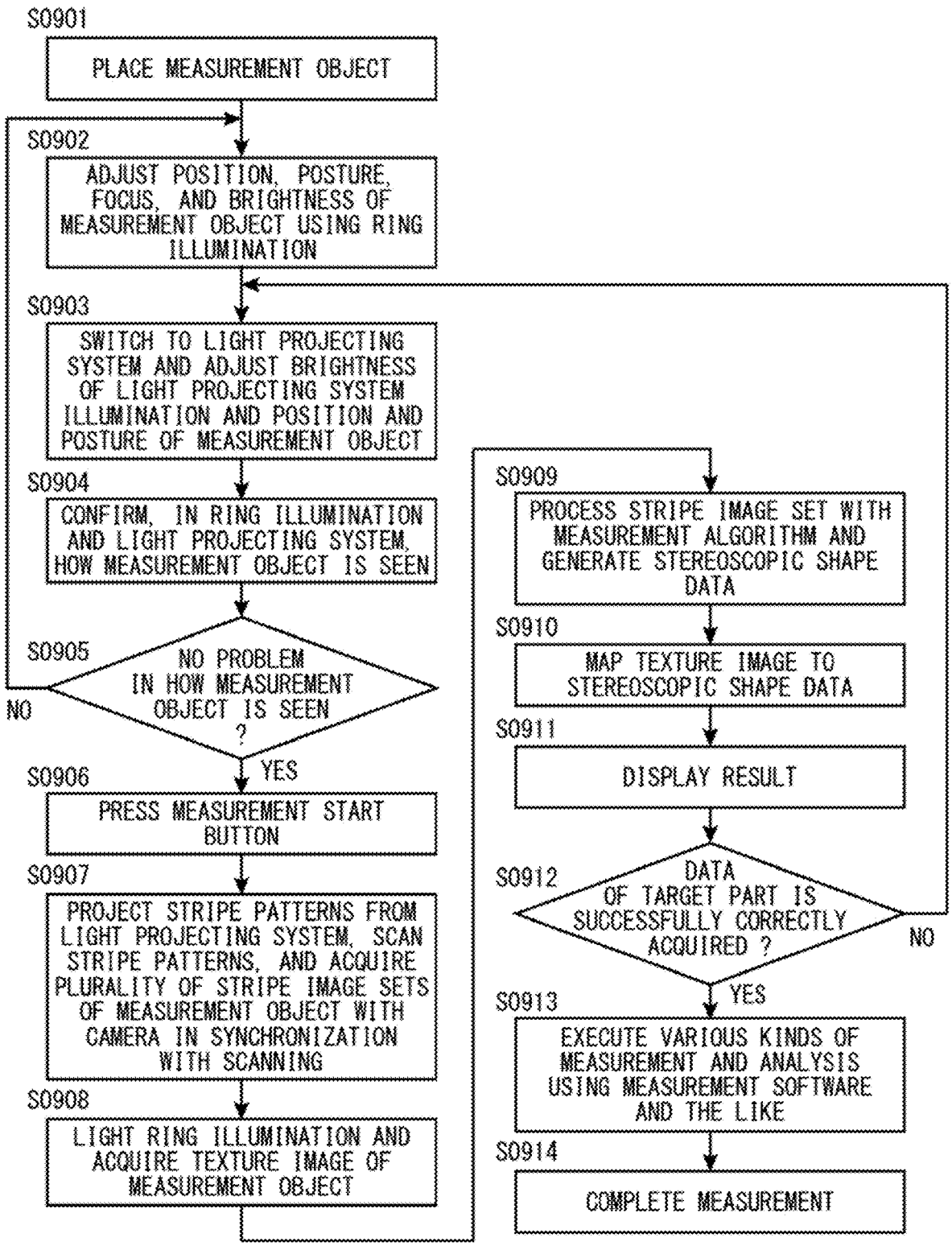
FIG. 9 is a flowchart showing a procedure of shape measurement.

A procedure for generating the synthesized image explained above and performing shape measurement is explained with reference to a flowchart of FIG. 9. First, in step S901, the user places the measurement object WK on the stage 140.

Subsequently, in step S902, the user adjusts the position, the posture, the focus, and the brightness of the measurement object WK using ring illumination.

In step S903, the user switches the ring illumination to the light projecting system and adjusts the brightness of the light projecting system illumination and the position and the posture of the measurement object WK.

In step S904, the user switches the light projecting system to the ring illumination, further switches the ring illumination to the light projecting system, and confirms how the measurement object WK is seen.

In step S905, the user confirms whether there is no problem in how the measurement object WK is seen. If there is a problem, the user returns to step S902 and repeats the processing explained above. On the other hand, if there is no problem, the user proceeds to step S906 and presses a measurement start button.

In step S907, the control section 200 projects stripe patterns from the light projecting section, scans the stripe patterns, and acquires a plurality of stripe images of the measurement object WK with a camera in synchronization with the scanning. The control section 200 may repeat this step a specified number of times for improvement of the left and right light projection, the HDR, and other performance. It is possible to reduce the influence of halation by, for example, changing an exposure time and projecting pattern light a plurality of times.

In step S908, the control section 200 lights the ring illumination and acquires a texture image of the measurement object WK.

In step S909, the control section 200 processes a stripe image set with a measurement algorithm and generates stereoscopic shape data.

In step S910, the control section 200 maps the texture image to the stereoscopic shape data.

In step S911, the control section 200 causes the display section 400 to display a result. In step S912, the control section 200 determines whether data of a target part is successfully correctly acquired. When the data is not successfully correctly acquired, the control section 200 returns to step S903 and repeats the processing explained above. On the other hand, when the data is successfully correctly acquired, the control section 200 proceeds to step S913 and executes various kinds of measurement and analyses using measurement software and the like.

As explained above, it is possible to generate the synthesized image using the shape measuring device and perform the shape measurement. The order of step S901 and S902 in FIG. 9 may be changed. In that case, first, in the measurement setting (step S902), the user performs alignment of the posture, the position, and the focus of the measurement object WK. In the texture image acquisition (step S901), the user does not change the posture, the position, and the focus of the measurement object WK and performs only, for example, selection of the brightness of the ring illumination and a texture type.

Procedure for Acquiring a Texture Image

Figure 10:
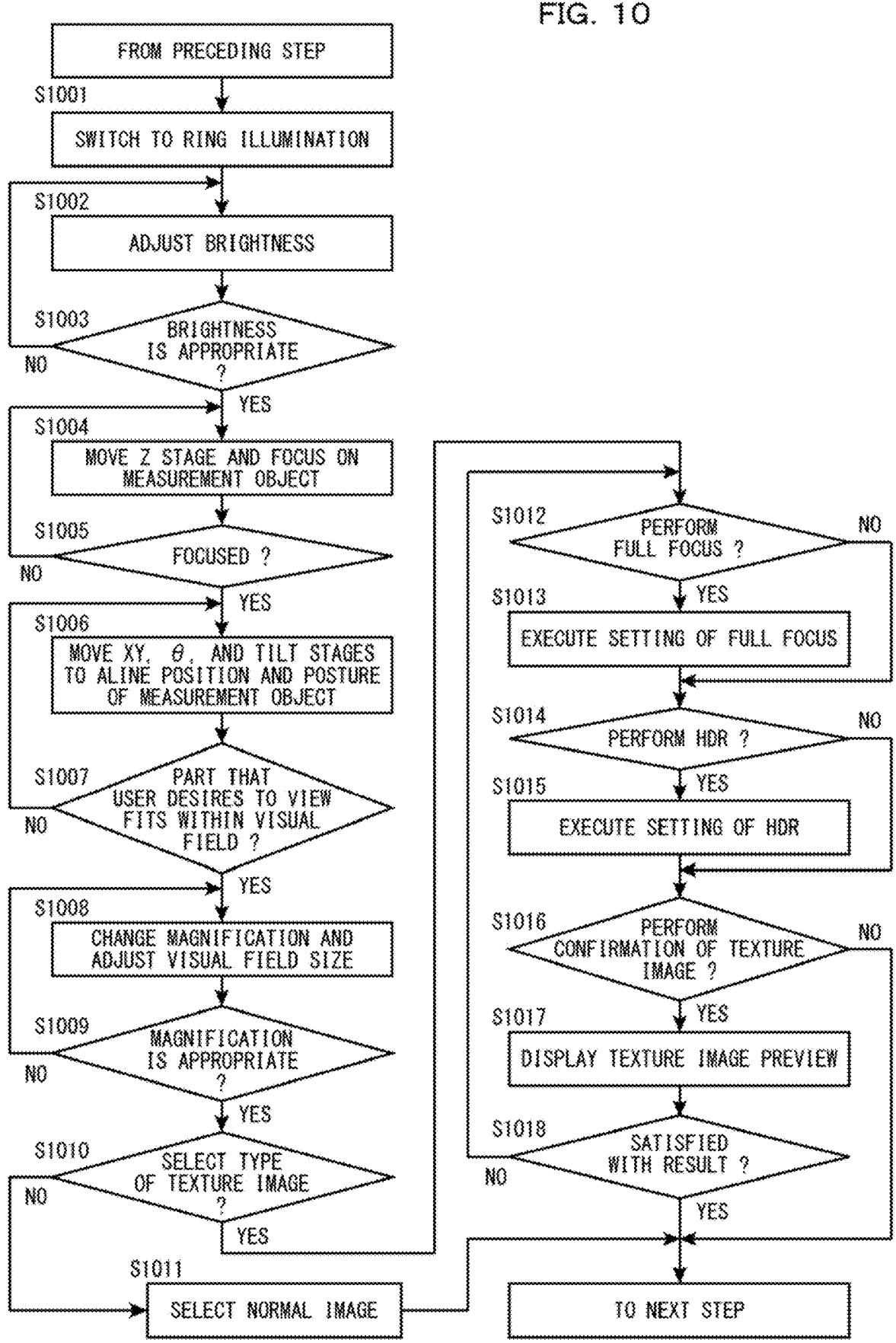
FIG. 10 is a flowchart showing a procedure for acquiring a texture image.

A procedure for acquiring a texture image is explained with reference to a flowchart of FIG. 10. The procedure is equivalent to detailed explanation of the process in step S902 of FIG. 9. First, in step S1001, the user switches the light projecting system to the ring illumination.

Subsequently, in step S1002, the user adjusts the brightness of the ring illumination. In step S1003, the user determines whether the brightness is appropriate. When the brightness is inappropriate, the user returns to step S1002 and repeats the processing. On the other hand, when the brightness is appropriate, the user proceeds to step S1004, moves the Z stage 142, and aligns a focus position of the measurement object WK. Further, in step S1005, the user determines whether the focus position is correct. When the focus position is incorrect, the user returns to step S1004 and repeats the processing. On the other hand, when the focus position is correct, the user proceeds to step S1006, moves the XY, θ, and tilt stages and aligns the position and the posture of the measurement object WK. The order of the steps S1002 to S1006 may be changed as appropriate.

In step S1007, the user determines whether a part that the user desires to view fits within a visual field. When the part does not fit within the visual field, the user returns to step S1006 and repeats the processing. On the other hand, when the part fits within the visual field, in step S1008, the user changes magnification and adjusts size.

In step S1009, the user determines whether the magnification is appropriate. When the magnification is inappropriate, the user returns to step S1008 and repeats the processing. On the other hand, when the magnification is appropriate, the user proceeds to step S1010 and determines whether to select a type of a texture image. When not selecting a type of a texture image, the user proceeds to step S1011 and selects a normal image and ends this processing.

On the other hand, when selecting the type of the texture image, the user proceeds to step S1012, determines whether to perform depth synthesis. When performing the depth synthesis, the user proceeds to step S1013 and executes setting of the depth synthesis. On the other hand, when not performing the depth synthesis, the user directly jumps to step S1014.

In step S1014, the user determines whether to perform HDR. When performing the HDR, the user proceeds to step S1015 and executes setting of the HDR. On the other hand, when not performing the HDR, the user directly jumps to step S1016.

In step S1016, the user determines whether to perform confirmation of the texture image. When performing the confirmation of the texture image, the user proceeds to step S1017 and causes the display section 400 to display a preview of the texture image. On the other hand, when not performing the confirmation of the texture image, the user ends this processing.

In step S1018, the user determines whether the user is satisfied with a result of the texture image, the preview of which is displayed. When not satisfied with the result, the user returns to step S1012 and repeats the processing. On the other hand, when satisfied with the result, the user ends this processing. As explained above, it is possible to acquire the texture image.

Procedure for Performing Setting of Measurement Setting

Figure 11:
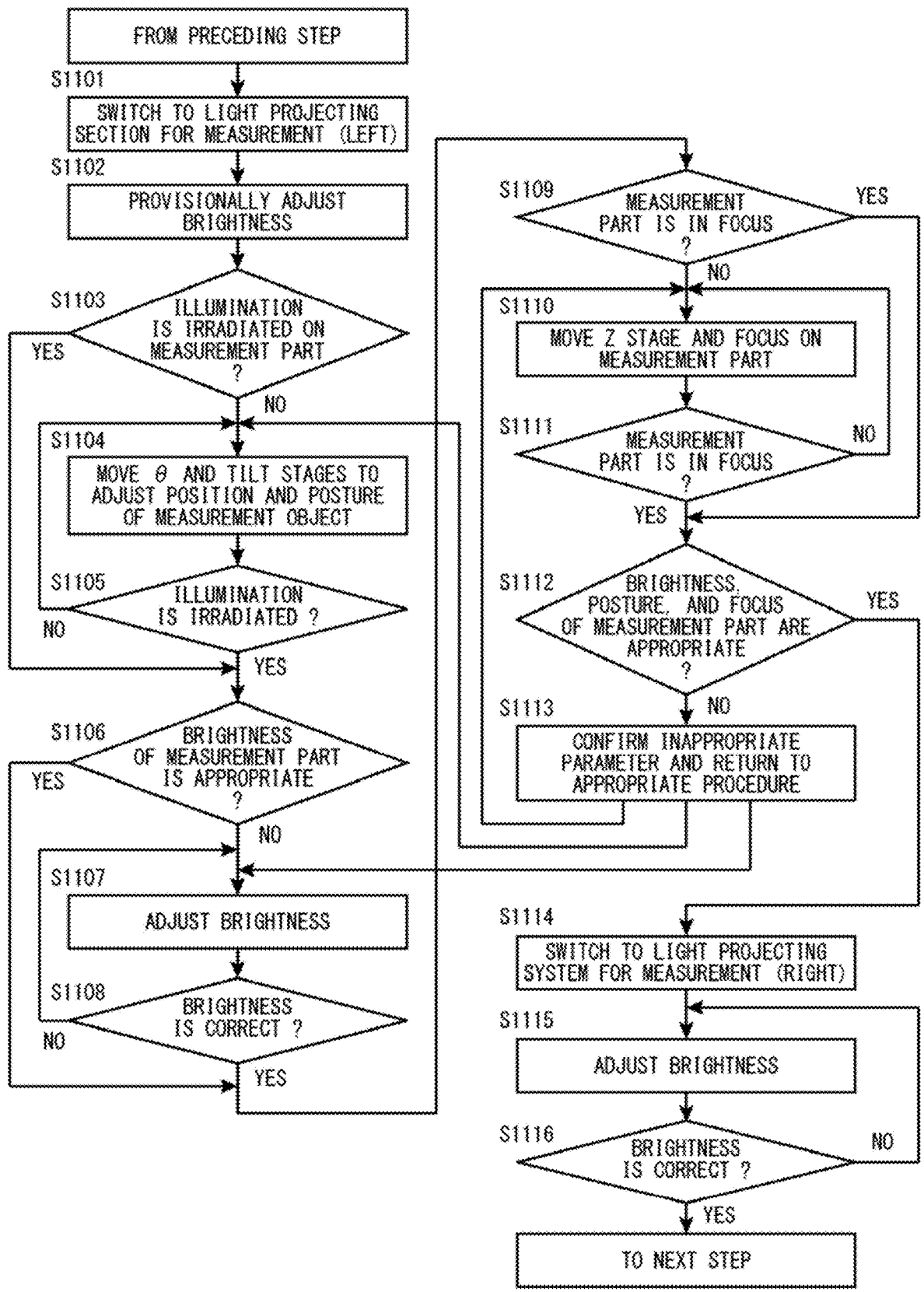
FIG. 11 is a flowchart showing a procedure for performing measurement setting.

Measurement setting for generating stereoscopic shape data includes light projection setting of pattern light of the light projecting section, light reception setting and an imaging condition of the light receiving section, and an illumination condition of the illuminating section. These kinds of measurement setting are set by the measurement setting section 255 shown in FIG. 1 and the like. A procedure for performing the setting of the measurement setting is explained with reference to a flowchart of FIG. 11. The procedure is equivalent to detailed explanation of the process of step S903 in FIG. 9.

First, in step S1101, the user switches the ring illumination to a light projecting system for measurement (in FIG. 4, a left-side light projecting system). Subsequently, in step S1102, the user provisionally adjusts the brightness.

In step S1103, the user determines whether illumination is irradiated on a measurement part. When the illumination is not irradiated on the measurement part, in step S1104, the user moves the θ and tilt stages and adjusts the position and the posture of the measurement object WK. On the other hand, when the illumination is irradiated on the measurement part, the user directly jumps to step S1106.

In step S1105, the user determines whether the illumination is irradiated. When the illumination is not irradiated, the user returns to step S1104 and repeats the processing. On the other hand, when the illumination is irradiated, in step S1106, the user determines whether the brightness of the measurement part is appropriate. When the brightness of the measurement part is inappropriate, in step S1107, the user adjusts the brightness. On the other hand, when the brightness of the measurement part is appropriate, the user directly jumps to step S1109.

In step S1108, the user determines whether the brightness is correct. When the brightness is incorrect, the user returns to step S1107 and repeats the processing. On the other hand, when the brightness is correct, in step S1109, the user determines whether the measurement part is in focus. When the measurement part is not in focus, in step S1110, the user moves the stage 140 and focuses on the measurement part. On the other hand, when the measurement part is in focus, the user jumps to step S1112.

In step S1111, the user determines whether the measurement part is in focus. When the measurement part is not in focus, the user returns to step S1110 and repeats the processing. On the other hand, when the measurement part is in focus, the user proceeds to step S1112 and performs general determination. The user determines whether the brightness, the posture, and the focus of the measurement part are appropriate. When the brightness, the posture, and the focus of the measurement part are inappropriate, in step S1113, the user confirms an inappropriate parameter and returns to an appropriate procedure. The user returns to any one of step S1104, step S1107, and step S1110 according to the inappropriate parameter.

On the other hand, when it is determined in the general determination that the brightness, the posture, and the focus of the measurement part are appropriate, the user proceeds to step S1114 and switches the illumination light to a light projecting system for measurement (in FIG. 4, a right-side light projecting system). In step S1115, the user adjusts the brightness. In step S1116, the user determines whether the brightness is correct. When the brightness is incorrect, the user returns to step S1115 and repeats the processing. On the other hand, when the brightness is correct, the user ends this processing.

The order of the position adjustment, the posture adjustment, the focus adjustment, and the brightness adjustment can be changed as appropriate in these procedures.

In this way, the measurement setting can be set. Besides being automatically performed by the user from the measurement setting section 255, the measurement setting can also be automatically performed on the shape measuring device side.

Measurement Range Expanding Function in the Depth Direction

In this embodiment, the pattern projection method based on the triangulation system is adopted as a noncontact measurement system. In this system, it is possible to expand a depth measurement range, which can be realized by one time of measurement, by a distance of movement by, on the basis of the triangulation system having a wide depth measurement range in one time of measurement, physically or optically moving the position of the measurement object or the shape measuring device, repeating the measurement, and combining measurement results. As a result, it is possible to quickly measure a wider range than the triangulation system. It is possible to realize the shape measuring device and the shape measuring method capable of measuring a wider visual field with high resolution. It is possible to expand, in respective visual fields, a measurement range in the depth direction.

Figure 8:
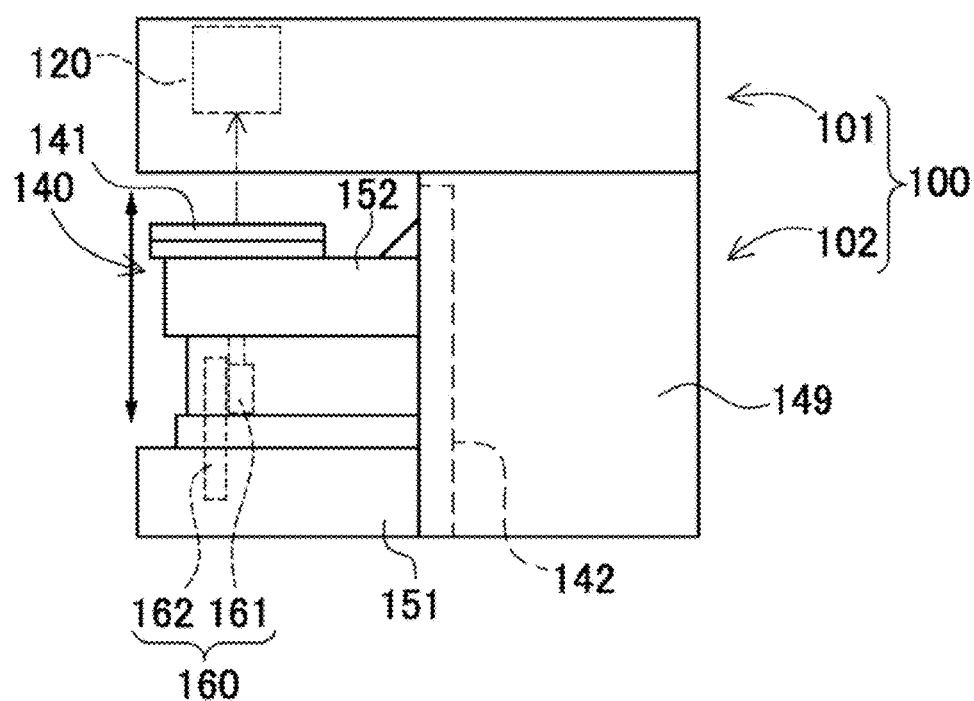
FIG. 8 is a side view showing a state in which an upper head and a lower head are connected.

As shown in FIG. 8 and the like, the shape measuring device according to the first embodiment is capable of measuring a surface shape of the measurement object in a noncontact manner. It is possible to acquire, with the triangulation system using the fringe projection method, height information in pixels in a light receiving optical system visual field in one time of measurement. The shape measuring device includes the stage 140 capable of relatively moving with respect to the measuring section. A stage height reading axis and an observation optical axis have a common axis.

The shape measuring device includes, on the inside of one upper head 101, the bifurcation light receiving optical system capable of performing observation at two magnifications. Consequently, it is possible to perform measurement while switching magnification in a coaxial visual field. Two magnifications of low magnification and high magnification have the same optical axis. The shape measuring device has a pattern light projection optical axis inclined in symmetrical directions centering on an intersection of the optical axis and a best focus surface (a focus surface) of the light receiving optical system. The shape measuring device performs pattern projection respectively from the pattern light projection optical axis directions, captures a plurality of images with the light receiving optical system, analyzes the images, and calculates height information.

Measurement Range

In the focus surface and the measurement range of the shape measuring device, as shown in FIG. 7, the upper head 101 has a photographing visual field in a look-down direction from right above to right below. The measurement object on an XYZ stage disposed below the upper head 101 is measured from right above. The user disposes the measurement object on the top surface of the XYZ stage. The user can adjust a visual field by moving the XY stage 141 and adjust a focus by moving the Z stage 142. Alternatively, the user can change a relative distance (a working distance) between the measurement object and the light receiving optical system and adjust the focus by moving the light receiving optical system side. The focus means focus of the light receiving optical system. In the shape measuring device, as shown in FIG. 7, a depth measurement range in the height direction has fixed width vertically symmetrical centering on the focus surface. However, the symmetry is not essential.

In the XYZ stage, the Z stage 142 is disposed in a direction substantially coinciding with the light receiving optical axis. Consequently, it is possible to change measurement object height in the optical axis direction (or a relative positional relation in the optical axis direction between the upper head 101 and the measurement object) only by moving the Z stage 142. A scale unit 160 capable of detecting a moving distance of the Z stage 142 is disposed on the inside of the Z stage 142. As shown in FIG. 8 and the like, the scale unit 160 is disposed right below a visual field of the upper head 101. Since the scale unit 160 is disposed right below the visual field in this way, it is possible to detect a positional relation between the depth measurement range and the measurement object with a minimum error. In general, when the position of a sensor that performs detection, that is, a measurement axis is offset from a measurement position of the measurement object with respect to a coordinate point where detection is desired to be performed, a measurement error can occur on the basis of the Abbe principle. Such a state occurs when the measurement axis is disposed in parallel to a position desired to be measured. On the other hand, according to the Abbe principle, when the measurement axis and the measurement position of the measurement object are present on an extended line of the same plane, it is possible to reduce such a measurement error. That is, the position desired to be measured and the measurement axis are linearly disposed.

Depth Expanding Function

In order to expand the depth measurement range in the height direction, the stage 140 and the light receiving section 120 are relatively moved in the optical axis direction with the optical-axis-direction driving section 146. The light receiving section 120 has a predetermined focal depth. A pattern image can be captured only at height in a fixed range (a depth measurement range) decided by the focal depth. Therefore, it is possible to expand a measurable depth measurement range by shifting the depth measurement range with the optical-axis-direction driving section 146. That is, by coupling height images generated in the same visual field (in a stage plane orthogonal to the optical axis direction of the light receiving section 120) in the height direction for each of pixels of XY coordinates corresponding to the height images, it is possible to obtain a synthesized height image at height exceeding the restriction of the depth measurement range.

In such a depth expanding function, it is necessary to couple the height images generated in the same visual field, that is, in the range of the XY plane. Further, it is necessary to couple height images generated under the same condition. Specifically, when pattern lights are projected from the left and right light projecting sections 110 shown in FIG. 7, in the case of height images generated by projecting lights from both the sides, the height images of the both side light projection are coupled to generate a synthesized height image. In height images generated by one side light projection using one of the light projecting section 110, similarly, the height images of the one side light projection are coupled. In this case, in right side light projection, height images of the right side light projection are coupled. In left side light projection, height images of the left sidelight projection are coupled.

In the example shown in FIG. 7 and the like, it is possible to expand the depth measurement range by executing a plurality of measurements while involving the movement of the Z stage and coupling results of the measurements on the basis of Z-stage heights at which the measurements are executed. Such one time of measurement with the fixed Z-stage height is referred to as "one-shot measurement". Measurement in which results of measurement at a plurality of Z-stage heights are coupled is referred to as "depth expansion measurement".

A concept of the height direction expansion of the depth measurement range is explained with reference to FIGS. 12A to 12C. FIGS. 12A to 12C show, as a frame of a broken line, a depth measurement range defined by a left light projection range and a right light projection range at each of height A, height B, and height C.

When a measurement object WK2 having structure higher than a depth measurement range HIA (a range indicated by a dotted line frame in FIG. 12A) of the shape measuring device is measured, it is possible to fit surfaces of the measurement object WK2 in the depth measurement range by moving the Z stage 142 in the height direction (changing height to A, B, and C) (thick lines in FIGS. 12A to 12C).

Figure 13B:
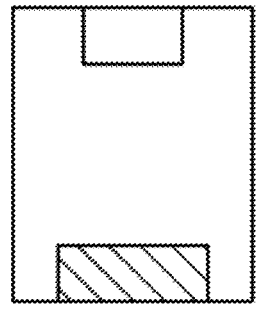
FIGS. 13A to 13C are image diagrams respectively showing optical images obtained at the heights of FIGS. 12A to 12C.
Figure 13E:
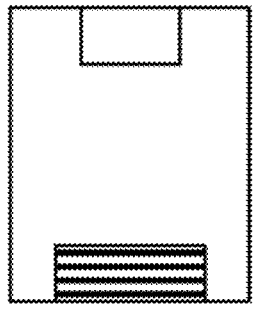
FIGS. 13D to 13F are image diagrams respectively showing stripe images obtained at the heights of FIGS. 12A to 12C.
Figure 13C:
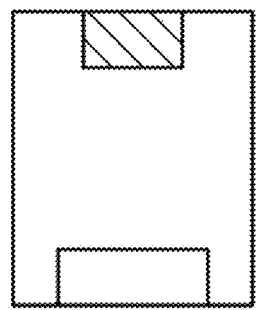
Figure 13F:
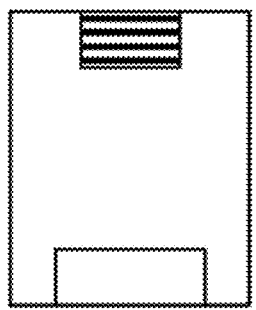
Figure 13A:
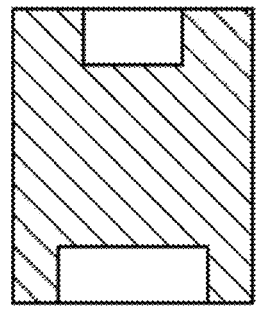
Figure 13D:
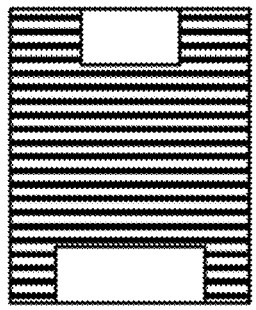

Optical images observed at this time are shown in FIGS. 13A to 13C. Stripe images acquired by the fringe projection method are shown in FIGS. 13D to 13F. In FIGS. 13A to 13C, focused regions are schematically indicated by hatching.

In FIGS. 13A and 13D, the lowest surface of the measurement object is in focus at the height A. The shape of the lowest section of the measurement object can be measured. At the height B to which the Z stage 142 is slightly lowered as shown in FIGS. 13B and 13E, a part outside the depth measurement range at the height A (a part where blur of stripes is large on the stripe image; a red dotted light region) is in focus. It is possible to measure the shape of a region fit in fixed width centering on this surface. Further, at the height C to which the Z stage 142 is further lowered, a shape (a red dotted line) present at the highest point of the measurement object is in focus as shown in FIGS. 13C and 13F. It is possible to measure the shape of a region fit in fixed width centering on this surface.

At the three heights, the height of the Z stage 142 is detected by the scale unit 160. It is possible to acquire a stage height coordinate for each one shot. The scale unit 160 outputs a scale value indicating a relative distance between the stage 140 and the optical axis direction of the light receiving section 120.

A procedure for coupling measurement results for each one shot obtained in three times of measurement is explained with reference to schematic diagrams of FIGS. 14A to 14D. As shown in FIGS. 14A to 14D, measurement data in a fixed height range (respectively indicated by a dotted line frame in FIG. 14A, a broken line frame in FIG. 14B, and an alternate long and short dash line frame in FIG. 14C) is obtained by measurement in each one shot. In this case, a relative movement amount of the stage 140 or an absolute stage height of the stage 140 is detected during the measurement. The measurement data is offset with this detected coordinate as a value of a measurement data origin, whereby a relative relation of shots is defined. Coupled measurement data in which a normal one-shot depth measurement range is expanded is obtained by adding up results the measurement.

In this way, a scale value at the time when height images are acquired by the scale unit 160 is stored. When the height images are combined, pixel values of the height images are offset on the basis of the scale value and the height images are combined. Specifically, the synthesis processing section 216 stores a scale value of the scale unit 160 at the time when the height images are generated. When combining the height images, the synthesis processing section 216 offsets pixel values of the height images on the basis of the scale value and combines the height images.

As explained above, it is possible to perform measurement extended in the depth direction by repeatedly performing the one-shot measurement capable of performing measurement in one time of imaging with fringe projection and coupling the one-shot measurement in the height direction. In the coupling of the one-shot depth measurement range, it is not always necessary to make the depth measurement ranges to continue. Discrete one-shot measurement separated in the depth direction may be performed. For example, when the user manually performs depth expansion, stereoscopic shape data of only a region necessary for measurement has to be acquired. All information in the depth direction of the measurement object is sometimes unnecessary.

Mask Region

In the automatic expansion in the depth direction, the user can also set a range in which the user desires to perform depth expansion. For example, the depth-expansion processing section 215 may include the depth-range setting section 253 for setting a range for controlling the optical-axis direction driving section 146 and changing a focal position of the light receiving section 120. The user may set a mask region with the depth-range setting section 253 as a range unnecessary in the depth expansion. In this way, the depth expansion measurement includes not only continuous coupling of the one-shot measurement but also separated coupling.

As explained above, an error of an actual movement amount with respect to a Z-stage movement amount does not have to be considered by detecting the height of the Z stage 142 simultaneously with the measurement of the measurement object. If the height detection of the Z stage is not performed, the origin of the one shots is designated on the basis of a movement pulse (a movement instruction amount) of the Z stage. However, a stage movement error itself is a coupled measurement error. In addition, depending on the configuration of the shape measuring device, an error based on the Abbe principle can also occur because of deviation between the movement driving axis and an actual measurement object loading position. On the other hand, the error is reduced and highly accurate height detection is realized by detecting the height of the Z stage and bringing a measurement axis for detecting the height of the stage 140 close to the optical axis. Consequently, it is also possible to improve accuracy in combination in the height direction.

When the stage 140 is expanded in the depth direction to perform measurement, it is requested to accurately detect movement amounts of physical or optical movement of the positions of the measurement object and the light receiving section 120. In the accurate detection of the movement amounts, based on the Abbe principle, a photographing visual field of the measuring instrument and a detection position of linear movement desirably coincide with each other. On the other hand, when movement of the stage at a long stroke is detected, a mechanism for the detection also tends to be long. Therefore, when a sensor is disposed right below the stage, a longer sensor unit is disposed according to the movement stroke. The entire length of a housing has to be increased.

Further, in general, a linear moving mechanism itself requires long structure compared with a sensor moving section. This is because the width of a base housing is added to a movement amount in order to improve the rigidity of a moving stage. A dimension increase due to overhang of a guide is also unavoidable. As a result, the height of the entire stage increases. Disadvantages increase, for example, the top surface of the stage is higher than a setting bottom surface to deteriorate convenience of the user and the amplitude of the measurement object due to vibration tends to increase. In view of such circumstances, in this embodiment, the scale unit 160 that detects the height of the stage 140 is disposed right below the visual field to improve disposition flexibility of a stage driving axis.

In an example shown in FIGS. 14A to 14D, the measurement object WK2 has a relatively simple step. Depending on a measurement object, the entire height direction of the measurement object can be fit in a measurement region at two stages of Z-stage heights (e.g., the height A in FIG. 13A and the height B in FIG. 13B). Synthesis of height information common in a plurality of one-shot data at respective heights is explained.

Synthesis Logic of Common Height Information

As a synthesis method for common height information, there is a method of calculating a weighted average or a method of adopting one of reliabilities of height information. When the respective kinds of height information indicate substantially the same height, an error is considered to be less in the height information obtained in a position closer to a focus surface. Therefore, calculation is performed by weighted average corresponding to the distance from the focus surface.

On the other hand, when the respective kinds of height information are greatly different, one of the kinds of height information is highly likely to be noise because of the influence of, for example, multiple reflection of light inside the measurement object. Therefore, in this case, reliabilities for determining which of the heights is adopted are calculated from a blur state of an image, contrast of luminance in presence or absence of illumination, and the like. The height with higher reliability is adopted.

Data with Low Reliability

A pixel with high reliability in data included in a height image is displayed on the display section 400 or used for measurement. On the other hand, there is a concern that data with low reliability includes an error. Therefore, the data is not displayed on the display section 400 and is not used for measurement and the like.

On the other hand, even the data with low reliability can be used to determine, in depth expansion, whether stereoscopic shape data is present. High accuracy is not required to determine whether a measurement range is expanded in the depth direction to acquire a height image if it is possible to determine whether the measurement object is continuously present in the height direction. Therefore, in this embodiment, even data with low reliability not used for usual measurement and construction of a height image can be used for determination of necessity of the depth expansion.

As an example, concerning a certain measurement object, height images generated in a depth measurement range up to fixed height under restriction in specifications of the shape measuring device are shown in FIGS. 15A and 15B. In FIG. 15A, pixels with low reliability in the depth measurement range are not displayed. In this way, when the height image is displayed on the display section 400, in general, pixels with high reliability are displayed and pixels with low reliability are not displayed. On the other hand, an example in which the pixels with low reliability in the height image in FIG. 15A are also displayed is shown in FIG. 15B. In FIG. 15B, pixels on the upper end face of a columnar shape indicated by a region surrounded by a broken line are inappropriate as data used for, for example, dimension measurement of the measurement object because accuracy is low. However, it can be surmised that the measurement object is continuously present above the upper end face of the column. Therefore, when depth expansion measurement is executed, it is possible to generate a height image in a wider range by setting the depth measurement range further upward. Similarly, height images of a measurement object having another shape are shown in FIGS. 16A and 16B. FIG. 16A shows a height image in which pixels with low reliability are not displayed. FIG. 16B shows a height image in which pixels including the pixels with low reliability are displayed. Similarly, in FIG. 16B, by using a region surrounded by a broken line, it can be surmised that the measurement object is continuously present further upward.

It is possible to determine, from this stereoscopic shape data, a direction in which depth is expanded in the depth expansion measurement.

Pixels at the End Portion of Stereoscopic Shape Data

It is possible to determine, with stereoscopic shape data located at the end portion of a height image, whether the depth expansion measurement is performed. The present invention is not limited to a method of performing determination on the basis of pixels at the end portion of the stereoscopic shape data. The determination may be performed on the basis of data in the middle of the depth measurement range. For example, the determination may be performed on the basis of whether a pixel in a position a predetermined distance apart from the end portion has the stereoscopic shape data. If any pixel in the depth measurement range has the stereoscopic shape data, the depth expansion measurement may be executed. For example, when a pixel in which a luminance value enough for determining that a pattern is projected is obtained is present somewhere among pixels in which final stereoscopic shape data is not obtained, the determination processing section may determine that an unmeasured pixel is present and the depth expansion measurement may be executed. In this case, in order to avoid noise and misdetection, it is desirable to set a threshold, for example, set the number, a region, or a volume of pixels having stereoscopic shape data to a fixed or larger value.

Display-Mode Switching Section

In this way, in the shape measuring program according to this embodiment, even the pixels with low reliability can be displayed on the display section 400. For example, a normal display mode for not displaying pixel data with low reliability and a visualizing mode for displaying even the pixel data with low reliability can be switched by a display-mode switching section. In the examples shown in FIGS. 15A to 16B, FIGS. 15A and 16A show the normal display mode and FIGS. 15B and 16B show the visualizing mode.

Figure 17:
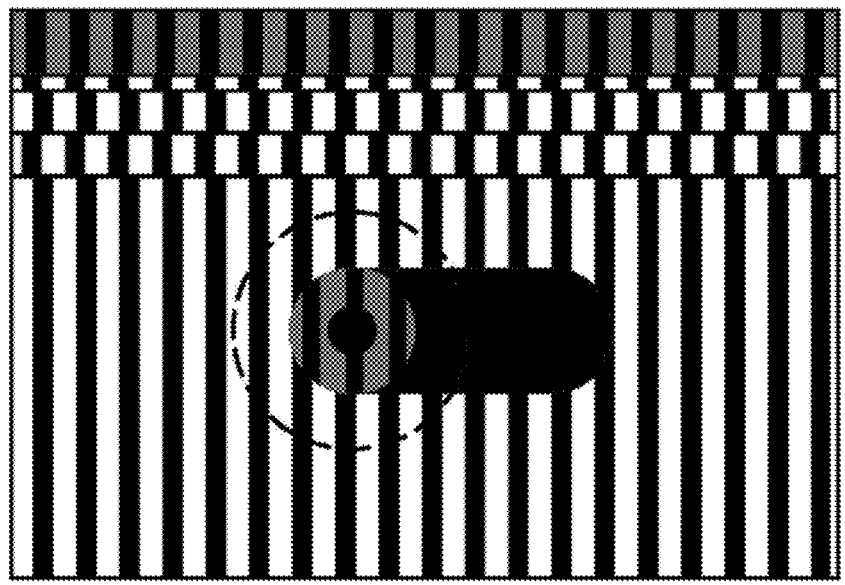
FIG. 17 is an image diagram showing a state in which a stripe image can be confirmed in a height position of a measurement object present in the depth search range outside a measurable height range.
Figure 18:
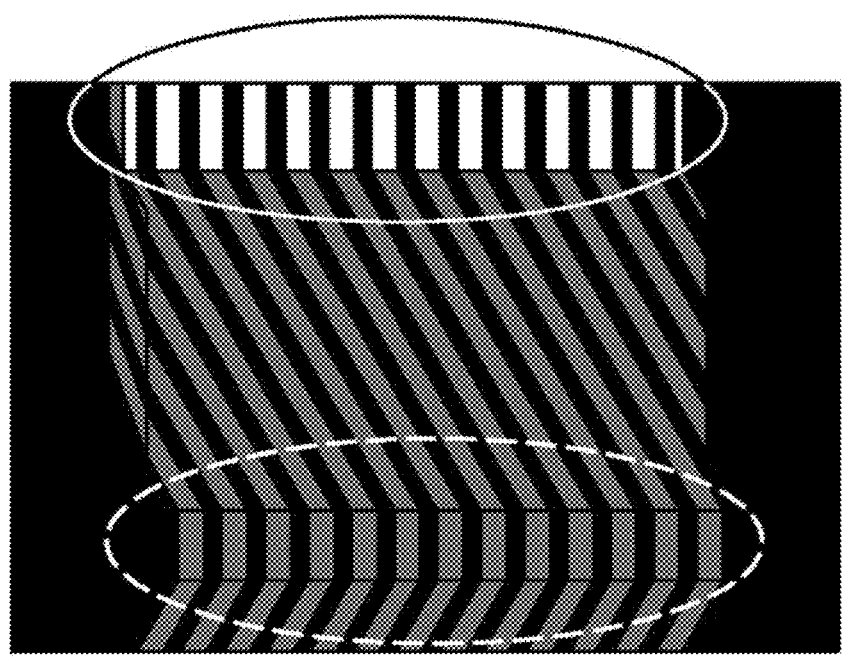
FIG. 18 an image diagram showing a state in which a stripe image can be confirmed in the height position present in the depth search range outside the measurable height range with respect to another measurement object.

Determination of Necessity of the Depth Expansion Measurement Based on Stereoscopic Shape Data In the example explained above, the necessity of the depth expansion measurement is determined on the basis of the pixel data forming the height image, that is, the data from which the height information is calculated. However, the present invention does not limit the necessity determination of the depth expansion measurement to the height image and may be configured to perform the necessity determination on the basis of original data and raw data before the calculation of the height information. Such an example is explained with reference to FIGS. 17 and 18. FIG. 17 shows an example of a stripe image formed by projecting stripe patterns on the measurement object. In FIG. 17, since a region surrounded by a broken line is present outside the depth measurement range, contrast of the stripe patterns is low. However, even outside the depth measurement range, since the stripe patterns are projected, although accuracy is deteriorated compared with the other stripe patterns, the stripe patterns can be used for the necessity determination of the depth expansion measurement. That is, in the example shown in FIG. 17, it can be grasped that the measurement object has a shape in a position higher than the depth measurement range (projects in a cylindrical shape). Therefore, it can be determined with the stripe patterns on the outer side of the depth measurement range that it is effective to perform the depth expansion measurement in this direction.

Further, in performing the depth expansion measurement, it is also possible to determine on the basis of such stereoscopic shape data whether depth is expanded in the upward direction or expanded in the downward direction. For example, in an example of the measurement object shown in FIG. 18, portions outside the depth measurement range are present on the upper side and the lower side in the figure. Luminance is higher in a region on the upper side surrounded by a thick broken line than a region on the lower side surrounded by a thin broken line. In general, concerning data outside the depth measurement range, a side close to a camera or illumination tends to be bright and a side far from the camera or the illumination tends to be dark. Accordingly, it is possible to distinguish on the basis of the brightness and the contrast of the projection patterns whether the data outside the depth measurement range is present on the outer side where the brightness is higher or the outer side where the brightness is lower. Therefore, it is possible to surmise in which direction the depth expansion measurement is performed to acquire a height image in this portion.

Moving Pitch

When the height images are coupled to be continuous, a position to which the Z stage 142 is moved needs to be set such that a difference between Z-stage positions is equal to or smaller than height in the depth measurement range to prevent a gap in the height direction from being formed during the coupling of the height images. In order to smoothly connect heights when the height images are combined, as shown in FIG. 14D, it is desirable that the difference is slightly shorter than the height in the depth measurement range such that the depth measurement range partially overlaps. However, when an overlap region is too large, the number of the height images necessary for the coupling increases. A tradeoff with a measurement time occurs. Therefore, approximately 1% to 33%, more desirably 5% to 25%, and still more desirably 10% to 20% of the depth measurement range is caused to overlap.

In the generation of a synthesized image, a moving pitch for moving the Z stage in the depth direction in order to capture a plurality of height images and a moving pitch for capturing a texture image may be matched. However, the moving pitches do not always need to be matched and can also be independently set. In particular, concerning the height images, even if a pattern image such as a stripe image is not always in focus, measurement of height information is possible if a contrast difference or the like can be confirmed. On the other hand, concerning the texture image, the influence of appearance is large if the texture image is not in focus. Therefore, it is desirable to set the moving pitch of the texture image finer than the moving pitch of the height image, in other words, increase the number of texture images. A clear depth-synthesized image substantially entirely in focus is obtained by depth-combining a plurality of texture images photographed at the fine moving pitch. It is possible to acquire clear texture information and stereoscopic shape data having height information with large depth by mapping the depth-synthesized image to a synthesized height image obtained by combining the height images.

On the other hand, in order to capture a plurality of height images, every time the stage is moved in the depth direction, texture images may be captured together, the captured texture images may be depth-combined, and the depth-combined texture images may be mapped to a synthesized height image obtained by combining the height images. In this case, although clarity of the depth-synthesized image is deteriorated, stage movement for obtaining the depth-synthesized image is unnecessary other than stage movement for capturing the height images. Therefore, there is an advantage that less time is consumed for processing.

Figure 19:
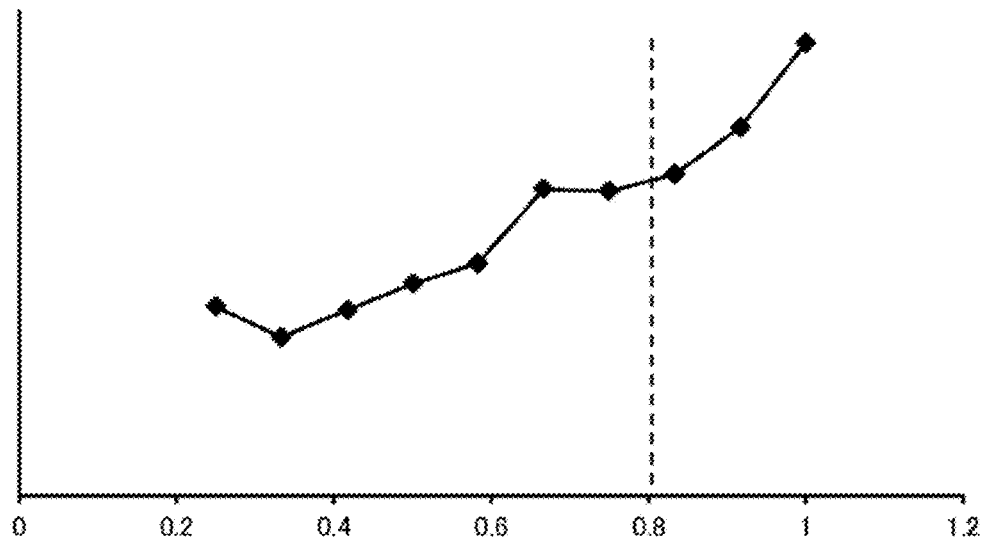
FIG. 19 is a graph showing a relation between roughness of an image and a pitch during coupling.

A relation between roughness (a relative value) of images during coupling and a moving pitch is shown in a graph of FIG. 19. In FIG. 19, the horizontal axis indicates a moving pitch with respect to a depth measurement range height and the vertical axis indicates surface roughness at the time when planes are obliquely coupled. As shown in FIG. 19, it is seen that the roughness increases as the moving pitch is increased.

In the example explained above, the moving pitch for moving the Z stage is set to a fixed amount. However, the present invention is not limited to this configuration. For example, the moving pitch may be set to, for example, any movement amount designated by the user.

Coupled Region of the Height Images

When the plurality of height images are coupled in this way, treatment of a region where the height images overlap in the height direction is a problem. That is, as height information of an overlapping portion of coupling target two height images, it is necessary to determine which of the height images is used in a synthesized height image. Therefore, the synthesis processing section 216 decides treatment of the overlapping portion in advance. For example, when a height image HIA obtained in FIG. 14A is coupled to a height image HIB obtained in FIG. 14B, in a synthesized height image CHI shown in FIG. 14D, an upper part of the height image HIA and a lower part of the height image HIB overlap in an overlapping region OL1. Similarly, when the height image HIB is coupled to a height image HIC, an upper part of the height image HIB and a lower part of the height image HIC overlap in the overlapping region OL1. In such a case, the synthesis processing section 216 processes the overlapping region on the basis of a reliability indicator.

Reliability Indicator

The reliability indicator is an indicator indicating how close height information of pixels in a stage plane, to which the height images correspond, is to a true value, that is, true height in the overlapping region where the depth measurement region overlaps. When the height information is set to pixel values of pixels forming the height images, the reliability indicator is considered to be an indicator indicating reliability of the pixel values.

In this way, when the plurality of height images are coupled in the depth direction, it is possible to obtain a synthesized height image with improved reliability of the height information in the overlapping region by using the reliability indicator without using a simple arithmetic mean or the like.

As a specific reliability indicator, a closer distance from the focal position of the light receiving section 120 is adopted. When the height images are created by the pattern projection method, a pattern image (e.g., a stripe image) is obtained in a position other than the focal position and calculation of the height information is possible. However, the pattern image is clearer in a position closer to the focal position. Accuracy of the height information tends to be high. Therefore, a focal length is used as the reliability indicator. It can be determined that the reliability of obtained height information is also high as the distance between a focal position at the time when the height image is generated and a pixel of attention is shorter.

Alternatively, contrast with peripheral pixels may be used as the reliability indicator. Specifically, as the reliability indicator of pixels of a certain height image, contrast of corresponding pixels in a pattern image, based on which the height image is generated, and pixels located around the pixels is used. As the contrast with the peripheral pixels is higher, a boundary forms clearer pattern light and the height information can be accurately calculated. Alternatively, a luminance value or the like of an original pattern image may be used as the reliability indicator.

The pixels having the higher reliability indicator can be adopted as pixels of the synthesized height image on the basis of the reliability indicator obtained in this way.

In the case of a pixel, height information of which is not obtained in the first place, the pixel is regarded as null. A pixel, height information of which is obtained, is used. When height information is not obtained in both the pixels, height information is null in a synthesized height image as well. For example, in a region where the depth measurement range overlaps, concerning pixel values of corresponding XY coordinates of height images, when pixels of one height image are valid and pixels of the other height image are null, pixel values of the valid pixels are used. Consequently, when a plurality of height images are coupled in the depth direction, concerning height information in an overlapping region, it is possible to obtain a synthesized height image in which defective pixels are interpolated.

On the other hand, it is possible to not only adopt a pixel value having a higher reliability indicator and discard a pixel value having a lower reliability indicator but also perform weighting. For example, it can be expected that more accurate height information is obtained by performing weighting to set the specific weight of the pixel value having the higher reliability indicator to be high and set the specific weight of the pixel value having the lower reliability indicator to be low.

Alternatively, height information of the synthesized height image may be calculated on the basis of a weighted arithmetic mean using the reliability indicator.

Difference

It is also possible to extract pixels having predetermined or more differences from two height images partially overlapping each other. Specifically, the synthesis processing section 216 can be configured to extract pixels as differences and adopt a pixel value having a high reliability indicator among pixel values of the pixels in the region where the depth measurement range overlaps. In this case, a differential-pixel extracting section for extracting pixels having predetermined or more differences between height images may be provided in the synthesis processing section 216.

Further, in combination of height images in which the depth measurement range partially overlaps, a condition for selecting or calculating height information can also be changed according to a difference amount of data. For example, a pixel having a higher reliability indicator is adopted when a difference of the data is equal to or larger than a predetermined value. Height information of a synthesized height image may be calculated on the basis of the weighted arithmetic mean using the reliability indicator when the difference of the data is smaller than the predetermined value.

Setting of a Range of Coupled Measurement

When the coupled measurement explained above is carried out, several methods for determining a depth measurement range are conceivable: for example, (1) a method of causing the user to input upper limit and lower limit coordinates of the Z stage and measuring and coupling ranges including upper and lower limits at a fixed moving pitch; and (2) a method of causing the user to determine how many stages in the up-down direction from the present Z-stage height are acquired and carrying out and coupled measurement in a plurality of stages at a fixed moving pitch.

However, in such depth measurement range determining methods, a procedure for determining a depth measurement range is necessary as pre-processing of the measurement in both the methods. This procedure is not only time-consuming but, when different height ranges are designated in a plurality of visual fields, setting is necessary every time the height range is designated and operation is extremely complicated. Therefore, in this embodiment, a range of the coupled measurement can be automatically determined.

Setting of a Depth Measurement Range

Figure 20:
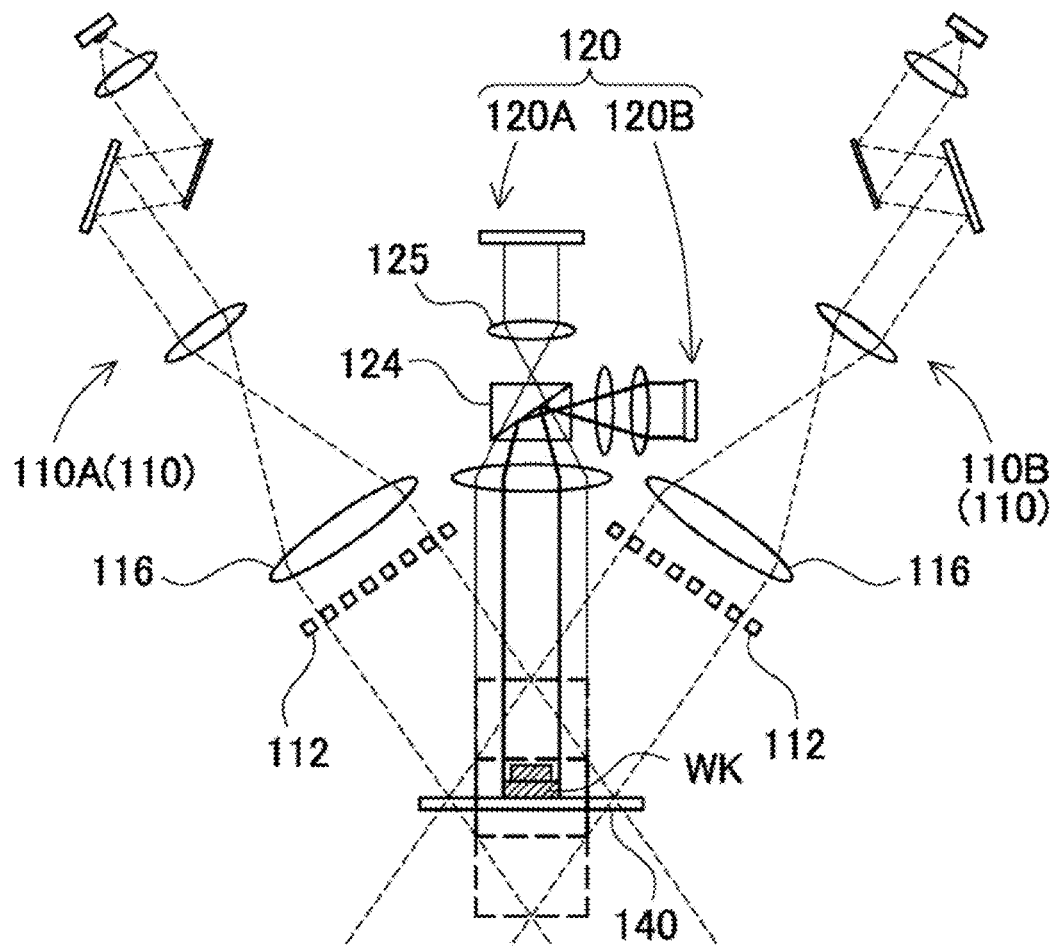
FIG. 20 is a schematic diagram for explaining a depth search range for automatically determining a coupled measurement range.

In order to automatically determine a coupled depth measurement range, in the first embodiment, a depth search range is defined. First, in a shape measuring device shown in FIG. 20, projected beams are irradiated toward the measurement object WK as parallel light beams from symmetrical angles of a light receiving optical system. A range in which the shape measuring device guarantees accuracy and is capable of performing measurement is a depth measurement range. In the depth measurement range, by carrying out measurement by averaging or combining measurement results by light projection from the left and the right, stabilization and high accuracy of the measurement can be expected. Therefore, the depth measurement range is defined as a "common region" of the projected light beams from the left and the right.

On the other hand, in each of the light beams independently respectively irradiated from the left and the right, projected light beams are irradiated in a height range wider than a highly accurately set depth measurement range. Therefore, a union region of the respective projected light beams on the left and the right fit in a photographing visual field is defined as a depth search range. Consequently, it is possible to acquire general height information in a shape outside the depth measurement range on the measurement object even if the height information cannot be used for measurement.

Combination of Triangulation Systems

In the shape measuring device according to this embodiment, in order to carry out more highly accurate measurement, measurement is performed by combining a space encoding method and a multi slit method or the space encoding method and a sine wave phase shift method. However, in a region beyond the depth measurement range, in a relation of a depth of field of an optical system, projected stripe patterns are blurred. It is impossible to perform height measurement with sufficient resolution and accuracy. On the other hand, in stripe patterns for performing measurement with relatively low resolution of the space encoding method, stripes themselves are sufficiently thick with respect to the depth of field of the optical system as shown in FIG. 17. Therefore, even the region beyond the depth measurement range often has a rough stripe shape. In FIG. 17, in stripe patterns irradiated on a cylindrical top surface, stripes are blurred because the stripes are located on the depth search range. However, a rough stripe shape is maintained. If this characteristic is used, it is possible to obtain rough height information inside the depth search range and outside the depth measurement range.

In this embodiment, the space encoding method and the multi slit method or the space encoding method and the sine wave phase shift method are combined to perform the measurement. However, even if the space encoding method is not used, it is possible to obtain the same effects as the effects of the combined measurement with the space encoding method by respectively phase-shifting and projecting two or more patterns having different cycles. For example, it is possible to perform highly accurate measurement having an absolute value by projecting a first pattern having a rough cycle, performing low-resolution measurement of the measurement object WK by phase-shifting the first pattern, subsequently projecting a second pattern having a short cycle, and performing high-resolution measurement of the measurement object WK by phase-shifting the second pattern, and combining these measurements. In this case, a result of the low-resolution measurement can be treated in the same manner as a measurement result of the space encoding method.

Depth-Expansion-Mode Selecting Section 254

As explained above, the shape measuring device according to this embodiment includes a one-shot measuring function for performing measurement once while fixing the Z-stage height and a depth-expansion measuring function for coupling results measured at a plurality of Z-stage heights. As the depth-expansion measuring function, an automatic depth expanding function for automatically performing depth expansion or a manual depth-expansion measuring function for manually performing depth expansion can be performed. Alternatively, these functions can be switched. The shape measuring device causes the depth-expansion-mode selecting section 254 to switch automatic and manual of the depth-expansion measuring function.

Example 1: Automatic Depth Expansion Based on Cumulative Images

Figure 21:
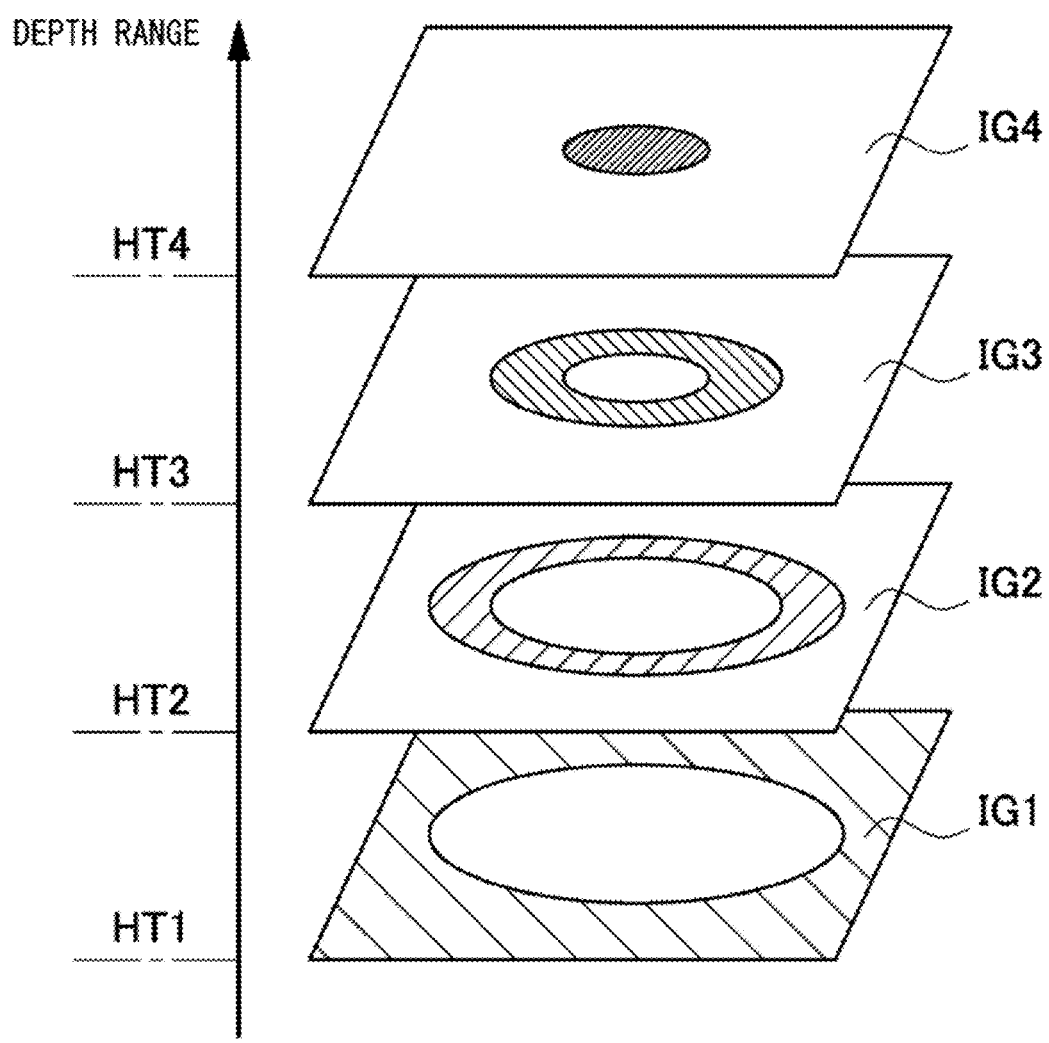
FIG. 21 is a schematic diagram showing a state in which acquired pixels are accumulated.
Figure 22A:
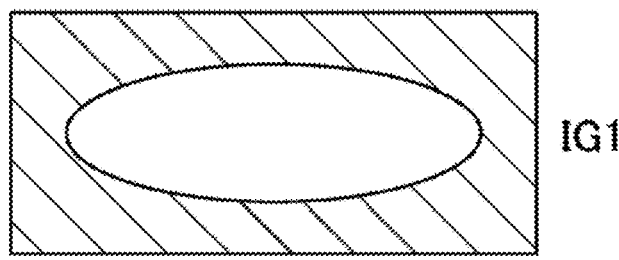
FIGS. 22A to 22D are schematic diagrams showing transition of a cumulative image.
Figure 22B:
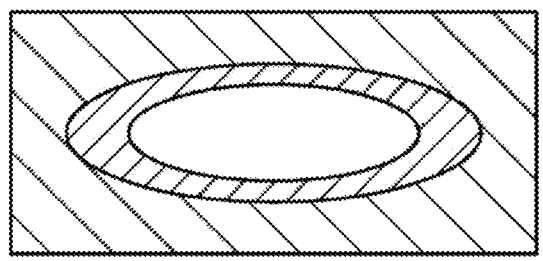
Figure 22C:
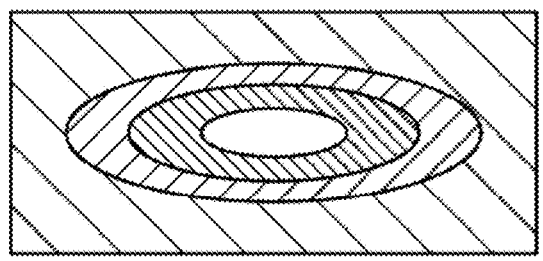
Figure 22D:
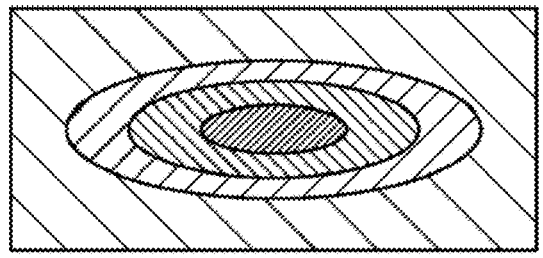

Automatic depth expansion according to an example 1 is explained. It is possible to automatically expand a range of coupled measurement by calculating, from rough height information in the depth search range and outside the depth measurement range, a Z-stage position for measuring, in the depth measurement range, heights of the height information, moving to the position, and performing measurement. As shown in FIG. 21, pixels (measurement pixels), stereoscopic shape data of which are acquired, among pixels forming a visual field are accumulated. In an example shown in FIG. 21, in an image IG1 captured in a depth measurement range HT1, although height can be acquired in a rectangular peripheral region, height cannot be acquired in an elliptical region in the center. The image IG1 is an image including pixels lacking height information. When the depth measurement range is changed from HT1 to HT2 to capture an image IG2, height is obtained in a part of the pixels not measured in the image IG1. Similarly, when an image IG3 is captured in a depth measurement range HT3 and an image IG4 is captured in a depth measurement range HT4, height is respectively acquired in the lacked pixels. In this way, the pixels in which the height is acquired in each of the depth measurement ranges are accumulated as shown in FIGS. 22A to 22D. For example, in FIG. 22A, the image IG1 is shown. In FIG. 22B, a cumulative image obtained by accumulating the pixels, height information of which is obtained in the image IG2, in the image IG1 is shown. Consequently, it is seen that the unmeasured pixels lacking the height information decrease compared with the image IG1 shown in FIG. 22A. Further, in FIG. 22C, a cumulative image obtained by accumulating the pixels, height information of which is acquired in the image IG3, is shown. The region of the unmeasured pixels is further reduced than in FIG. 22B. In FIG. 22D, pixels obtained in the image IG4 are accumulated. Height information is obtained in the pixels in all the regions. In this way, presence or absence of unmeasured pixels is determined on the basis of a cumulative image obtained by accumulating acquired pixels. When unmeasured pixels are present, the acquisition of stereoscopic shape data is automatically continued. The pixels forming the visual field are sequentially filled by the measured pixels. The processing is ended at a point in time when no unmeasured pixel is left.

Stereoscopic Shape Data

The stereoscopic shape data is data for measuring the shape of the measurement object with the pattern projection method. The stereoscopic shape data does not need to include height information. That is, even data, height information of which is not measured, is referred to as stereoscopic shape data when the data includes data, height information of which can be calculated.

Procedure of Automatic Depth Expansion

Figure 23:
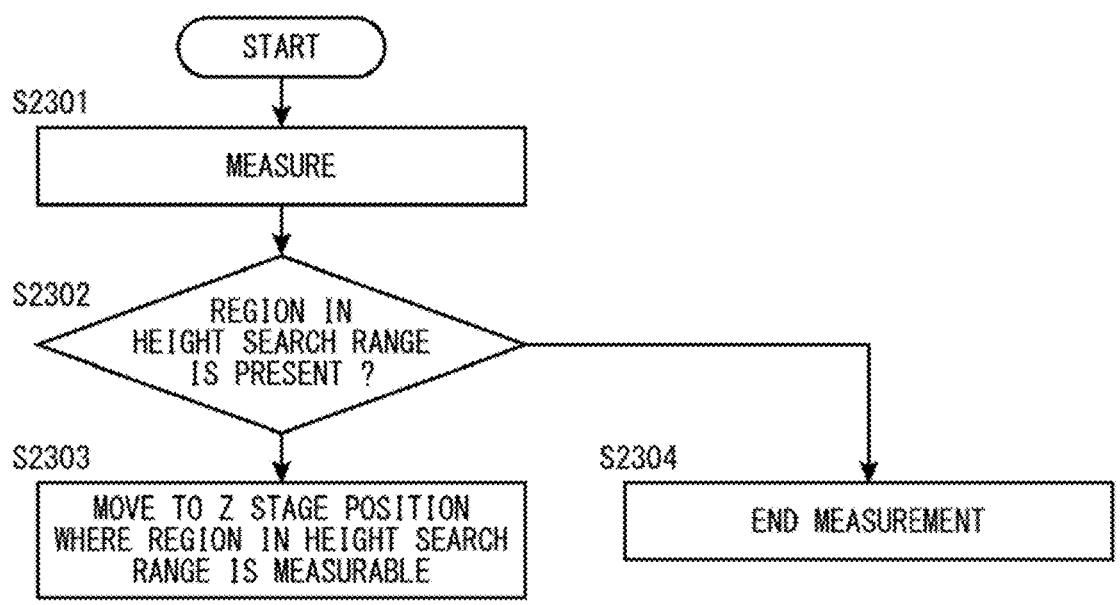
FIG. 23 is a flowchart showing a procedure of automatic depth expansion.
Figure 24A:
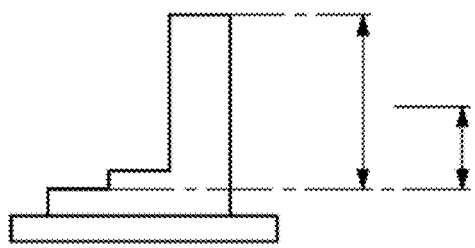
FIGS. 24A to 24D are schematic diagrams for explaining automatic depth expansion according to an example 2.
Figure 24B:
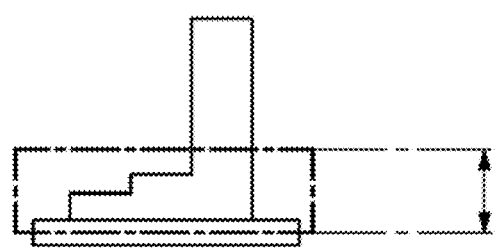
Figure 24C:
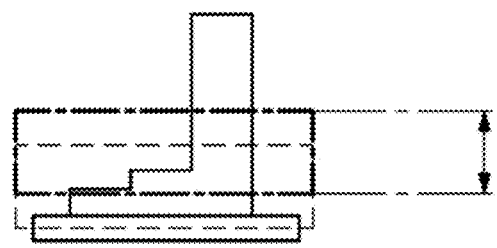
Figure 24D:
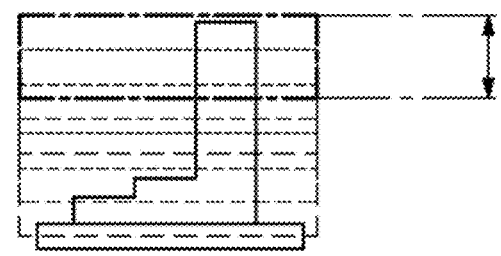

A procedure of such automatic coupling is shown in FIG. 23. First, in step S3801, the shape measuring device performs measurement. Subsequently, in step S3802, the shape measuring device determines whether a region having corresponding height is present in the depth search range. When the region having the corresponding height is present, the shape measuring device proceeds to step S3803 and moves the Z stage 142 to a Z-stage position where a region having the corresponding height in the depth search range can be measured. In this case, an already-measured Z-stage position is excluded. When a plurality of candidate Z-stage positions are present, the shape measuring device moves the Z stage 142 to a closest position. The shape measuring device returns to step S3801 and repeats processing such as the measurement. On the other hand, when determining in step S3802 that the region in the depth search range is absent, the shape measuring device proceeds to step S3804 and ends the measurement.

In this way, in the measurement in the respective positions of the Z stage 142, height information outside the depth measurement range is stored in the depth search range. Consequently, even if Z-stage positions to which the Z stage 142 should be moved are present on both the upper and lower sides, it is possible to expand depth in both the upward and downward directions. By preventing the Z stage 142 from moving to a Z-stage position measured once, it is possible to prevent a situation in which the measurement is performed in an infinite loop.

According to such a procedure, it is possible to perform coupled measurement covering all heights of the measurement object. The measurement ends at a point in time when the movement of the Z stage 142 is unnecessary. Therefore, a total time of the coupled measurement is always the shortest.

In the automatic depth expansion, an upper limit height of the Z stage 142 can also be set. The upper limit height of the Z stage 142 is set to a specified value on the shape measuring device side as a maximum value of a Z-stage position during the automatic depth expansion. Besides, according to the height of the measurement object placed on the stage 140, the upper limit height may be automatically set taking into account a slight margin or the user may be capable of adjusting the specified value or the automatically set value or may be capable of designating any value. Consequently, it is possible to avoid a situation in which the Z stage excessively rises during the automatic depth expansion and the measurement object on the stage collides with the lens.

Modification Concerning the Optical System

In the shape measuring device according to the first embodiment explained above, the configuration is explained in which the light receiving section 120 configuring the imaging section is a single-lens camera and the two light projecting sections 110 are provided above the measurement object to project lights from the left and right two directions. However, the present invention does not limit the configuration of the optical system to this configuration. Other optical systems can also be adopted. For example, the shape measuring device can also cause the light projecting section to project light from only one direction using the single-lens camera as the light receiving section. Alternatively, the shape measuring device may cause the light projecting section to project light from one direction using a double-eye camera as the light receiving section instead of the single-eye camera.

Modification Concerning the Measurement Principle

In the shape measuring device according to the first embodiment, the triangulation method by a gray code and multi slit projection is adopted as the measurement principle for measuring a three-dimensional shape of the measurement object. However, the measurement principle for measuring a three-dimensional shape of the measurement object is not limited to the triangulation method. Other systems can also be used as appropriate. Methods such as a triangulation method by sine wave light projection, a triangulation method by random pattern light projection, and a triangulation method by line light projection and scan can be used.

Modification Concerning the Moving Mechanism for the Measurement Object

Further, in the shape measuring device according to the first embodiment explained above, the configuration for directly moving the Z stage 142 is adopted as the mechanism for moving the Z stage 142. However, the present invention does not limit a moving mechanism for the measurement object to this configuration. Other configurations can also be used as appropriate. For example, a moving stage having six degrees of freedom of translation and rotation concerning X, Y, and Z axes may be used. Alternatively, the measurement object may be manually automatically moved.

Modification Concerning a Working Distance Adjustment Mechanism for the Measurement Object Further, in the shape measuring device according to the first embodiment explained above, the configuration for moving the Z stage 142 and adjusting the working distance between the measurement object and the light receiving section 120 is adopted. However, the present invention does not limit an adjusting mechanism for the working distance to this configuration. Other configurations can be used as appropriate. For example, the light receiving section side may be moved.

Example 2: Automatic Depth Expansion Based on an End Portion of a Single Height Image In the example explained above, the procedure of the automatic depth expansion for determining the necessity of the depth expansion on the basis of the cumulative image obtained by accumulating the acquired pixels is explained. However, the present invention does not always require accumulation of pixels in the past in depth expansion and automatic coupling in the height direction of an image. For example, it is also possible to determine the necessity of the depth expansion from a single height image. Such an example is explained below as a second example. As shown in FIGS. 24A to 24D, a height image is acquired in a certain depth measurement range. It is determined whether obtained one height image has stereoscopic shape data at an end portion of the depth measurement range, that is, an upper limit or a lower limit of the depth measurement range. For example, when the height image has stereoscopic shape data at one end portion, it is surmised that the measurement object is highly likely to extend to the outer side of the depth measurement range. Height measurement is performed by changing the depth measurement range. It is determined whether the height image has stereoscopic shape data at the end portion in the same manner in the depth measurement range after the change. When the height image has stereoscopic shape data in the same manner, processing is continued by further changing the depth measurement range. On the other hand, when stereoscopic shape data is absent at the end portion, the processing in this direction is ended, it is determined whether stereoscopic shape data is present at the other end portion, and the same processing is performed. When stereoscopic shape data is absent at both the end portions, the processing is ended. The above explanation is an example. For example, when stereoscopic shape data is present at both the end portions, after the depth measurement range is expanded to one end portion, the depth measurement range may be expanded to the other end portion. However, in this method, after the Z stage is expanded in the direction of one end portion, the Z stage is returned to an original position and expanded in the direction of the other end portion. A movement amount of the Z stage is likely to increase. Therefore, as explained above, it is desirable to continue the expansion in one of the upward and downward directions once and thereafter expand the depth measurement range in the other direction.

Example 3: Automatic Depth Expansion Based on a Pixel in a Range of a Single Height Image Further, the present invention is not limited to the method of determining presence or absence of expansion of the depth measurement range according to whether stereoscopic shape data is present at the end portion of the single height image explained above. The depth measurement range may be expanded if a pixel in which stereoscopic shape data can be measured in the depth measurement range. That is, if, in a height image acquired in a certain depth measurement range, at least one pixel in which stereoscopic shape data can be measured is present in the depth measurement range, it is surmised that the measurement object is present and depth expansion in the direction of the measurement object is continued. In this embodiment, since the determination can be performed only because the height image includes the stereoscopic shape data, there is an advantage that the determination processing can be simply performed.

Shape Measuring Program Having an Automatic Depth Expansion Measuring Function

Examples of a user interface screen of a shape measuring program having an automatic depth expansion measuring function are shown in FIGS. 25 to 29. The shape measuring program shown in these figures also includes the image display region 410 and the operation region 420. The image display region 410 is a region for displaying a texture image and a height image of the measurement object. The operation region 420 is a region mainly for the user to instruct various kinds of operation and for giving explanation and guidance of operation content to the user. In the screen shown in FIG. 25 and the like, the image display region 410 is disposed in most of the screen from the left side and the operation region 420 is disposed on the right side. Further, above the image display region 410, as a form of an imaging setting section that performs setting of an imaging condition, an imaging setting region 510 for performing magnification display, focus adjustment, and the like on an image displayed in the image display region 410 is disposed. The disposition of these components is an example. The disposition, the sizes, and the like of the members can be changed as appropriate.

Observation-Mode Switching Section

Observation based on a height image and observation based on a texture image can be performed from the shape measuring program. Switching of the observation is performed from an observation-mode switching section. In the example shown in FIG. 25, as a form of the observation-mode switching section, a "3D measurement" tab 531 and an "image observation" tab 532 are provided in the operation region 420. It is possible to switch an observation mode by selecting one of the tabs. When the "3D measurement" tab 531 is selected, observation of generation of a height image, measurement based on the generated height image, and the like can be performed. On the other hand, when the "image observation" tab 532 is selected, observation of measurement based on a texture information and the like can be performed.

Full-Auto Observation Mode

To execute the automatic depth expansion measuring function with the shape measuring program, a "full-auto" button 533 is pressed on the screen shown in FIG. 25. Consequently, a full-auto observation mode, that is, an automatic depth expansion measurement mode is selected. In the full-auto observation mode, expansion in the depth direction is automatically performed. A synthesized height image of the measurement object displayed in the image display region 410 is acquired.

Manual Observation Mode

Figure 26:
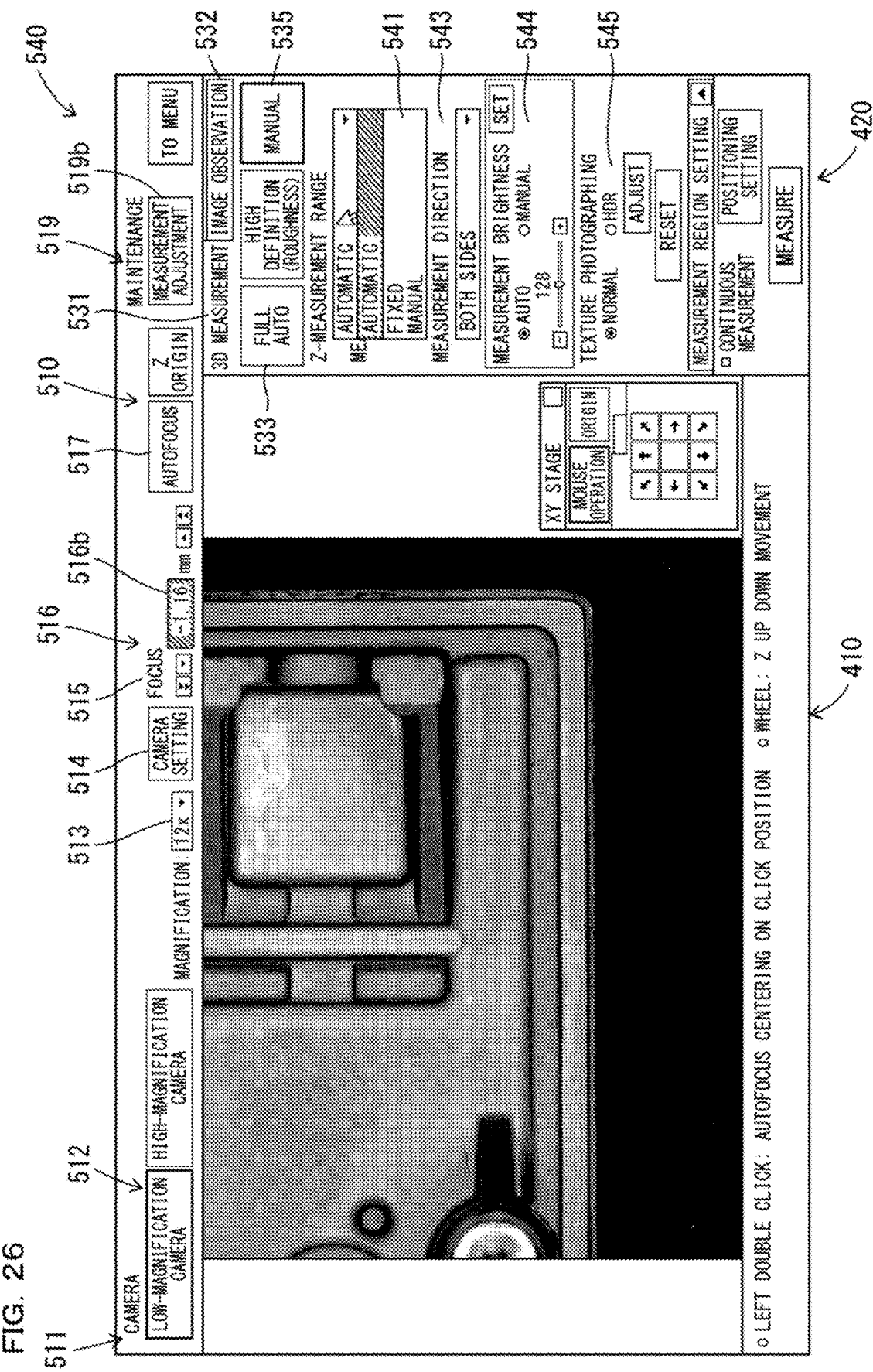
FIG. 26 is an image diagram showing an example in which measurement mode selection is performed.

On the other hand, to execute the manual depth expansion measuring function with the shape measuring program, a "manual" button 535 is pressed on the screen shown in FIG. 25. Consequently, a manual observation mode is selected. Expansion in the depth direction can be manually performed. An example of the manual observation mode is shown in FIG. 26. On a manual observation screen 540 shown in this example, a "Z-measurement range" designation field 541, a "measurement mode" selection field 542, a "measurement direction" designation field 543, a "measurement brightness" setting field 544, and a "texture photographing" selection field 545 are provided in the operation region 420.

"Z-Measurement Range" Designation Field 541

The "Z-measurement range" designation field 541 is a form of the depth-expansion-mode selecting section 254 that selects the depth expansion measurement mode. In this example, as shown in FIG. 26, in the "Z-measurement range" designation field 541, the user can select any one of "automatic", "measurement", and "manual" from a drop box. When the "automatic" is selected, an automatic depth expansion mode for automatically executing the depth expansion measurement is selected. When the "manual" is selected, a manual depth expansion mode for the user to manually execute the depth expansion measurement is selected. On the other hand, when the "measurement" is selected, measurement of a predetermined depth range is performed. In other words, the depth range is not expanded and a height image is generated in a predetermined height range measurable by the shape measuring device. The measurement is equivalent to the one-shot measuring function for performing one time of measurement with the Z-stage height fixed explained above.

Figure 27:
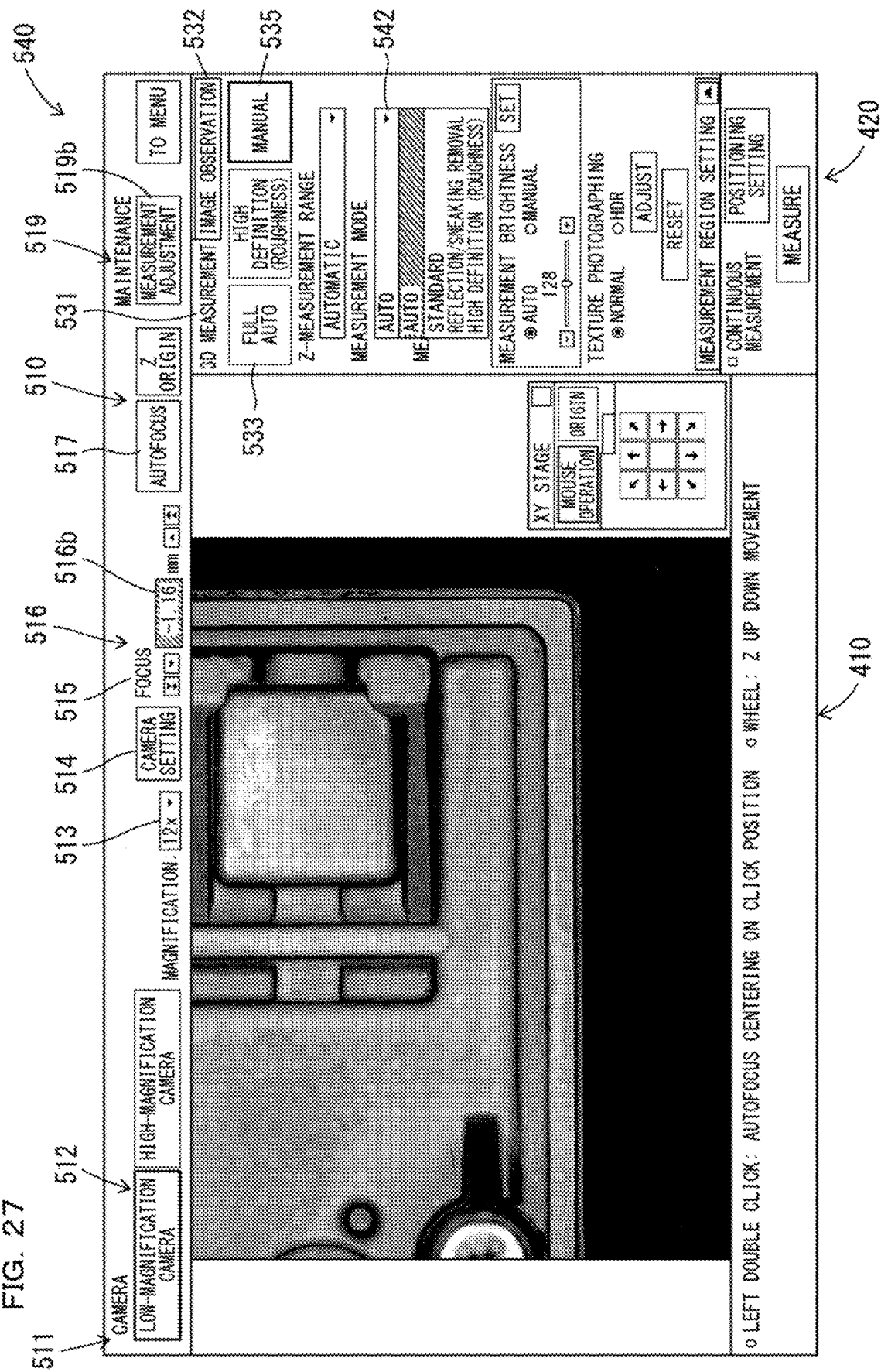
FIG. 27 is an image diagram showing an example in which depth expansion mode selection is performed.

The "measurement mode" selection field 542 is a form of the measurement-mode selecting section 257 that selects a measurement mode. The measurement mode is a mode for adjusting an imaging condition of a stripe image captured in generation of a height image to make it possible to perform measurement corresponding to a use of observation. A plurality of measurement modes are prepared in advance. The user selects a desired measurement mode according to, for example, a purpose of observation. In the "measurement mode" selection field 542, any one of the plurality of measurement modes is designated. As shown in FIG. 27, any one of "auto", "standard", "reflection/sneaking removal mode", and "high definition (roughness)" can be selected from a drop box.

When the "auto" is selected, an auto measurement mode for automatically selecting an appropriate measurement mode out of the plurality of measurement modes is selected.

When the "standard" is selected, a standard measurement mode is selected.

When the "reflection/sneaking removal" is selected, a reflection/sneaking light removal mode suitable for removal of reflection of projected light and sneaking light is selected. This measurement mode is called fine measurement mode and the like as well. In the reflection/sneaking light removal mode, projection patterns of measurement light are finer than projection patterns in the standard measurement mode. The reflection/sneaking light removal mode is a mode for removing indirect light components such as sneaking light, multiple reflection, and irregular reflection. The reflection/sneaking light removal mode is highly effective when the measurement object is a semitransparent body such as clouded resin and an uneven metal body such as a screw. Time required for measurement is longer than the time in the standard measurement mode.

When the "high definition (roughness)" is selected, a high definition mode for generating a higher definition height image such as measurement of roughness of the surface of the measurement object is selected.

Other measurement modes may be added. For example, a halation removal measurement mode has the same projection patterns as the projection patterns of the standard measurement mode. However, the halation removal measurement mode is a measurement mode for expanding and measuring a dynamic range by changing an exposure time or a projected light amount of measurement light. Consequently, there is an effect that black solid and white void can be prevented in an object having an intense contrast difference. For example, the halation removal measurement mode is effective in an object in which black resin is embedded in a metal body. Time required for measurement is longer than the time in the standard measurement mode. Further, a superfine measurement mode is a combination of the reflection/sneaking light removal mode and the halation removal measurement mode. Accuracy can be improved most. However, time required for measurement is the longest.

In the "measurement direction" designation field 543, the light projecting section 110 is designated. One or both of the first light projecting section 110A and the second light projecting section 110B shown in FIG. 4 can be selected. In the example shown in FIG. 28, anyone of "only left side", "only right side", and "both" can be selected from a drop box provided in the "measurement direction" designation field 543.

When the "only left side" is selected, the first light projecting section 110A shown in FIG. 4 is selected and only projected light from the left side is obtained. When the "only right side" is selected, the second light projecting section 110B shown in FIG. 4 is selected and light is projected from only the right side. When the "both" is selected, the first light projecting section 110A and the second light projecting section 110B shown in FIG. 4 are selected and lights are projected from both the sides.

Figure 29:
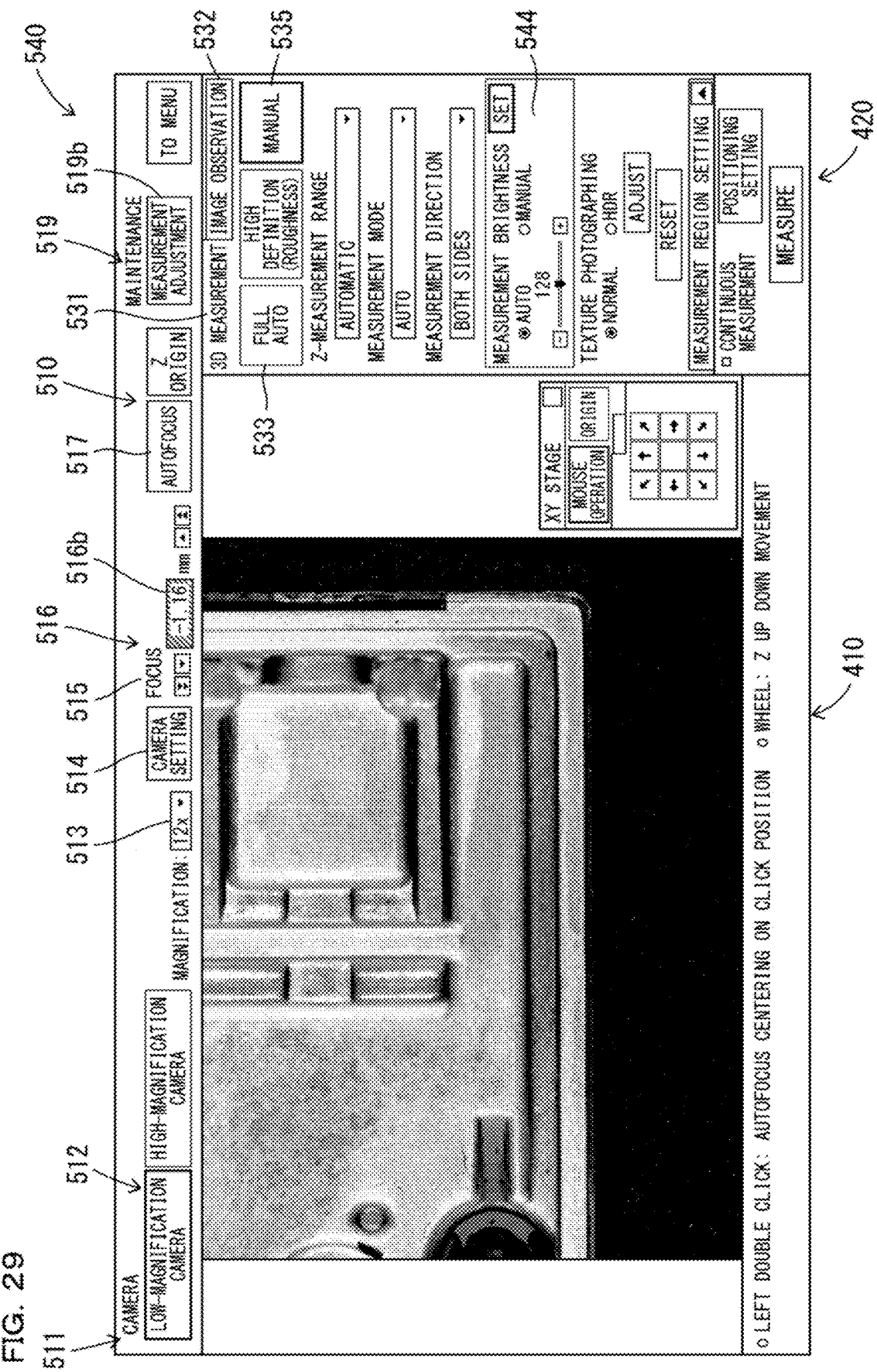
FIG. 29 is an image diagram showing an example in which measurement brightness setting is performed.
Figure 30:
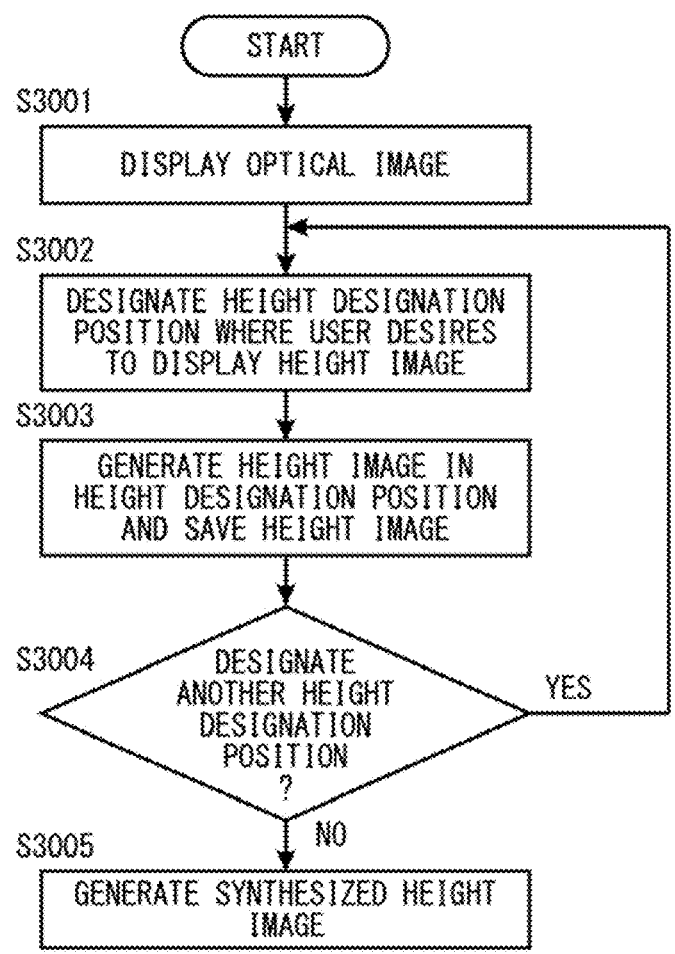
FIG. 30 is a flowchart showing a procedure of manual depth expansion.

In the "measurement brightness" setting field 544, the brightness of an image displayed in the image display region 410 is adjusted. Adjustment of the brightness of a texture image can be performed by adjusting, for example, an exposure time and shutter speed of the light receiving section 120, which is the imaging section. In the "measurement brightness" setting field 544, it is possible to switch, with a radio button, auto brightness adjustment for automatically performing the adjustment of the brightness of the texture image and manual brightness adjustment for manually adjusting the brightness of the texture image. For example, as shown in FIG. 29, when the "auto" is selected, brightness is automatically adjusted to appropriate brightness according to an image currently displayed in the image display region 410. When the "manual" is selected, the user can manually adjust the brightness of the image. The brightness of the texture image is adjusted by a slider. The brightness of the image displayed in the image display region 410 is reflected, on a real time basis, on the brightness after the adjustment in the "measurement brightness" setting field 544.

Texture-Image Selecting Section 460

In the "texture photographing" selection field 545, which is a form of a texture-image selecting section 460, a texture image to be photographed is selected. "Normal" and "HDR" can be selected by a radio button. When the "normal" is selected, a normal texture image is photographed. On the other hand, when the "HDR" is selected, an HDR image is photographed. Other texture images can also be selected. For example, a depth synthesized image can also be selected.

Example 3: Manual Depth Expansion

Figure 31A:
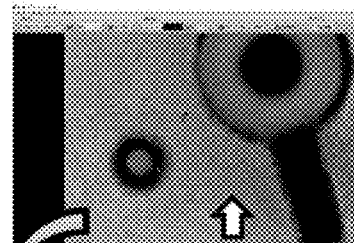
FIG. 31A is an image diagram showing an optical image A in which a measurement object is displayed.

In the example explained above, the example is explained in which the depth expansion and the coupled measurement are automatically performed. However, the present invention is not limited to the configuration for automatically performing the depth expansion. The depth expansion can be manually performed. A procedure for manually performing the depth expansion using the manual depth expanding function and generating a synthesized height image from a plurality of height images having different heights is explained with reference to a flowchart of FIG. 30 and FIGS. 31A to 31G. First, in step S3001, the shape measuring device causes the display section 400 to display an optical image of a measurement object, a synthesized height image of which the user desires to acquire. The shape measuring device causes the user to place the measurement object on the Z stage 142, acquires an optical image, and causes the display section 400 to display the optical image. As an example, an optical image A in which the measurement object is displayed is shown in FIG. 31A. At this time, the user may perform adjustment of a focal position or the adjustment of the focal position may be automatically performed. Alternatively, the adjustment of the focal position may not be performed. Examples of a method of automatically adjusting the focal position include a method of clicking a mouse in a desired position on the optical image to automatically focus on a designated position.

In step S3002, the user designates, as a height designation position, a position where the user desires to acquire a height image. On the optical image displayed on the display section 400, the user designates, with the operation section, a height designation position where the user desires to acquire a height image. At this time, since the optical image is a two-dimensional image, designation of the height designation position is designation on the XY plane. For example, when the user clicks a desired position on the display section 400, a Z-coordinate position of the XY plane is recorded as the height designation position. The autofocus may be automatically executed on the basis of the height designation position. Consequently, it is possible to more clearly display the optical image in the height designation position.

Figure 31B:
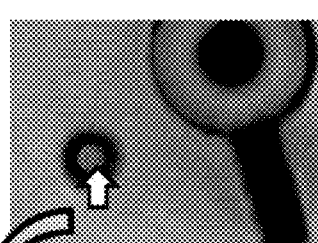
FIG. 31B is an image diagram showing an optical image B in a focal position higher than a focal position in FIG. 31A.
Figure 31C:
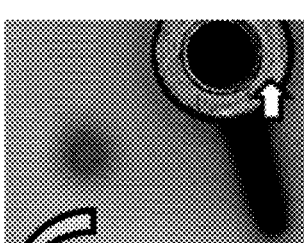
FIG. 31C is an image diagram showing an optical image C in a focal position higher than the focal position in FIG. 31B.
Figure 31D:
FIG. 31D is an image diagram showing a height image D shown in FIG. 31A.

In step S3003, the shape measuring device generates a height image in the designated height designation position. For example, the user presses a height image generation button on the user interface screen of the shape measuring program. Consequently, the shape measuring device acquires height information (a Z coordinate) in the designated height designation position (XY coordinate) and generates a height image in a predetermined depth measurement range on the basis of the height information. As an example, a height image D obtained in a height designation position designated on the optical image A shown in FIG. 31A is shown in FIG. 31D. The height image D does not always need to be displayed on the display section and may not be displayed. The shape measuring device can perform processing on the background without causing the user to be aware of intermediate generation work for a height image. However, the shape measuring device may display the height image D and cause the user to confirm the height image D. The shape measuring device temporarily saves the generated height image D in order to use the height image D in generation processing for a synthesized height image explained below.

When receiving the designation of the height designation position in step S3002, the shape measuring device may automatically execute the generation of the height image in step S3003. Consequently, the labor and time of the operation on the user side can be reduced. For example, when the user single-clicks any position on the optical image, the autofocus works and, when the user double-clicks any position on the optical image, the acquisition processing for a height image is executed. Consequently, the user can perform the adjustment of the focal position, the designation of the height designation position, and the generation processing for the height image with less operation.

In step S3004, the user determines whether another height designation position is designated. That is, the user determines whether a necessary number of height images are obtained in order to combine height images generated at different heights. The shape measuring device receives an instruction of the user concerning whether to designate another height designation position or end the designation of the height designation position and proceeds to generation of a synthesized height image.

When the user desires to add a height image, that is, when the user desires to further designate another height designation position, the user returns to step S3002 and designates another height designation position. At this time, the user designates a height designation position on the same image as the optical image on which the user has already designated the height designation position. In other words, the user does not change a visual field of the optical image. This is because it is necessary to acquire height images at different heights with respect to the measurement object in the same posture in order to generate a synthesized height image. If the user desires to change the visual field of the optical image, the user returns to step S3001 and repeats the processing from the display of the optical image.

Figure 31E:
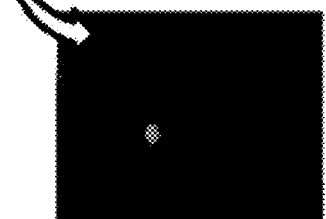
FIG. 31E is an image diagram showing a height image E shown in FIG. 31B.
Figure 31F:
FIG. 31F is an image diagram showing a height image F shown in FIG. 31C.

In the designation of another height designation position, it is necessary to designate, on the optical image, height different from the height of the already designated height designation position. Therefore, it is desirable to change the focal position of the optical image. In this case, the user manually adjusts the focal position. Besides, the focal position may be automatically adjusted. For example, as explained above, it is possible to use a method of automatically executing the autofocus at a designated position when the user clicks a desired position on the optical image. As an example, an example of an optical image B in which a position higher than the height designation position designated in FIG. 31A is designated as a height designation position with respect to the same measurement object as the measurement object shown in FIG. 31A is shown in FIG. 31B. An optical image C adjusted to a focal position higher than a focal position shown in FIG. 31B is shown in FIG. 31C. Further, a height image E generated in the height designation position designated in FIG. 31B is shown in FIG. 31E. A height image F generated in a height designation position designated in FIG. 31C is shown in FIG. 31F.

In this way, the user needs to acquire a plurality of height images in different height ranges such that the height images include all ranges of the measurement object. It is desirable to sequentially designate height designation positions from a low position to a high position or from a high position to a low position in different heights of the measurement object. In order to make it possible to appropriately designate such a plurality of different height designation positions, for example, height information of designated height designation positions may be displayed in a designated height designation position display field on the display section 400. A list of height information may be updated every time a height designation position is added.

When the additional height designation position is designated in this way, similarly, the shape measuring device proceeds to step S3003, generates a height image in the designated height designation position, and temporarily saves the height image. In step S3004, similarly, the shape measuring device determines necessity of an additional height designation position.

Figure 31G:
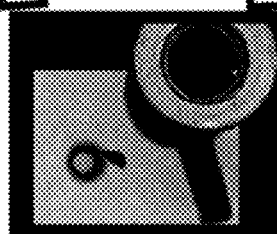
FIG. 31G is an image diagram showing a synthesized height image G obtained by combining the height images shown in FIGS. 31D, 31E, and 31F.

When the user determines that all the necessary height images are obtained in this way, the user proceeds to step S3005 and instructs generation of a synthesized height image. The shape measuring device combines the obtained plurality of height images in the depth direction and generates, with the synthesis processing section 216, a synthesized height image having a wider depth range. As an example, a synthesized height image G obtained by combining the height image D shown in FIG. 31D, the height image E shown in FIG. 31E, and the height image F shown in FIG. 31F is shown in FIG. 31G. In this way, the plurality of height images are combined. It is possible to obtain a height image in a height range wider than a height range physically measurable by the shape measuring device.

The procedure of the manual depth expansion explained above may be imparted with a guidance function to guide, with the shape measuring device, the user to perform a procedure that the user should perform. For example, if a shape measuring program causes the user to execute the manual depth expansion, it is possible to display, on the display section, operation that the user should perform and guide the user to perform a procedure that the user should perform. With this method, even a user unfamiliar with the operation of the shape measuring device can easily generate a synthesized height image if operation that the user should perform is presented to guide the user.

Automatic Image XY Coupling Function

Figure 32:
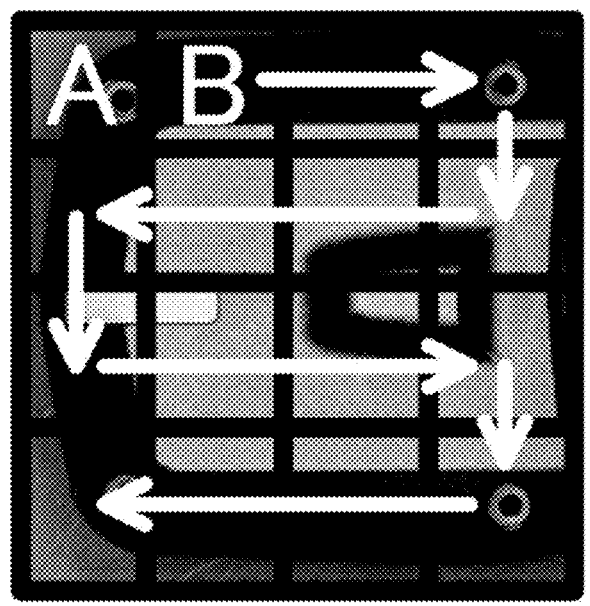
FIG. 32 is an image diagram showing a setting example of partial regions.

With the shape measuring device according to this embodiment, in image coupling for coupling stereoscopic shape data such as height images in the XY direction, it is also possible to individually adjust measurement setting in generating the stereoscopic shape data and automate work of the adjustment. For example, in XY coupling for coupling images on the XY plane, which is a plane orthogonal to the optical axis direction of the light receiving section, it is assumed that, as shown in FIG. 32, an image captured at low magnification or a coupled map image for navigation is formed as a wide area image, the wide area image is divided into a plurality of partial regions, and height images, which are stereoscopic shape data, generated in the partial regions are coupled in the XY direction to generate a synthesized height image. In such image coupling processing on the XY plane, in generating the height images in order in the partial regions, it is necessary to set measurement setting for performing measurement. If the measurement setting is set in common in the partial regions, height images with sufficient accuracy sometimes cannot be obtained. For example, when the measurement object is partially formed of a different material, for example, projected pattern light is multiply reflected on a glossy surface such as metal or the pattern light causes sneaking in a semitransparent resin portion. Consequently, correct height images are sometimes not obtained in normal measurement. In this case, whereas it is necessary to measure height images in measurement setting suitable for the multiple reflection and the sneaking of the light, generation of height images takes time because it is necessary to perform imaging a plurality of times. Therefore, when height images are generated in the same measurement setting in all the partial regions, total consumed time is long. Similarly, when a region where uneven undulation is large and a flat region are mixed in the measurement object, whereas it is necessary to drive the Z stage in the depth direction and repeat imaging at different heights in the region having level differences of unevenness, if the imaging at the different heights is repeated in the same manner in the flat region, unnecessary operations increase and more time is consumed. It is also conceivable that the user individually manually sets appropriate measurement setting for such various partial regions. However, this work is extremely time consuming.

Further, on the other hand, when the shape measuring device causes the user to display stereoscopic shape data after the measurement for each of the partial regions and the user desires to perform shape measurement of the partial region again, it is also conceivable to adopt a method of performing the measurement again after changing the measurement setting and, when a desired measurement result is obtained, replacing the stereoscopic shape data with stereoscopic shape data obtained anew. However, even in this case, the user has to confirm measurement results one by one and determine necessity of remeasurement. This method is time consuming. It is sometimes not easy to determine how the measurement setting should be changed to obtain the desired measurement result. This makes the work more complicated.

Therefore, in this embodiment, when such stereoscopic shape data such as the height images are XY-coupled to generate synthesized stereoscopic shape data, the adjustment work for the measurement setting is automated to make it possible to easily acquire stereoscopic shape data having a wide visual field. That is, the burden on the user is reduced by making it possible to individually automatically adjust setting conditions for the plurality of partial regions. In particular, it is possible to adjust the partial region measurement setting to appropriate conditions on the basis of light reception data and stereoscopic shape data once acquired, generate stereoscopic shape data again with the measurement setting for the partial regions after the adjustment according to necessity, and obtain stereoscopic shape data having higher quality or higher accuracy. It is also possible to omit the process of the automatic adjustment of the measurement setting and achieve simplification of the processing by saving the measurement setting for the partial regions adjusted for each of the partial regions to read out the measurement setting when inspection of the same measurement object is performed.

Measurement-Setting Automatically Adjusting Section 217

The measurement-setting automatically adjusting section 217 shown in FIG. 1 and the like performs such automatic adjustment of the measurement setting. In the image XY coupling, the measurement-setting automatically adjusting section 217 fully automatically performs the adjustment of the partial region measurement setting. Besides, the measurement-setting automatically adjusting section 217 may automatically adjust measurement setting set by the user with the measurement setting section 255 or, conversely, the user may adjust, with the measurement setting section 255, measurement setting automatically adjusted by the measurement-setting automatically adjusting section 217. In the automatic setting, the measurement-setting automatically adjusting section 217 can also adjust measurement setting set as an initial value on the shape measuring device side and use the measurement setting as adjusted measurement setting. In this way, the measurement-setting automatically adjusting section 217 fully automatically adjusts the measurement setting for generating stereoscopic shape data such as height images. Besides, the measurement setting may be semi-automatic combination with setting by the user. The measurement setting section 255 is a member for the user to manually set initial measurement setting. However, the measurement setting section 255 may be a member for inputting an initial setting value of the measurement setting prepared in advance on the shape measuring device side. The measurement setting for the partial regions is a condition obtained by automatically adjusting, with the measurement-setting automatically adjusting section 217, partial region measurement setting designated by the user or the initial setting value prepared on the device side.

Reflected Light and Sneaking Light Removal Mode

Figure 33:
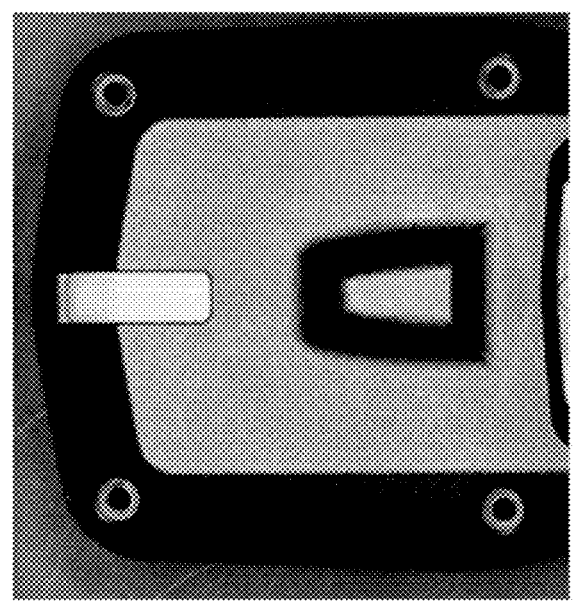
FIG. 33 is an image diagram showing an optical image of a measurement object shown in FIG. 32.
Figure 34A:
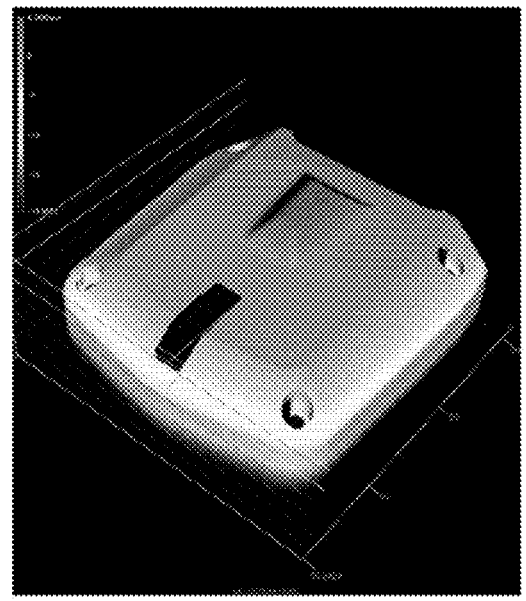
FIG. 34A is an image diagram of a height image generated in a normal measurement mode from the measurement object shown in FIG. 33.
Figure 34B:
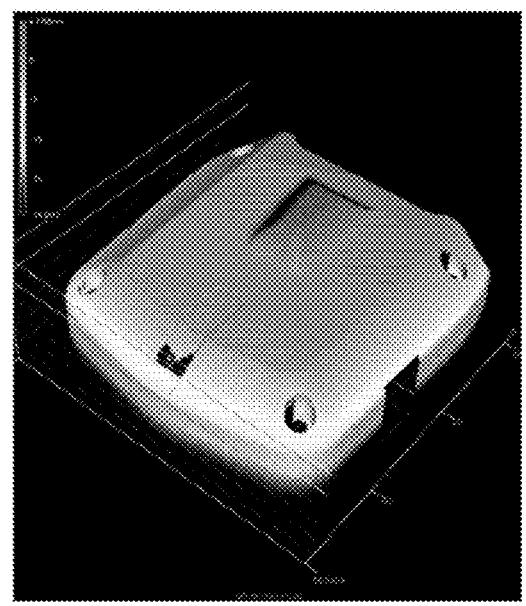
FIG. 34B is an image diagram of a height image generated in a reflection/sneaking light removal mode.

A measurement mode for performing, when reflected light and sneaking light are present, measurement in measurement setting for removing the reflected light and the sneaking light is explained. For example, an example of a height image generated when measurement is performed, in general measurement setting, on a measurement object including a semitransparent diffusion plate made of resin as shown in FIG. 33, that is, a height image generated from a strip image by projecting pattern light is shown in FIG. 34A. As shown in FIG. 34A, in a normal scan mode, the semitransparent diffusion plate portion cannot be successfully measured because of the influence of the sneaking light. Data of a height image is defective. On the other hand, an example of a height image measured when the measurement mode is set to a reflection/sneaking light removal mode is shown in FIG. 34B. As explained above, in the reflection/sneaking light removal mode, an indirect light component is reduced by setting a projection pattern of measurement light finer than usual. As a result of the measurement in the sneaking light removal mode, as shown in FIG. 34B, it is seen that the semitransparent diffusion plate portion can be measured in a relatively large portion.

However, in such a special measurement mode, a processing time is longer than usual. Therefore, when the measurement is performed in the sneaking light removal mode in all the partial regions or in all XY positions, a measurement time is long. Therefore, the measurement time can be reduced by using this measurement mode only for a region where a lot of sneaking light or multiple reflection light is present. In the example explained above, a height image is once generated in the standard measurement mode. In the partial region where the defective region occurs as shown in FIG. 34A, the partial region measurement setting is reset by the measurement-setting automatically adjusting section 217, a height image is generated again and substituted. Consequently, it is possible to obtain a height image with a small defective portion as shown in FIG. 34B.

Similarly, it is possible to compress the measurement time and efficiently perform the measurement processing by limiting a depth range in a region with a small level difference, although a depth range is expanded and measurement is performed concerning a region with a large level difference of the measurement object. For example, in the examples shown in FIGS. 34A and 34B, whereas long time is consumed when height ranges (ranges indicated by arrows in FIG. 32) of the measurement object are measured in all the XY positions, it is possible to reduce the measurement time by performing the measurement in the depth expansion measurement mode concern only regions in the outer periphery of the measurement object (the partial regions located around the coupled region in FIG. 32) and, on the other hand, not performing the Z-range expansion in the other Partial regions (the partial regions located on the inside of the coupled region in FIG. 32).

Distinction of Sneaking Light and a Void

Figure 35A:
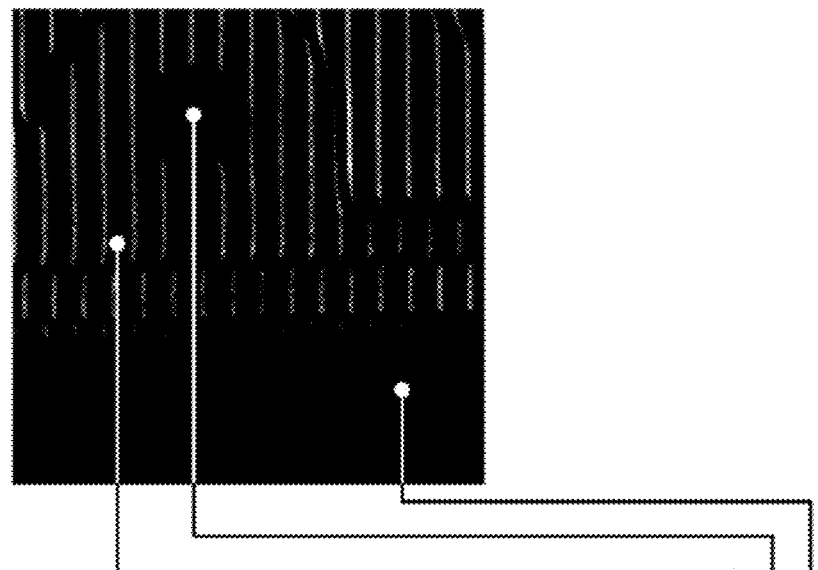
FIG. 35A is an image diagram of a stripe image of a certain measurement object.
Figure 35B:
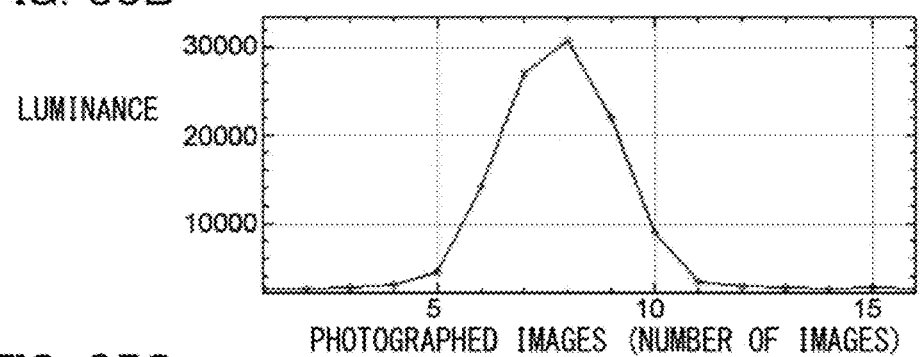
FIG. 35B is a luminance profile of a metal portion in the measurement object shown in FIG. 35A.
Figure 35C:
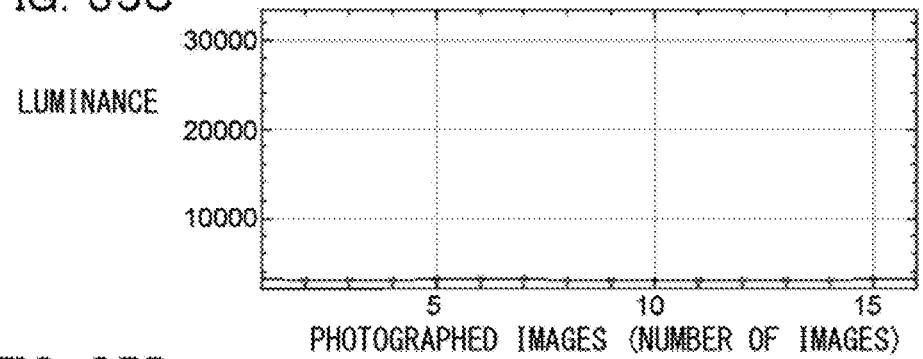
FIG. 35C is a luminance profile of a hole portion.
Figure 35D:
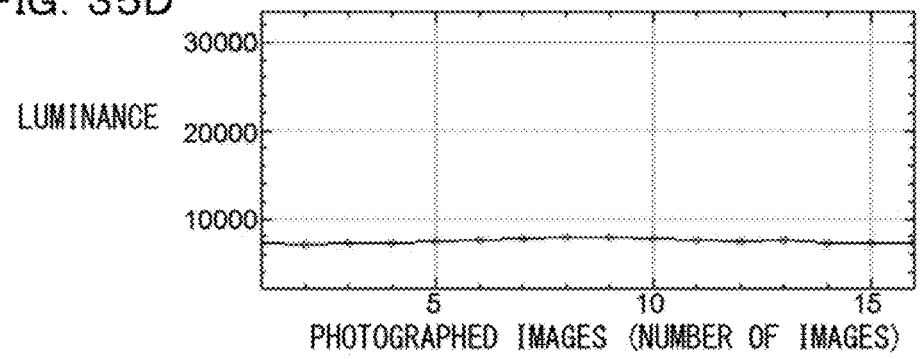
FIG. 35D is a luminance profile of a white resin portion.

In the automatic selection of the measurement mode, when a defective portion occurs in a part of a height image, the measurement-setting automatically adjusting section 217 distinguishes whether the defective portion is caused by sneaking light or a shape itself is defective in the first place (a void, a hole, or the like). In other words, when determining that the defective portion is caused by the sneaking light, the measurement-setting automatically adjusting section 217 performs remeasurement with the partial region measurement setting changed. However, when determining that the defective portion is caused by the void, the measurement-setting automatically adjusting section 217 does not perform the remeasurement. As example of such a determining method is explained with reference to FIGS. 35A to 35D. FIG. 35A shows an image diagram of a stripe image of a certain measurement object. FIG. 35B shows a luminance profile of a metal portion in the measurement object shown in FIG. 35A. FIG. 35C shows a luminance profile of a hole portion. FIG. 35D shows a luminance profile of a white resin portion. Concerning the metal portion shown in FIG. 35B, it is seen that a clear peak appears in the luminance profile and height information can be correctly measured. On the other hand, both of the hole portion shown in FIG. 35C and the white resin portion shown in FIG. 35D are black on the stripe image. Pattern light is not obtained. However, it is seen that, whereas a base portion of the luminance profile is nearly zero in the hole portion shown in FIG. 35C, constant displacement (luminance) is obtained in a base portion in the resin portion shown in FIG. 35D. In this way, in both of FIGS. 35C and 35D, although a peak is hardly obtained on the luminance profile, according to whether a luminance signal is obtained in the base portion, it is possible to distinguish, with the measurement-setting automatically adjusting section 217, whether a shape is absent or luminance is not obtained because of sneaking of light.

Procedure of Automatic-Image-XY-Coupling Processing

A procedure of automatic-image-XY-coupling processing for generating synthesized stereoscopic shape data is explained with reference to a flowchart of FIG. 36. First, in step S3601, the user initializes the position of the stage 140. The stage 140 is an electric XY stage.

Subsequently, in step S3602, the user places a measurement object on the XY stage. In this state, the user causes the display section to display an optical image, adjusts magnification (step S3603), and adjusts a focal position (step S3604). The order of these steps may be changed as appropriate.

Creation of a Map Image

In step S3605, the shape measuring device creates a map image. The map image is a wide area image having a visual field of the same degree as a visual field of synthesized stereoscopic shape data that the user desires to obtain. For the creation of the map image, it is possible to use, for example, a method of moving the XY stage in a swirl shape and a method of automatically moving the visual field.

Swirl-Shape-Map-Image Creating Method

Figure 37A:
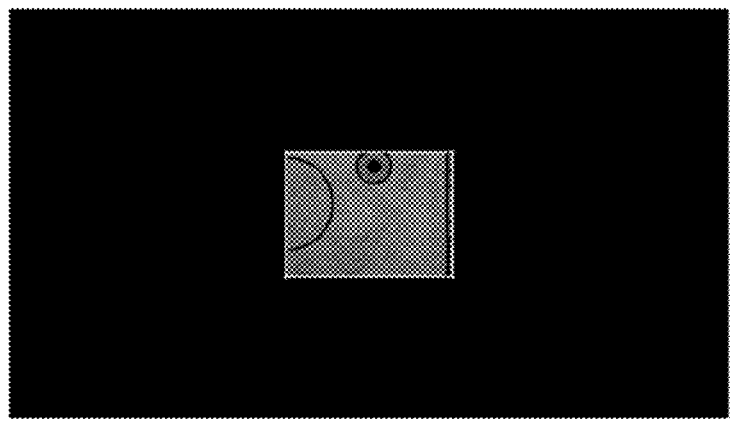
FIGS. 37A to 37C are image diagrams showing a state in which a map image is created in a swirl shape.
Figure 37B:
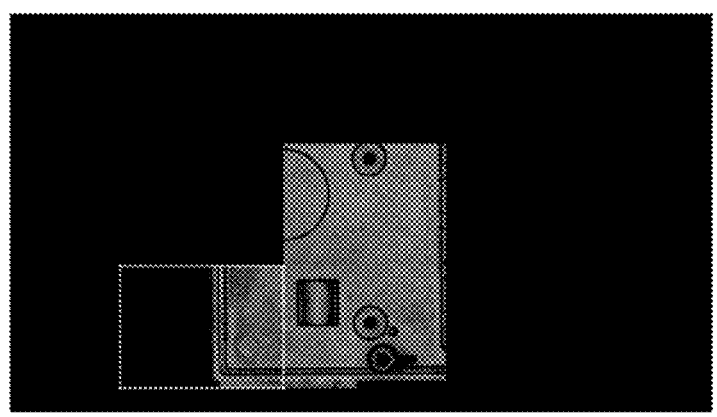
Figure 37C:
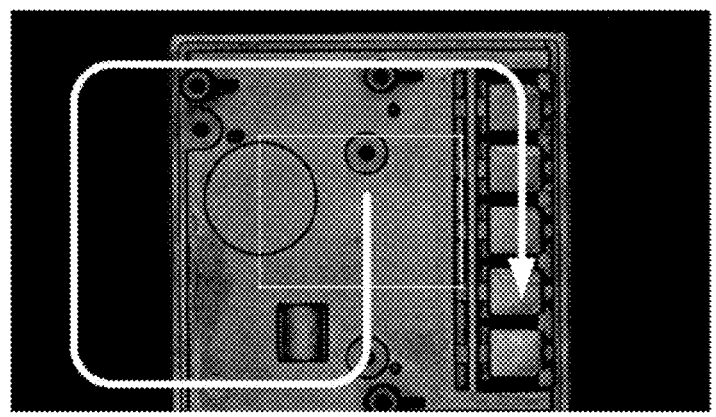

The method of moving the XY stage in a swirl shape is explained with reference to FIGS. 37A to 37C. First, the user designates an initial position. As shown in FIG. 37A, the user causes the display section to display a part of the measurement object. The initial position is desirably set near the center of the measurement object. After determining the initial position in this way, when the user instructs a start of swirl-shape map image creation, the visual field is automatically moved centering on the initial position. Optical images of the moved visual field are sequentially captured. For example, as shown in FIG. 37B, the visual field is moved downward from the initial position and an optical image is captured. The visual image is further moved to the left and an optical image is captured. In this way, the visual field is sequentially moved in a swirl shape and optical images in respective positions are captured. The shape measuring device moves the XY stage with the stage-plane-direction driving section 148 such that the visual field is moved clockwise centering on the initial position. In this way, the visual field is gradually enlarged and a map image is created. The user instructs an end of the swirl-shape-map-image creation processing at a point in time when a desired visual field of the measurement object is obtained while viewing the display section. For example, the user presses a stop button to end the swirl-shape-map-image creation processing. In this way, a map image is created in a swirl shape.

Designation of an XY-Coupled Region

Figure 38A:
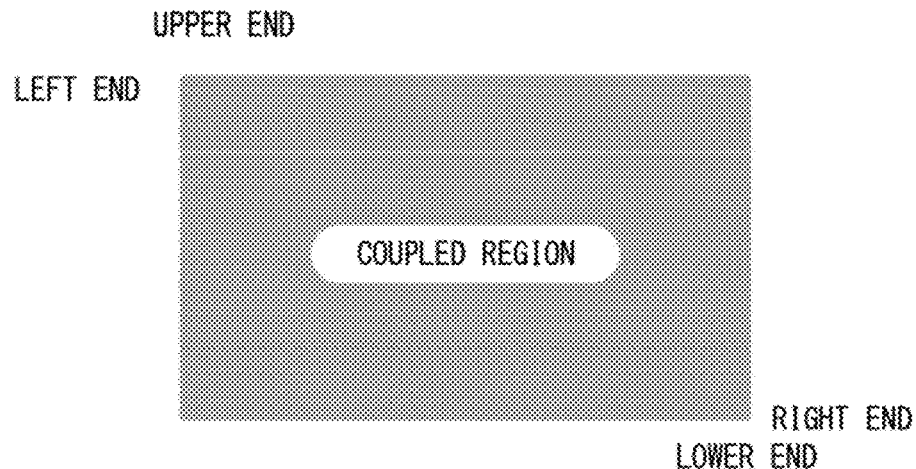
FIGS. 38A to 38C are image diagrams showing a method of manually designating a coupled region.
Figure 38B:
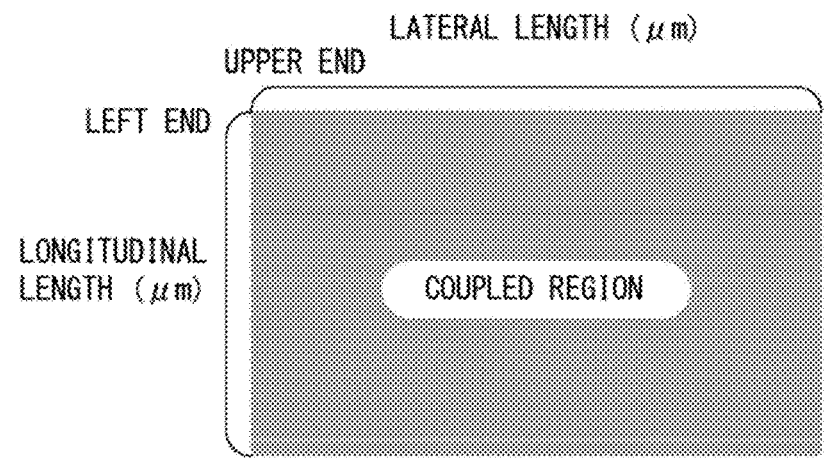
Figure 38C:
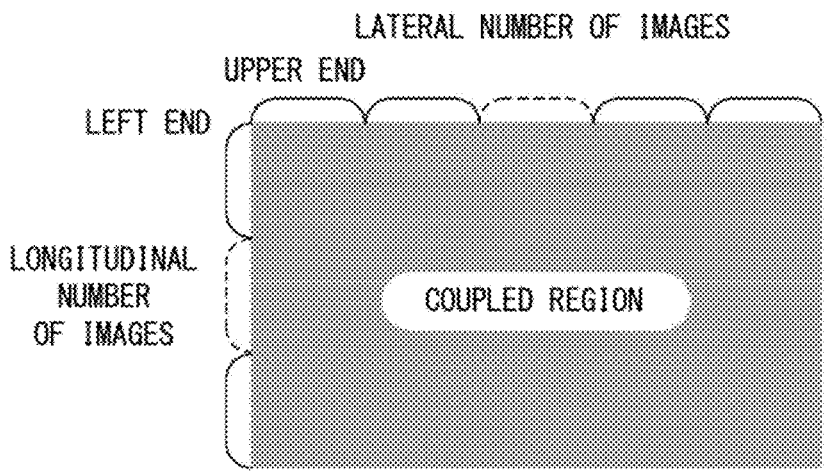

In step S3606, the user designates an XY-coupled region where XY coupling is performed. A designation method for an image XY-coupled region where automatic coupling is automatically performed is selected. Concerning the XY-coupled region, a method of manually designating the XY-coupled region and a method of automatically designating the XY-coupled region can be used. Examples of the method of manually setting the XY-coupled region are shown in FIGS. 38A to 38C. In these methods, the user manually sets a start point and an end point of an automatic XY-coupled region. For example, in the example shown in FIG. 38A, the user sets the start point and the end point of the automatic XY-coupled region. Specifically, the user designates positions of the start point (at the left end and the upper end) and the end point (the right end and the lower end) of the XY-coupled region while confirming an image displayed on a screen. Alternatively, as shown in FIG. 38B, the XY-coupled region may be designated by a "start point" and a "length". In this example, the user determines a position of the start point (the left end and the upper end) of the XY-coupled region and designates longitudinal and lateral lengths of the region from the start point. Alternatively, as shown in FIG. 38C, the XY-coupled region may be designated by a "start point" and a "number of images". In this example, the user determines a position of the start point (the left end and the upper end) of the XY-coupled region and designates how many images are measured and coupled longitudinally and laterally from the position.

Figure 39:
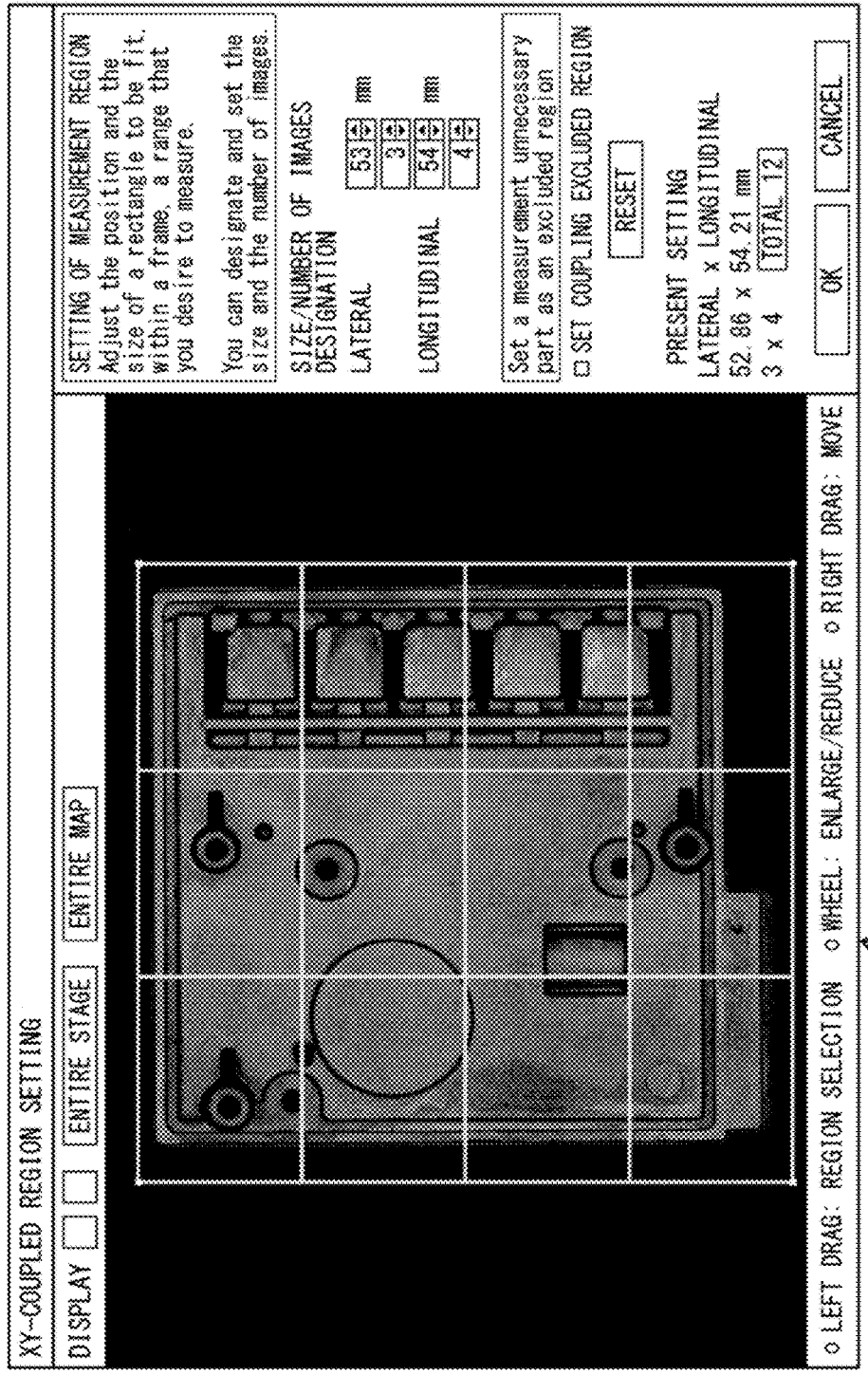
FIG. 39 is an image diagram showing a method of automatically setting a coupled region.

An example of the method of automatically setting the XY-coupled region is shown in FIG. 39. In this example, the shape measuring device sets, with image processing, an outer edge of the measurement object as an edge region and automatically determines the XY-coupled region such that the edge region is interpolated.

Automatic Setting Method for the XY-Coupled Region

Examples of such a method of automatically setting the XY-coupled region include a method of photographing a map image and determining the XY-coupled region before measurement and thereafter starting measurement and a method of determining the XY-coupled region while analyzing stereoscopic shape data during measurement. These methods are explained with reference to flowcharts of FIGS. 40 and 41.

Figure 40:
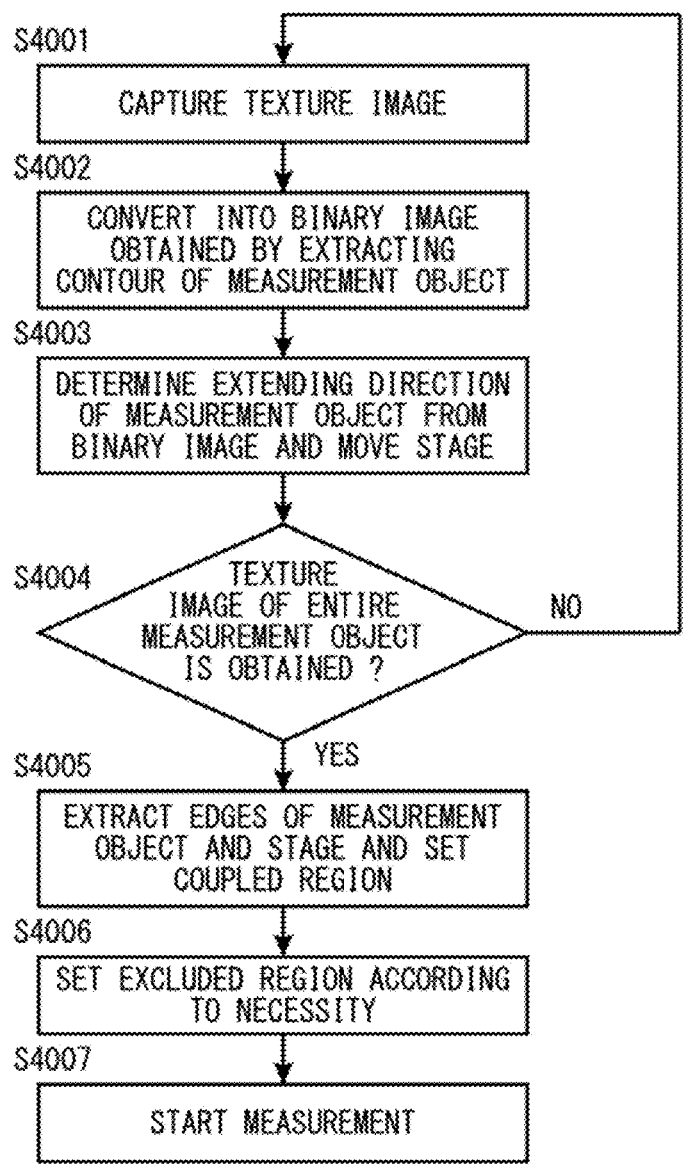
FIG. 40 is a flowchart showing a procedure for starting measurement after determining a coupled region in a map image.

First, a method of determining the XY-coupled region in a map image and thereafter starting measurement is explained with reference to the flowchart of FIG. 40. First, in step S4001, the shape measuring device photographs a texture image of a measurement object in the present position on the stage 140. Subsequently, in step S4002, the shape measuring device converts the texture image into a binary image obtained by extracting only a contour portion of the measurement object from the texture image. The shape measuring device extracts a stage surface and a contour of the measurement object. In step S4003, the shape measuring device determines from the binary image to which side of upper, lower, left, and right sides the measurement object extends and moves the XY stage in the direction of the side. In step S4004, the shape measuring device determines whether a texture image of the entire measurement object is obtained. When a texture image of the entire measurement object is not obtained, the shape measuring device repeats steps S4001 to S4003.

When a texture image of the entire measurement object is obtained, the shape measuring device proceeds to step S4005. The shape measuring device extracts edge portions of the measurement object and the stage surface from the map image and automatically sets an XY-coupled region in which the edge portions fit. Further, in step S4006, the user confirms a region set before a measurement start and sets an excluded region if necessary. Finally, in step S4007, the shape measuring device starts measurement in the XY-coupled region specified in this way.

Figure 41:
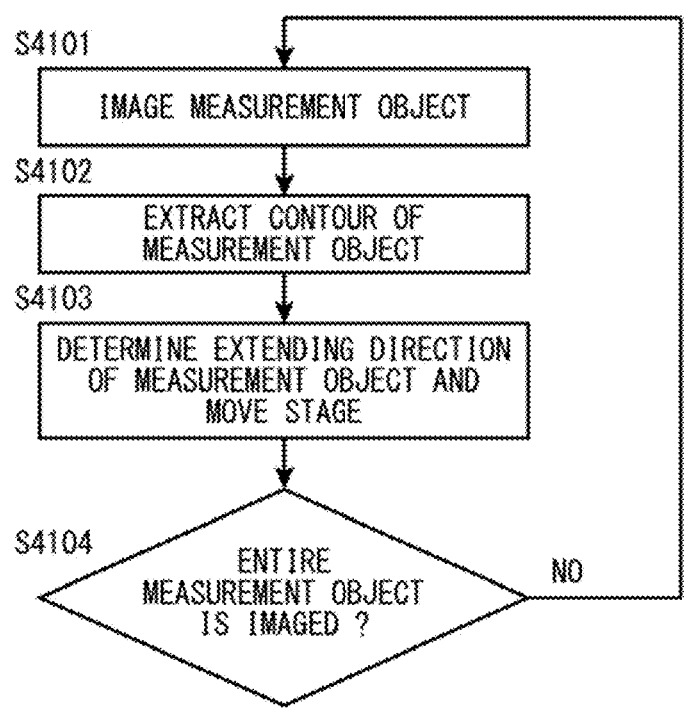
FIG. 41 is a flowchart showing a procedure for setting a coupled region while analyzing stereoscopic shape data during measurement.

A method of setting an XY-coupled region while analyzing stereoscopic shape data during measurement is explained with reference to the flowchart of FIG. 41. First, in step S4101, the shape measuring device performs measurement of a measurement object in the present position of the stage 140. The shape measuring device captures a texture image. Subsequently, in step S4102, the shape measuring device converts the texture image into a binary image obtained by extracting only a contour portion of the measurement object from the texture image. In step S4103, the shape measuring device determines from the binary image in which surface of upper, lower, left, and right surfaces the measurement object extends and moves the XY stage in the direction of the surface. Further, in step S4104, the shape measuring device determines whether a texture image of the entire measurement object is captured. When a texture image of the entire measurement object is not captured yet, the shape measuring device returns to step S4101 and repeats the work explained above. In this way, the shape measuring device captures the texture image of the entire measurement object. In this example, the method of setting the XY-coupled region on the basis of the texture image is explained. However, the method of setting the XY-coupled region is not limited to this method. For example, it is also possible to analyze stereoscopic shape data such as a height image and determine the XY-coupled region.

The XY-coupled region is automatically set in this way. Referring back to the screen shown in FIG. 39, an optical image, the magnification of which is adjusted such that the entire view of the measurement object is displayed, is displayed in the image display region 410. A rectangular XY-coupled region, which is a target of image coupling, is shown over the measurement object. Further, the XY-coupled region is divided into a plurality of partial regions and displayed in a grid shape. In this example, an automatically calculated XY-coupled region is automatically divided into partial regions. In this state, the user may change setting according to necessity while confirming the measurement object, the XY-coupled region, and the partial regions displayed in the image display region 410. In the example shown in FIG. 39, the longitudinal and lateral sizes and the number of the partial regions are displayed in an operation region to correspond to the partial regions displayed in the image display region 410. The user can adjust values of the sizes and the number of the partial regions. The shape measuring device can also display, in the operation region, a procedure that the user should perform and can guide setting. In this example, as "setting of a measurement region", "Adjust the position and the size of a rectangle to be fit, within a frame, a range that you desire to measure. You can designate and set the sizes and the number of the partial regions" is displayed.

A mask region where measurement is not performed may be set. In the example shown in FIG. 39, a "Set a coupling excluded region" check field is provided in the display region as a mask region setting section. As explanation of the mask region setting section, "Set a measurement unnecessary part as an excluded region" is displayed as a text to guide the user to set the excluded region.

It is not particularly necessary to include the entire region of the measurement object in the XY-coupled region. It is sufficient for the user to acquire stereoscopic shape data of only a part of attention on the measurement object such as a region where the user desires to perform measurement such as a region where the user desires to confirm a surface state, a part where the user desires to measure height, or a region where the user desires to inspect presence of absence of a crack or a chip. Accordingly, it is possible to efficiently perform shape measurement by, for example, setting a partial region only in a necessary region or setting a mask region in a region where measurement is unnecessary.

Figures 43, 44:
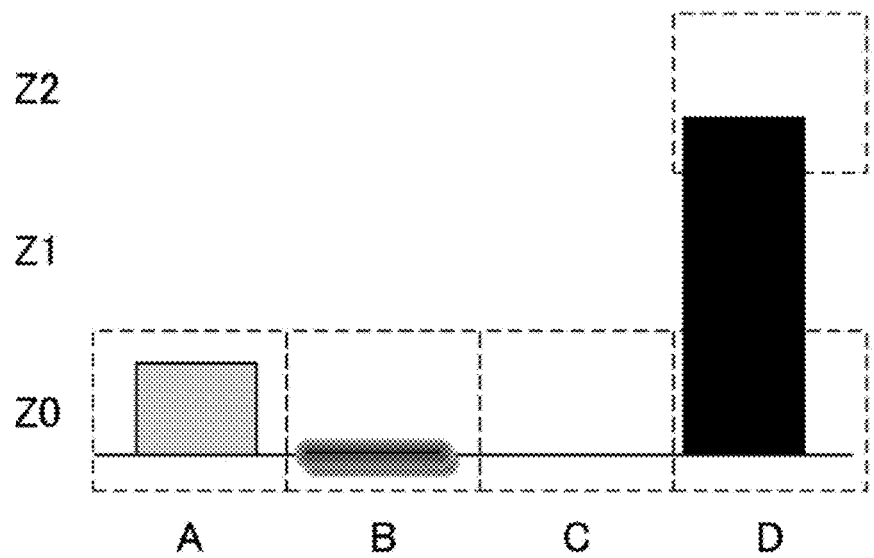
FIG. 43 is a side view showing a state in which a plurality of partial regions are set on a measurement object.
FIG. 44 is a table showing partial region measurement setting for each of divided measurement regions shown in FIG. 43.

In this specification, for convenience of explanation, the example is explained in which the XY-coupled region is divided into a plurality of partial regions. However, it is not always necessary to divide the XY-coupled region. For example, as shown in FIG. 43 referred to below, the user may individually designate a region that the user desires to perform measurement. In this way, in this specification, a plurality of measurement target regions are collectively referred to as XY-coupled region. A subset of the XY-coupled region is referred to as partial region.

Figure 28:
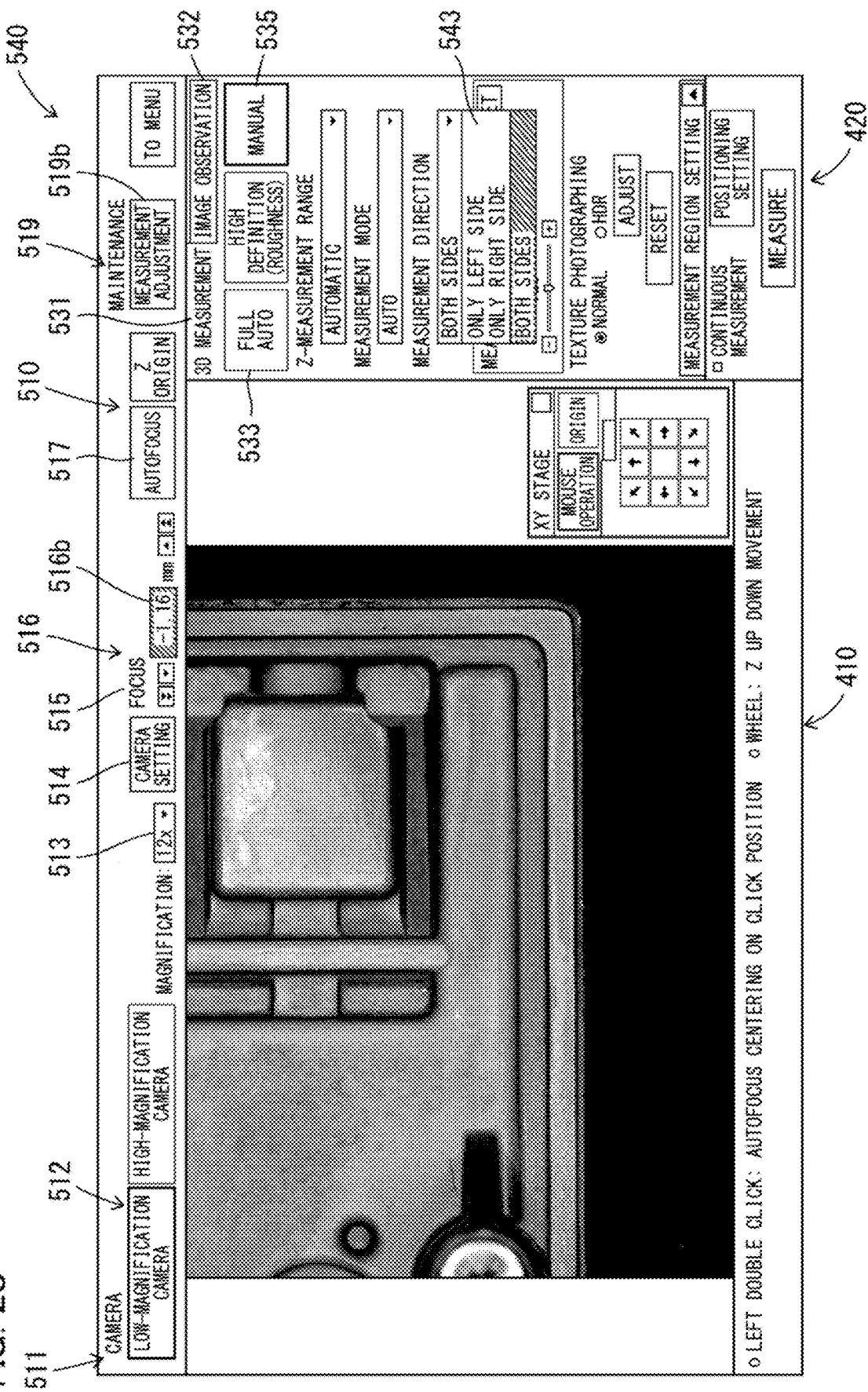
FIG. 28 is an image diagram showing an example in which measurement direction selection is performed.

In a state in which the XY-coupled region is set in this way, measurement setting for measuring stereoscopic shape data is set. The shape measuring device selects, with the depth-expansion-mode selecting section 254, a depth expansion measurement mode for determining presence or absence and a range of expansion in the depth direction as shown in FIG. 26, selects a measurement mode with the measurement-mode selecting section 257 as shown in FIG. 27, selects, with the measurement-direction designating section, a measurement direction by the light projecting section 110 as shown in FIG. 28, and sets, with the measurement-brightness setting section, brightness of an image displayed in the image display region 410 as shown in FIG. 29.

In a state in which the measurement setting is set in this way, the shape measuring device starts coupled measurement in step S3608. The shape measuring device receives pressing of the "measurement" button by the user. In step S3609, the shape measuring device executes measurement, generates stereoscopic shape data, and photographs a texture image.

Subsequently, in step S3610, the shape measuring device determines whether a region in the depth search range is present. When a region in the depth search range is present, the shape measuring device proceeds to step S3611. The shape measuring device moves the Z stage to a height position where the region in the depth search range can be measured. In this case, an already measured height position is excluded. When a plurality of height positions are present, the shape measuring device moves the Z stage to a closest height position. The shape measuring device returns to step S3609 and repeats the processing.

On the other hand, when a region in the depth search range is absent, the shape measuring device proceeds to step S3612 and determines whether all of synthesized image data in the coupled region are generated. When not all of the synthesized image data in the coupled region are generated, that is, when an unmeasured partial region is present, the shape measuring device moves the XY stage to the partial region in step S3613 and then returns to step S3609 and repeats the processing.

When ending the measurement of the partial regions and determining that all of synthesized height image data in the coupled region are generated, in step S3614, the shape measuring device causes the display section to display a generated synthesized height image.

In this way, it is possible to generate a wide area synthesized height image obtained by XY-coupling synthesized height images.

Automatic Adjustment of Partial Region Measurement Setting

Figure 42:
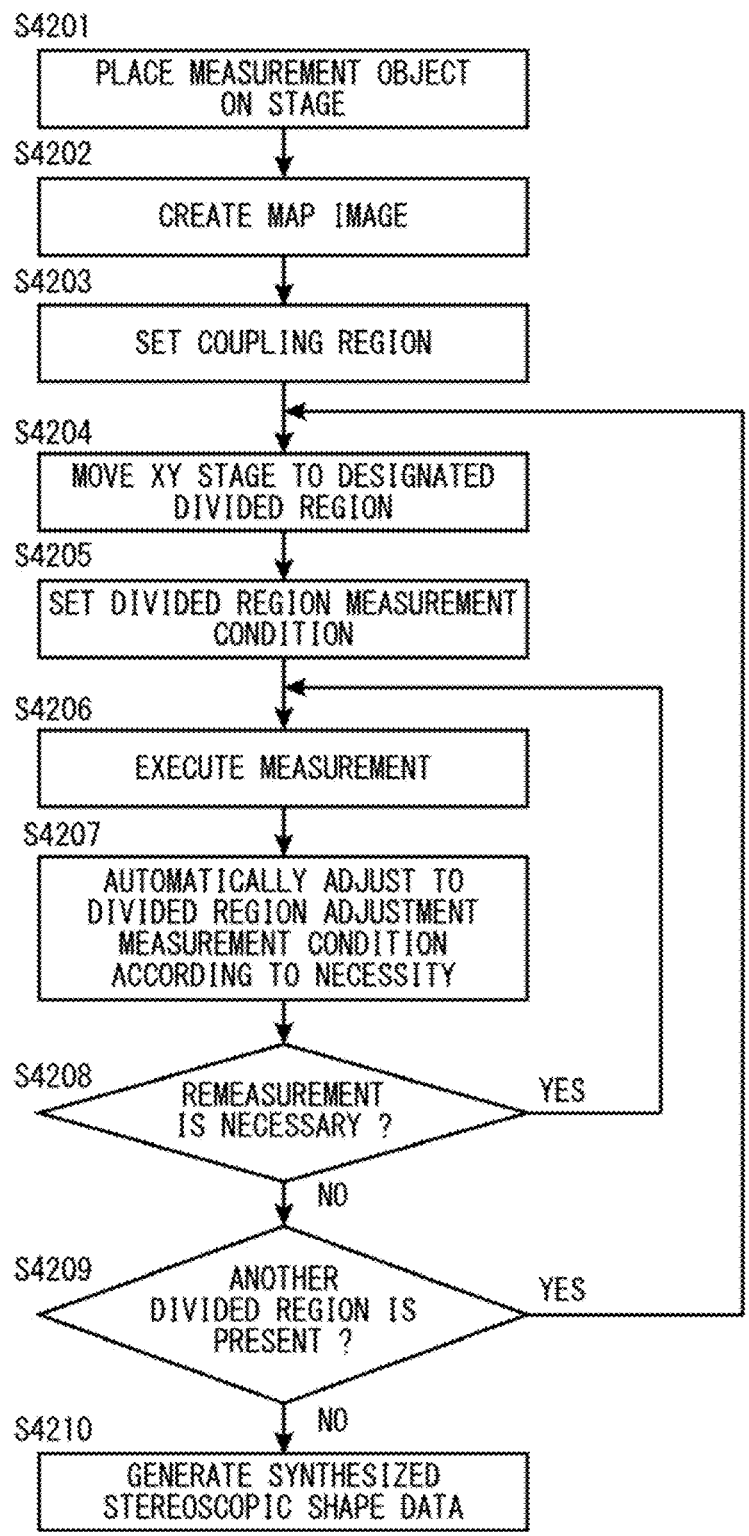
FIG. 42 is a flowchart showing a procedure for automatically adjusting partial region measurement setting and generating synthesized stereoscopic shape data.

On the other hand, in the generation of such a wide area synthesized height image, it is also possible to automatically adjust the partial region measurement setting for each of the partial regions. A procedure for generating such a wide area synthesized height image is explained with reference to a flowchart of FIG. 42. First, in step S4201, the user places the measurement object on the stage 140. Subsequently, in step S4202, the shape measuring device creates a map image. Further, in step S4203, the shape measuring device performs setting of a continuous region. The work in these steps is the same as the work in steps S3601 to S3606 in FIG. 36 explained above. Detailed explanation of the work is omitted.

In step S4204, the shape measuring device moves the XY stage to a predetermined partial region. The shape measuring device moves, with the plane-direction driving section, the XY stage to a partial region where stereoscopic shape data is generated first.

In step S4205, the shape measuring device sets measurement setting in the partial region. The shape measuring device sets an initial value of the measurement setting in the partial region where stereoscopic shape data is generated first. The initial setting value of the measurement setting may be designated on the shape measuring device side. The measurement-setting automatically adjusting section 217 may automatically analyze the measurement setting from an optical image of the partial region. Alternatively, the user may manually set the measurement setting.

In step S4206, the shape measuring device executes measurement. The shape measuring device generates stereoscopic shape data with the stereoscopic-shape-data generating section and photographs a texture image with the texture-image acquiring section 218.

In step S4207, the shape measuring device automatically adjusts the partial region measurement setting. The measurement-setting automatically adjusting section 217 changes the partial region measurement setting to changed measurement setting of the partial region according to necessity. In step S4208, the shape measuring device determines whether measurement needs to be performed again in the measurement setting of the partial region. When determining that the measurement needs to be performed again, the shape measuring device returns to step S4206 and generates stereoscopic shape data again. Re-photographing of a texture image is unnecessary. As the determination of the necessity of the remeasurement, the shape measuring device determines that the remeasurement is unnecessary, for example, when the measurement-setting automatically adjusting section 217 determines that the partial region measurement setting is appropriate and does not change the partial region measurement setting.

After the measurement is executed in this way, the shape measuring device proceeds to step S4209 and determines whether an unmeasured partial region is present. When an unmeasured partial region is present, the shape measuring device returns to step S4204 and performs movement to the unmeasured partial region and measurement of the unmeasured partial region in the same manner.

When the measurement of all of the partial regions ends, the shape measuring device proceeds to step S4210 and combines obtained stereoscopic shape data to create synthesized stereoscopic shape data.

In this way, it is possible to automatically adjust the partial region measurement setting, perform remeasurement to acquire stereoscopic shape data again according to necessity, and finally obtain wide area synthesized stereoscopic shape data at high quality.

Editing of XY-Coupled Measurement Setting

After the completion of the coupled measurement, the user can confirm a measurement result. For example, the user can cause the display section to display an obtained wide area synthesized height image and visually confirm whether a desired result is obtained. According to necessity, the user can change divided measurement setting and perform measurement again in the partial regions. In this case, the user can re-edit the partial region measurement setting.

The user regenerate a wide area synthesized height image using height images obtained by performing measurement again in only a part of the partial regions.

Further, by saving the measurement setting in the partial regions in the measurement-setting saving section 243, the user can reuse the measurement setting when executing an inspection. For example, when performing a non-defective product test for checking a difference between a measurement object and a reference measurement object, the user can consume a rather long time for work for setting measurement setting of the partial regions from the reference measurement object such that a correct result is obtained in a short time during the operation of the inspection. Consequently, it is possible to execute quick and highly accurate measurement during the inspection operation.

Continuous Measurement Mode

In this case, the stereoscopic-shape-data generating section can switch a normal measurement mode and a continuous measurement mode. The normal measurement mode is a measurement mode for changing, with the measurement-setting automatically adjusting section 217, the partial region measurement setting for each of the partial regions and generating stereoscopic shape data as explained above. On the other hand, the continuous measurement mode is a measurement mode for reading out, for each of the partial regions, the partial region measurement setting saved in advance in the measurement-setting saving section 243 and generating stereoscopic shape data. In other words, in the continuous measurement mode, it is possible to achieve a reduction in a processing time by reading out and using the saved partial region measurement setting without automatically adjusting the partial region measurement setting.

For example, it is assumed that measurement of a measurement object partially including protrusions on the surface shown in a side view of FIG. 43 is performed. The protrusions have different colors. The measurement object includes a semitransparent resin portion in a part of the surface. An example is explained below in which the partial regions A to D are set on such a measurement object. In this case, the partial region measurement setting of the partial regions is set and saved in advance as shown in FIG. 44. For example, colors of materials are different in the partial region A and the partial region B. Therefore, contrast of respective stripe patterns is easily represented by differentiating an exposure level (an exposure time and intensity of measurement light). Since sneaking light occurs in the partial region B, the measurement mode is set to the reflection/sneaking light removal mode (the fine mode). Further, in the partial region D, since the level difference is large, the Z-measurement range is enlarged to set the measurement mode to the depth expanded measurement mode. In this way, the measurement setting suitable for the partial regions is set and saved in advance and, in the continuous measurement mode for performing inspection of a large number of measurement objects, automatic adjustment of the measurement setting is omitted and the saved measurement setting is read out and used. Consequently, it is possible to perform highly accurate measurement and inspection while reducing a processing time.

Guiding Section

In the continuous measurement mode, the position and the posture of the measurement object need to be adjusted to be the same as a reference posture, which is a position and a posture at the time when the saved partial region measurement setting is set, when viewed from the imaging section. Therefore, the shape measuring device may include a guiding section that urges the user to dispose the measurement object in the same position and the same posture as the reference posture. The guiding section outputs, for example, on the display section, a guiding message for urging the user to dispose the measurement object in the same position and the same posture as the reference posture when the user places the measurement object on the stage 140.

Measurement-Object-Position-and-Posture Detecting Section

The shape measuring device may include a measurement-object-position-and-posture detecting section that detects the position and the posture of the measurement object placed on the stage 140. The measurement-object-positionand-posture detecting section may be configured to adjust, on the basis of the position and the posture of the measurement object during acquisition of the measurement setting of the partial regions saved in the measurement-setting saving section 243, by driving the plane-direction driving section, the position and the posture of the measurement object detected by the measurement-object-position-and-posture detecting section.

Positioning Jig

Alternatively, the position and the posture of the measurement object may be physically restricted using a positioning jig. The position and the posture of the measurement object placed on the stage 140 is matched, by the positioning jig, with the position and the posture of the measurement object during the acquisition of the measurement setting for the partial regions saved in the measurement-setting saving section 243.

Edge Extraction

In a state in which a three-dimensional image showing the measurement object is acquired, the user can extract desired edges by designating an edge extraction target region on a texture image (e.g., FIG. 58) or a height image (e.g., FIG. 59). The user can measure various geometrical dimensions such as length and an angle between edges and a radius of a circle by selecting, as a measurement element, a geometrical shape obtained on the basis of the extracted edges. In this specification, a portion where a gray value or height steeply changes is referred to as "edge point" and a geometrical shape calculated by fitting, with a publicly-known method such as a method of least squares, a geometrical shape such as a circle or a straight line with an extracted plurality of edge points is referred to as "edge".

Edge Extraction Using Texture Information

Figure 60:
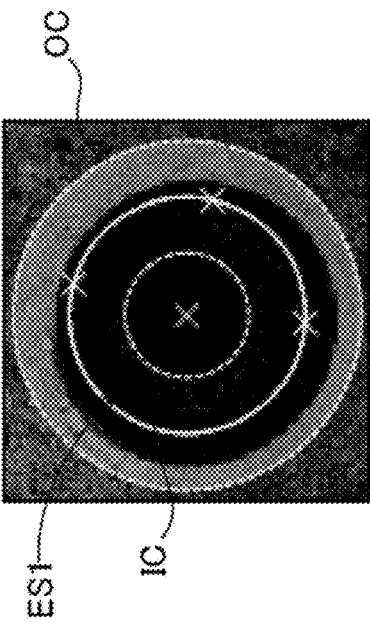
FIG. 60 is an image diagram showing an edge extraction screen.

An example in which edges are extracted using texture information is explained with reference to an edge extraction screen 640 shown in FIG. 60. In the edge extraction screen 640 shown in FIG. 60, as in FIG. 58 and the like, the image display region 410 where a texture image and the like are displayed is provided and the operation region 420 where various kinds of operation are performed is provided on the right side of the image display region 410. In the operation region 420, a method selection field 642 for selecting a method of performing edge extraction is provided in the operation region 420. The user selects "texture" from the method selection field 642, whereby edge extraction using texture is performed.

With the edge extraction using texture, edge points are extracted on the basis of gray values of pixels forming a texture image. Specifically, in an edge extracting direction of a designated edge extraction region, a plurality of edge points where the gray values steeply change are extracted. A geometrical shape is fit with the extracted plurality of edge points by an arithmetic operation such as the method of least squares to calculate edges. In the example shown in FIG. 60, an edge extraction region ES1 sandwiched by an inner circle IC and an outer circle OC is set by the user. A radially extending direction from the inner circle IC to the outer circle OC is an edge extraction direction.

Figure 61:
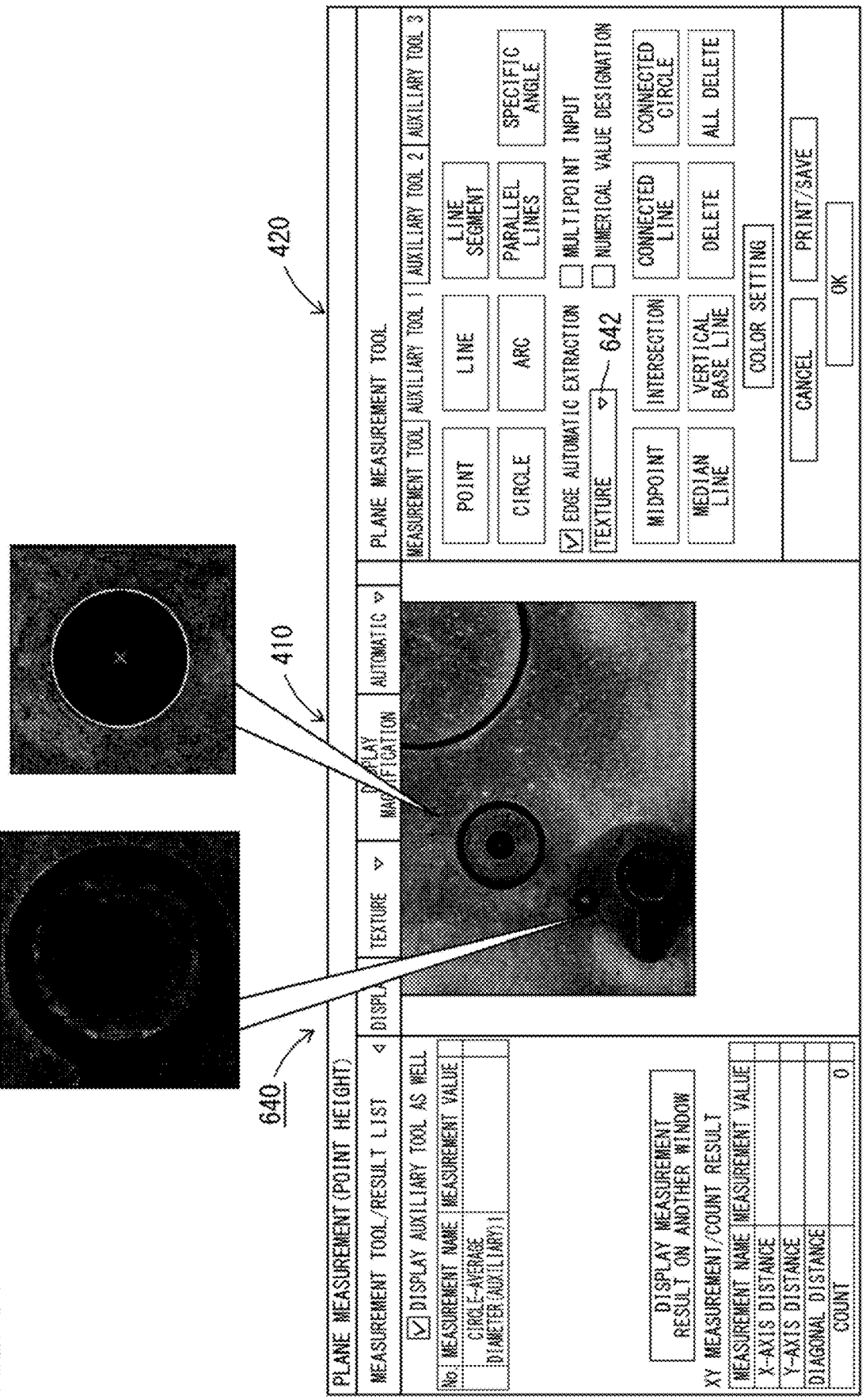
FIG. 61 is an image diagram showing a state in which extracted edges are displayed on a texture image shown in FIG. 60.

A state in which a circle is fit with the plurality of edge points extracted in this way is shown in FIG. 61. In the figure, the fit circle is displayed as an edge over the texture image displayed in the image display region 410. The user can select, as a measurement element set as a target of dimension measurement, the edge calculated in this way.

Edge Extraction Using Height Information

Figure 62:
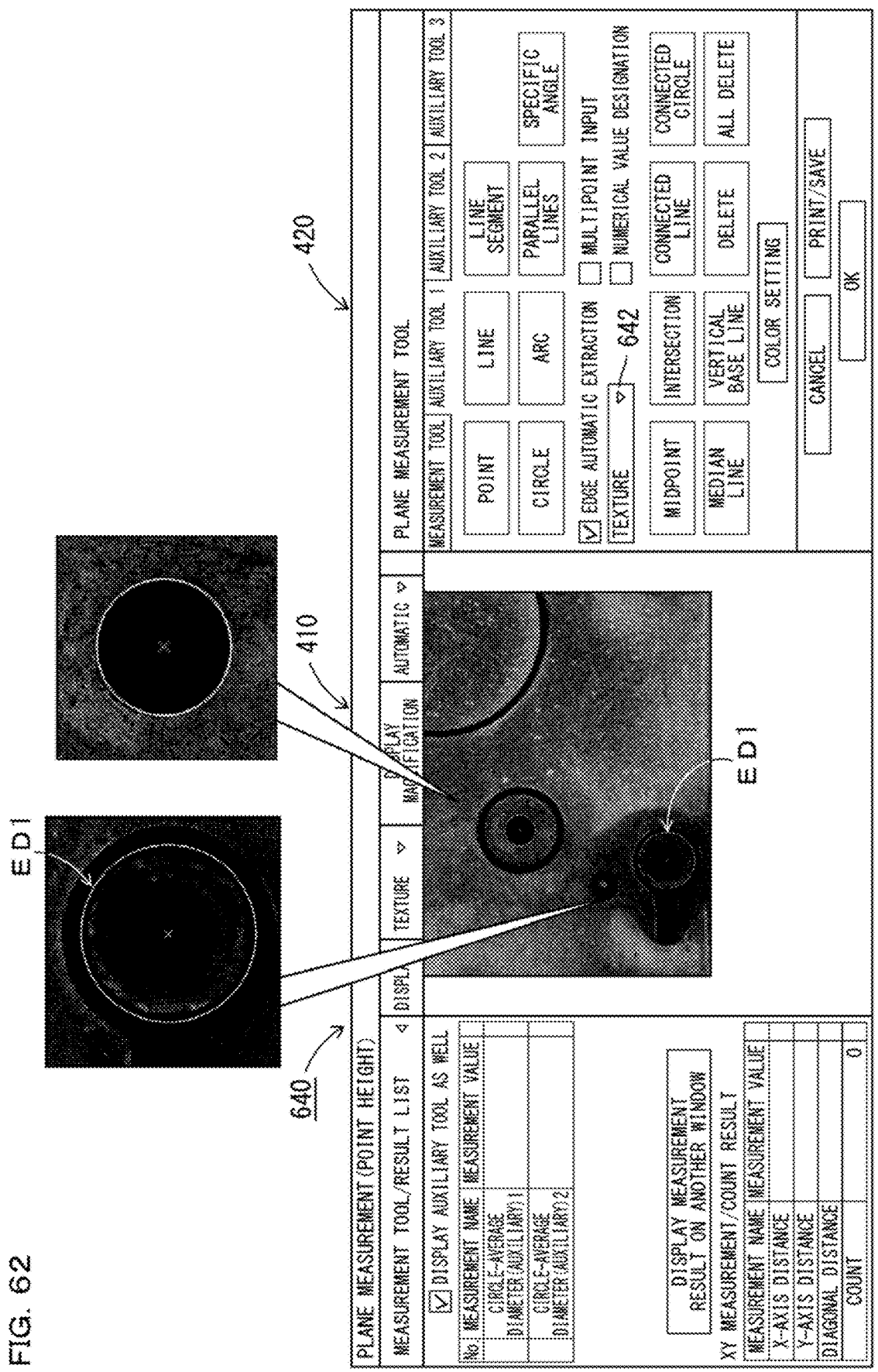
FIG. 62 is an image diagram showing an edge extraction screen.

A method of extracting edges using height information is explained with reference to the edge extraction screen 640 shown in FIG. 62. Like the edge extraction using texture information explained above, first, in FIG. 62, the user selects "height" as a method of edge extraction from the method selection field 642 provided in the operation region 420. In the edge extraction using height, points where height steeply changes is extracted as edge points. Processing after the edge points are extracted is the same as the edge extraction using texture. In an example shown in FIG. 62, an edge ED1 of a column, the height of which steeply changes, is extracted using height information.

The edge extraction using texture information and the edge extraction using height information are respectively effective for edge extraction of a part where a gray value steeply changes and edge extraction of a part where height steeply changes. However, when an edge extraction region is set in a part where height gently changes, fluctuation occurs in extracted edge points and the fitting of the geometrical shape becomes unstable. Therefore, in this embodiment, it is possible to perform edge extraction using a profile of height. A procedure for performing extraction of an edge using the height profile is explained with reference to an edge extraction screen 650 shown in FIG. 63.

Edge Extraction Using a Height Profile

Figure 63:
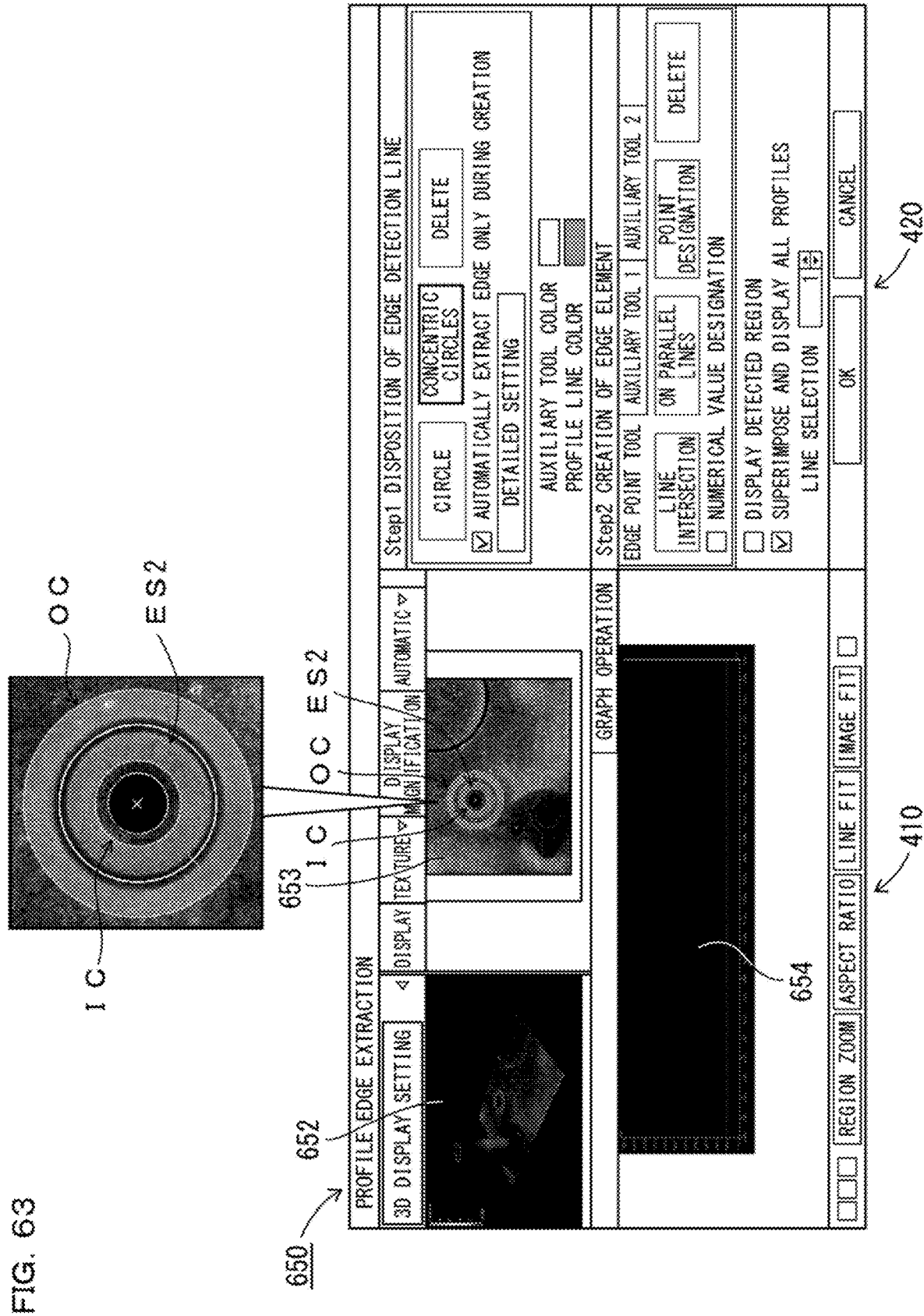
FIG. 63 is an image diagram showing the edge extraction screen.

In the edge extraction screen 650 shown in FIG. 63, as in FIG. 58 and the like, the image display region 410 where an image and the like are displayed and the operation region 420 where various kinds of operation are performed are provided. In an example shown in FIG. 63, a three-dimensional image display region 652 where a three-dimensional image is displayed, a texture image display region 653 where a texture image is displayed, and a height profile display region 654 where a height profile is displayed are simultaneously displayed in the operation region 420.

Figure 64:
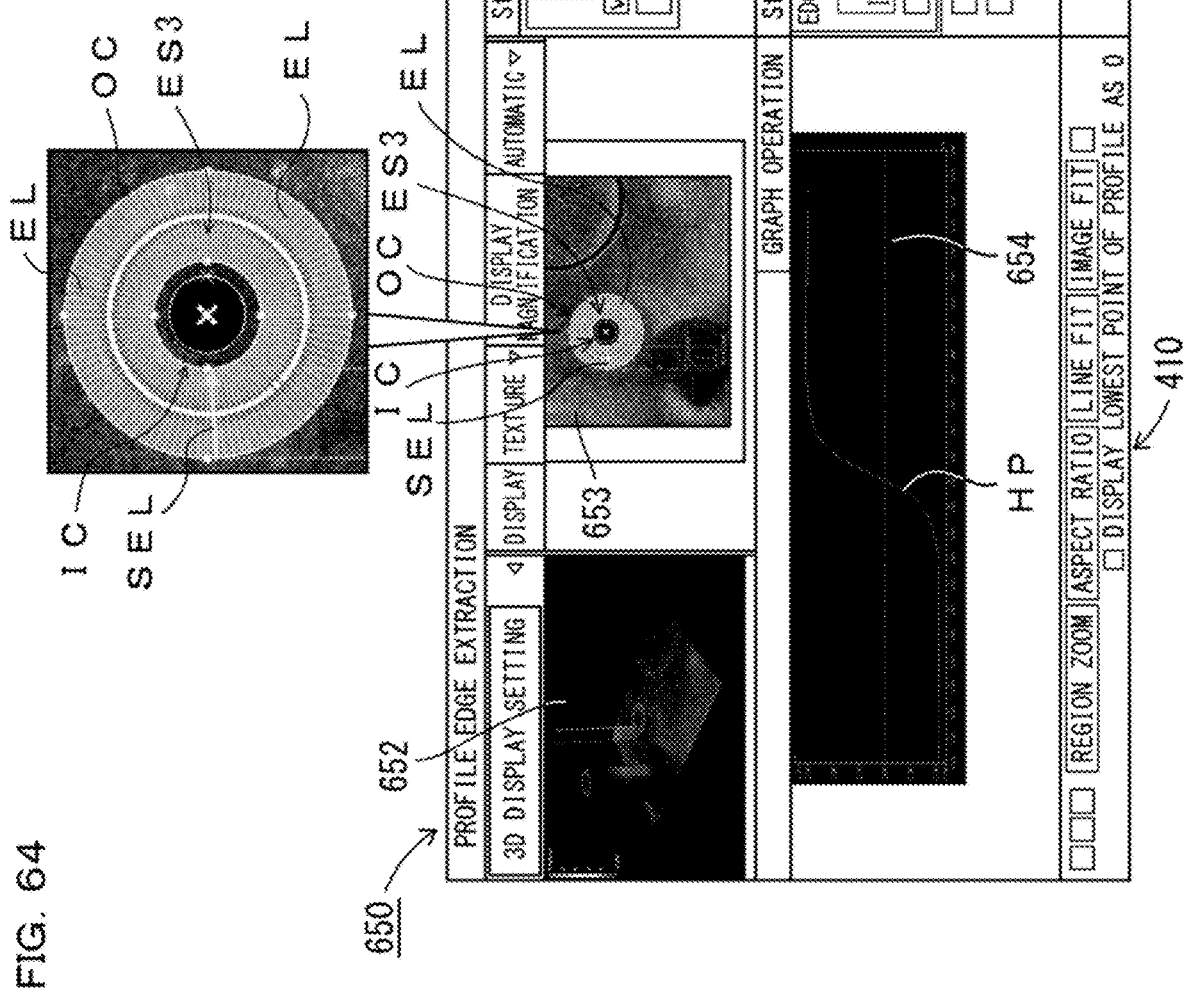
FIG. 64 is an image diagram showing the edge extraction screen.

In the example shown in FIG. 63, a state is shown in which the inner circle IC and the outer circle OC are designated as an edge extraction region ES2 in the texture image display region 653. Edges, the height of which gently changes, are present between the inner circle IC and the outer circle OC of the edge extraction region ES2. In an example shown in FIG. 64, in the edge extraction region ES2, edge extraction lines EL set in in a direction from the outer circle OC to the inner circle IC are displayed over the texture image display region 653. As shown in FIG. 64, a state can be confirmed in which a plurality of edge extraction lines EL are set in the direction from the outer circle OC to the inner circle IC in an edge extraction region ES3. In this state, a height profile HP corresponding to one edge extraction line SEL among the plurality of edge extraction lines EL is displayed in the height profile display region 654. It is easy to distinguish a currently selected edge extraction line SEL by highlighting the edge extraction line SEL in the texture image display region 653. In the example shown in FIG. 64, the currently selected edge extraction line SEL is displayed as a thick line. The user can change the height profile HP displayed in the height profile display region 654 to any height profile by selecting any one of the edge extraction lines EL displayed in the texture image display region 653.

Figure 65:
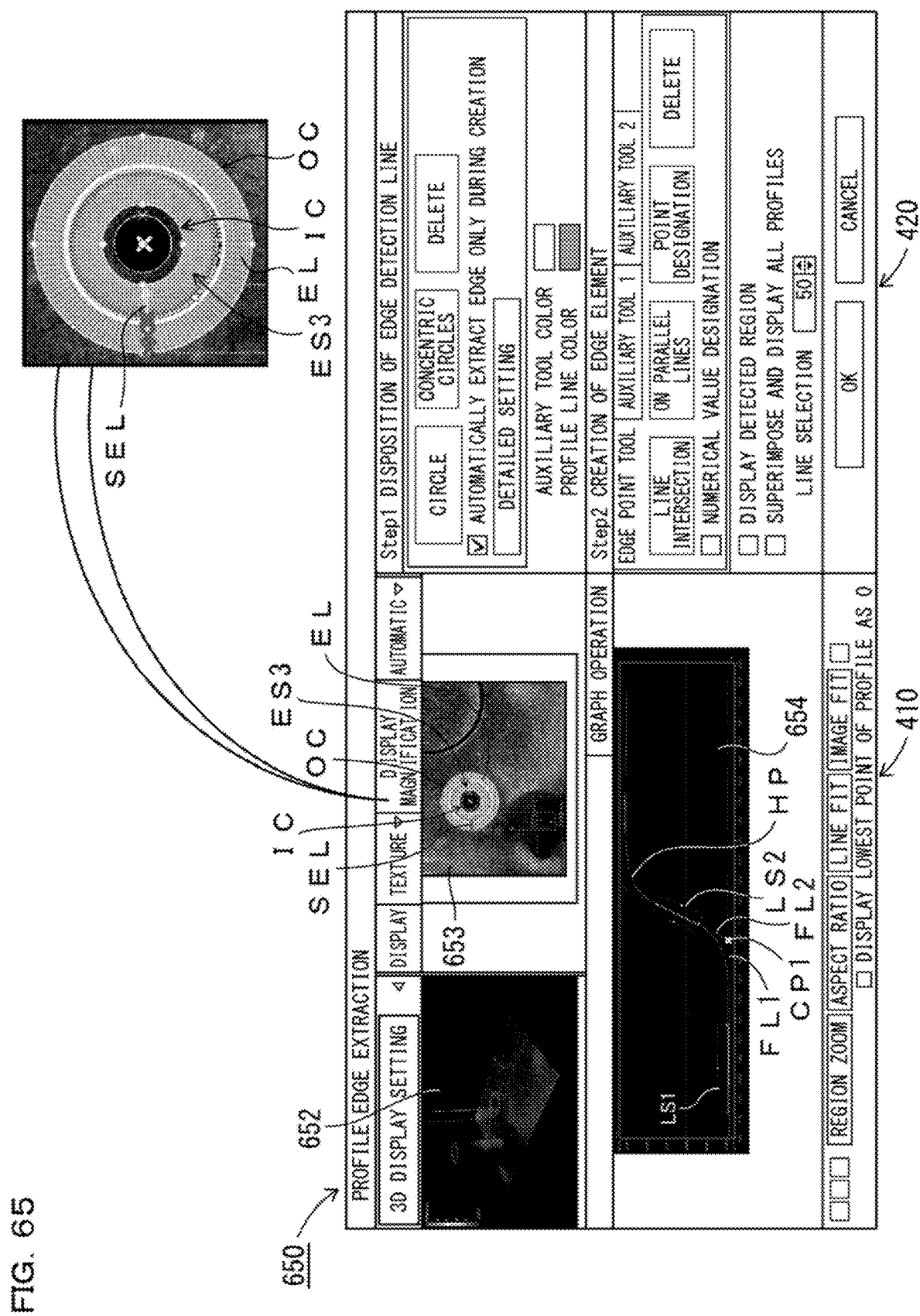
FIG. 65 is an image diagram showing the edge extraction screen.

In this way, the user can define extraction rules for edge points on the basis of the height profile HP displayed in the height profile display region 654. In an example shown in FIG. 65, linear element extraction ranges LS1 and LS2 are respectively set in a bottom surface section and an inclined section of a measurement object. Straight lines are respectively fit with height profiles HP in the set element extraction ranges LS1 and LS2 to calculate two fitting straight lines FL1 and FL2. Further, an intersection CP1 of the calculated two fitting straight lines FL1 and FL2 is defined as an edge point.

Such extraction of edge points is also applied to other height profiles not displayed in the height profile display region 654. A plurality of edge points arranged in a substantially circular shape are extracted. A circle can be fit with the extracted plurality of edge points.

The procedure of edge extraction explained above is an example. The user can designate any element as an extraction element on a height profile. For example, the user may designate linear element extraction ranges respectively in a bottom surface section and an upper surface section of the measurement object and extract, as an edge point, a point where a median line of two straight lines and the height profile intersect. Alternatively, the user may designate an element extraction range formed by straight lines only in the bottom surface section of the measurement object, generate an imaginary line offset by height set by the user upward from an extracted straight line, and extract, as an edge point, a point where the imaginary line and the height profile intersect.

In this way, in this embodiment, the user can define the extraction rules for edge points by combining extraction elements on the height profile. Therefore, even when a part where height or a gray value steeply changes is absent, it is possible to stably extract edge points desired by the user.

Height Profile Superimposed Display

Figure 66:
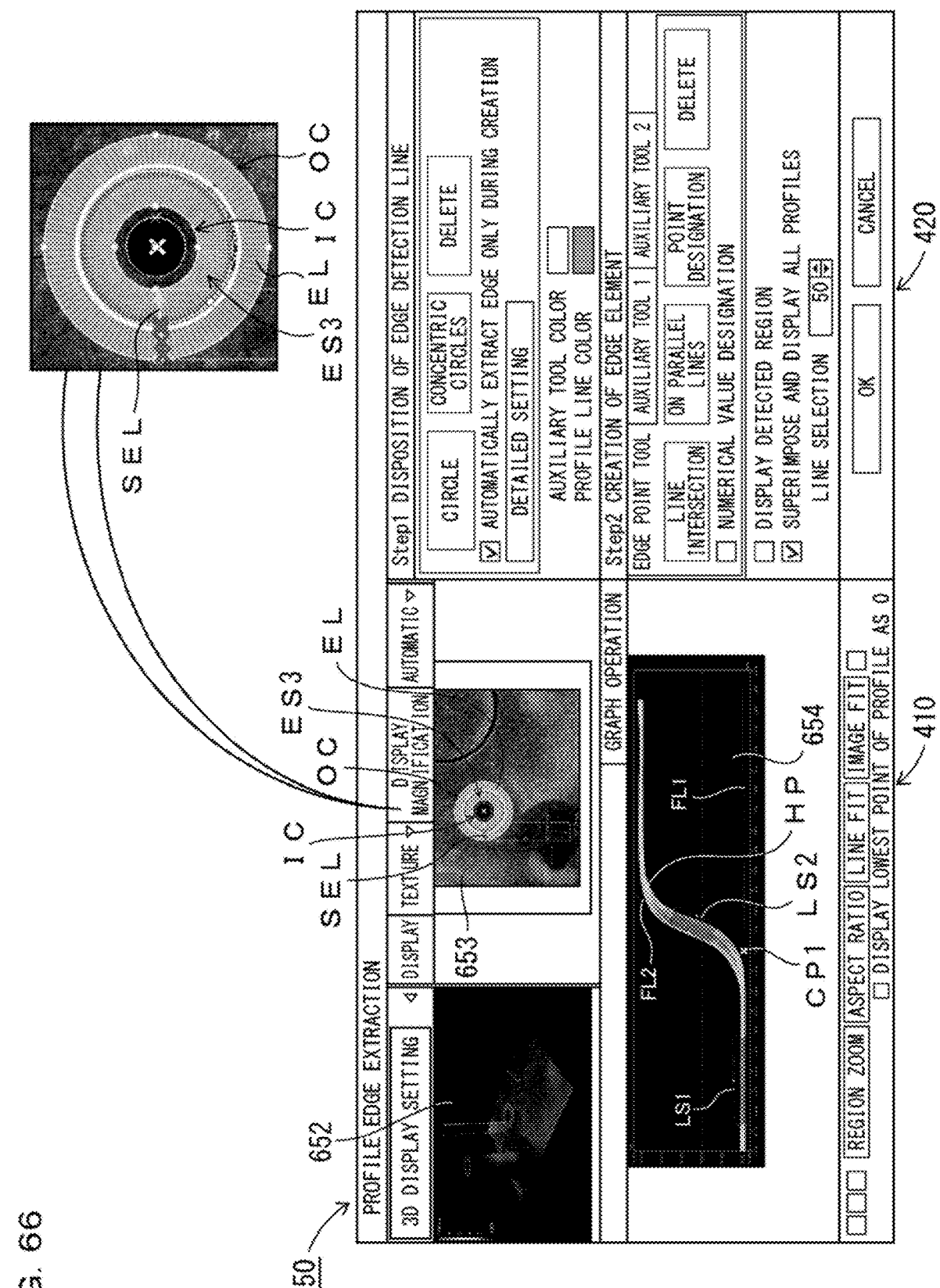
FIG. 66 is an image diagram showing the edge extraction screen.

Concerning all edge extraction lines in the set edge extraction region, height profiles can be superimposed and displayed in the height profile display region 654. Such an example is shown in FIG. 66. In this example, all of the height profiles are fit in a frame indicating the element extraction range LS1 in the bottom surface section of the measurement object. However, since there is fluctuation in the height of an inclined surface section, a part of the height profiles is not fit in a frame indicating the element extraction range LS2 of the inclined surface section. In this case, edge points are not extracted from the height profiles not included in the element extraction range LS2. A circle is fit on the basis of only extracted edge points. In this way, it is possible to prevent fluctuation in extracted edge points by not using, for extraction of edge points, height profiles having height fluctuation not included in the element extraction range.

Figure 67:
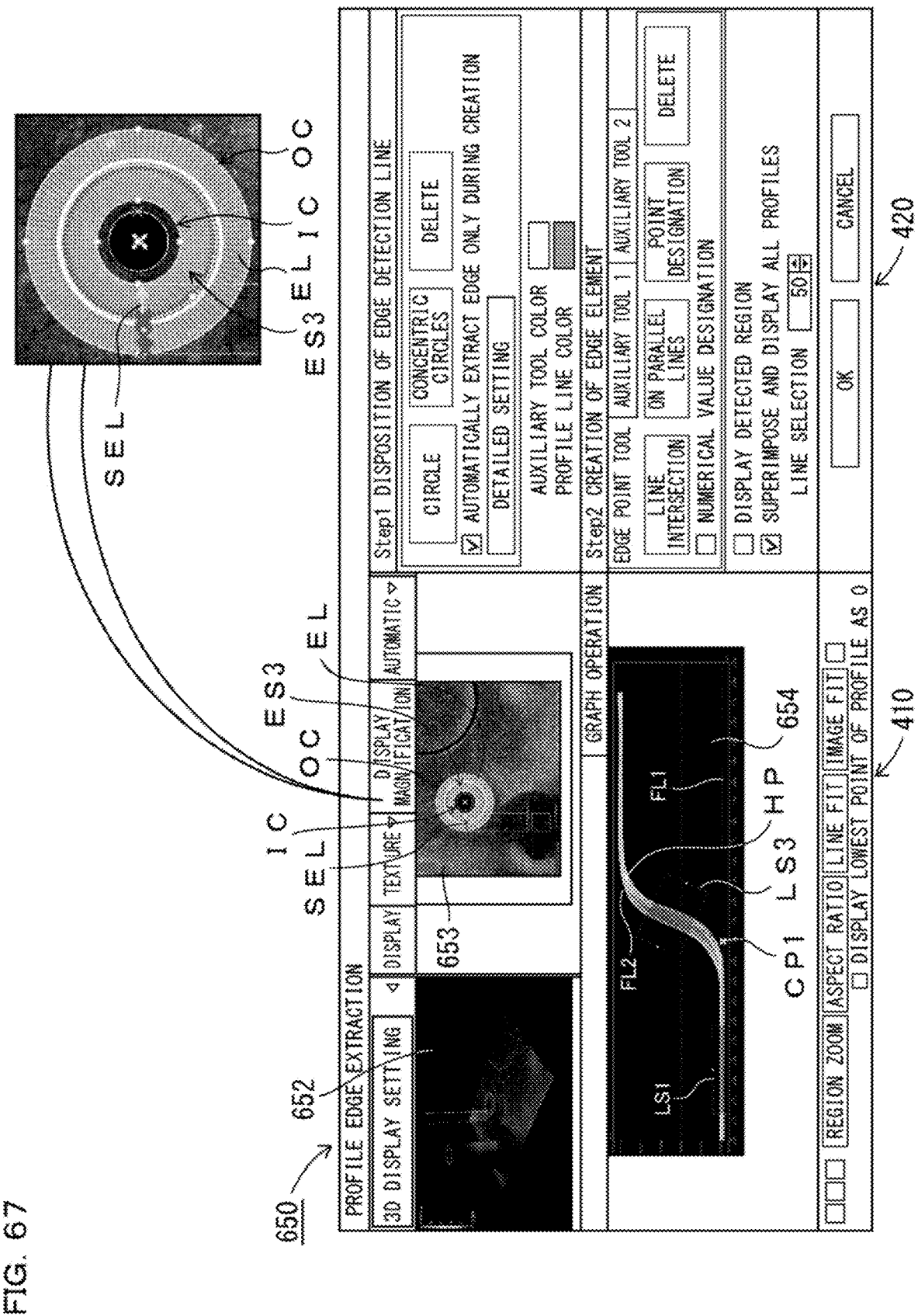
FIG. 67 is an image diagram showing the edge extraction screen.

Further, the element extraction range can be changed by the user. For example, a state in which the width of the element extraction range LS3 is changed to include all of the height profiles in the inclined surface section in the example shown in FIG. 66 is shown in FIG. 67. In this case, the extraction of edge points is performed on the basis of a larger number of height profiles.

The extraction rules for edge points can be changed as appropriate. For example, when at least a part of the height profiles is included in the element extraction range, the height profiles can be set to be used for the extraction of edge points. On the other hand, when elements such as straight lines are extracted and edge points are extracted from a small number of height profiles and edge points, it is also likely that fitting accuracy is deteriorated. Therefore, only when height profiles equal to or longer than a predetermined length are included in the element extraction range, the height profiles may be used for the extraction of edge points.

Edge points greatly deviating from a fit geometrical shape such as a circle may be excluded as outliers. In this case, it is possible to improve edge extraction accuracy of edges by fitting the geometrical shape again on the basis of edge points excluding the edge points excluded as the outliers.

Further, an edge extraction result of the edges extracted in this way may be confirmed in the texture image display region. For example, the extracted edges, the edge points on the edges, the edge points excluded as the outliers, and the edge extraction line on which edge points are not extracted can be displayed in the texture image display region in a distinguishable state from one another.

Furthermore, the positions of the edge extraction elements on the texture image or the height image and the extraction rules for edge points defined by the user on the height profile can also be saved as a setting file. Consequently, it is possible to repeatedly execute edge extraction in the same part of the measurement object by placing the measurement object on the stage in the same position and the same posture or detecting the position and the posture of the measurement object with a well-known search method.

The shape measuring device, the shape measuring method, the shape measuring program, and the computer-readable recording medium and the device having recorded therein the shape measuring program of the present invention can be suitably used in a microscope, a measuring instrument, an inspection device, and a digitizer that make use of the principle of triangulation.

What is claimed is:

1. A shape measuring device comprising:
   a stage on which a measurement object is placed;
   a light projecting section configured to irradiate pattern light on the measurement object placed on the stage;
   a light receiving section configured to receive the pattern light irradiated from the light projecting section and reflected from the measurement object and output light reception data;
   an optical-axis-direction driving section configured to relatively move the stage in an optical axis direction with respect to the light receiving section to thereby adjust a focal position of the light receiving section;
   a stage-plane-direction driving section configured to relatively move the stage in a stage plane direction orthogonal to an optical axis direction of the light receiving section;
   a measurement setting section for setting measurement setting including light projection setting for the pattern light of the light projecting section and light reception setting of the light receiving section;
   a coupled-region setting section configured to set, as a region where a relative position of the stage in the stage plane direction is moved by the stage-plane-direction driving section, a coupled region formed by a plurality of partial regions; and
   a control section configured to execute:
      stereoscopic-shape-data generation processing for generating, in the partial regions set by the coupled-region setting section, according to the measurement setting set by the measurement setting section, on the basis of the light reception data output by the light receiving section, stereoscopic shape data indicating a shape of the measurement object with a pattern projection method;
      measurement-setting adjustment processing for automatically adjusting the measurement setting for the partial regions on the basis of at least one of stereoscopic shape data of the partial regions and the light reception data acquired in the partial regions when the stereoscopic shape data is generated; and
      stereoscopic-shape-data coupling processing for coupling, according to the measurement setting for the partial regions adjusted by the measurement-setting adjustment processing, the stereoscopic shape data of the partial regions generated again by the stereoscopic-shape-data generation processing and generating coupled stereoscopic shape data corresponding to the coupled region.

2. The shape measuring device according to claim 1, wherein the control section includes, as the measurement setting for the partial regions, at least one of a measurement mode in generating the stereoscopic shape data of the measurement object in the stereoscopic-shape-data generation processing, illumination intensity of the light projecting section, an exposure time of the light receiving section, and adjustment of the focal position of the light receiving section.

3. The shape measuring device according to claim 1, wherein, when detecting at least one of sneaking and multiple reflection of the pattern light from missing data included in the stereoscopic shape data or the light reception data, the control section selects a measurement mode corresponding to the pattern light sneaking or multiple reflection to make it possible to adjust the measurement setting for the partial regions.

4. The shape measuring device according to claim 1, wherein, on the basis of presence or absence of a signal component in a change of a luminance value of a pixel forming the light reception data, the control section determines that the sneaking of the pattern light occurs when a fixed signal component is confirmed and determines that a void is present when the fixed signal component is not confirmed, detects one of sneaking and multiple reflection of light on the basis of a result of the determination, and selects a measurement mode corresponding to the sneaking or the multiple reflection of the light to make it possible to adjust the measurement setting for the partial regions.

5. The shape measuring device according to claim 1, wherein the control section performs adjustment of an exposure time on the basis of the light reception data to make it possible to adjust the measurement setting for the partial regions.

6. The shape measuring device according to claim 1, wherein the control section shifts the focal position on the basis of at least one of the light reception data and the stereoscopic shape data to make it possible to adjust the measurement setting for the partial regions.

7. The shape measuring device according to claim 1, wherein the control section expands a depth measurement range, which is a height range in which the pattern light can be irradiated from the light projecting section, to make it possible to adjust the measurement setting for the partial regions.

8. The shape measuring device according to claim 1, wherein
the light projecting section includes:
a first light projecting section configured to irradiate, from a first direction, first pattern light on the measurement object placed on the stage; and
a second light projecting section configured to irradiate, from a second direction, second pattern light on the measurement object placed on the stage,
the light receiving section receives the first pattern light irradiated from the first light projecting section and reflected from the measurement object and outputs first light reception data and receives the second pattern light irradiated from the second light projecting section and reflected from the measurement object and outputs second light reception data, the stereoscopic-shape-data generating processing generates first direction stereoscopic shape data of the measurement object on the basis of the first light reception data received by the light receiving section and generates second direction stereoscopic shape data of the measurement object on the basis of the second light reception data received by the light receiving section, and
the control section selects one or both of the first light projecting section and the second light projecting section on the basis of the light reception data to make it possible to adjust the measurement setting for the partial regions.

9. The shape measuring device according to claim 1, further comprising a measurement-setting saving section for saving the measurement setting for the partial regions adjusted by the control section, wherein
the control section couples, according to the measurement setting for the partial regions saved in the measurement-setting saving section, the stereoscopic shape data of the partial regions generated again by the stereoscopic-shape-data generation processing and generates the coupled stereoscopic shape data corresponding to the coupled region.

10. The shape measuring device according to claim 9, further comprising a measurement-mode selecting section for selecting, as a measurement mode in generating the stereoscopic shape data of the measurement object in the stereoscopic-shape-data generation processing, any one of a normal mode, a fine mode for performing finer measurement than the normal mode, and a halation removal mode for removing halation from the light reception data.

11. The shape measuring device according to claim 9, wherein the stereoscopic-shape-data generating section is capable of switching a normal measurement mode for changing partial region measurement setting for each of the partial regions with the control section and generating the stereoscopic shape data and a continuous measurement mode for reading out, for each of the partial regions, the partial region measurement setting saved in the measurement-setting saving section in advance and generating the stereoscopic shape data.

12. The shape measuring device according to claim 9, further comprising a guiding section configured to output a guiding message to dispose the measurement object on the stage in a same position and a same posture as a reference posture, which is a position and a posture of the measurement object during the acquisition of the measurement setting for the partial regions saved in the measurement-setting saving section.

13. The shape measuring device according to claim 9, further comprising a measurement-object-position-and-posture detecting section configured to detect a position and a posture of the measurement object placed on the stage, wherein
the shape measuring device drives the stage-plane-direction driving section to adjust, on the basis of a position and a posture of the measurement object during the acquisition of the measurement setting for the partial regions saved in the measurement-setting saving section, the position and the posture of the measurement object detected by the measurement-target-position-and-posture detecting section.

14. The shape measuring device according to claim 9, further comprising a positioning jig for matching a position and a posture of the measurement object placed on the stage with a position and a posture of the measurement object during the acquisition of the measurement setting for the partial regions saved in the measurement-setting saving section.

15. The shape measuring device according to claim 1, further comprising a texture-image acquiring section for acquiring a texture image, which is a two-dimensional optical image, having texture information of the measurement object placed on the stage, wherein
at least a part of texture image capturing conditions in capturing a plurality of texture images with the texture-image acquiring section is common to the partial regions.

16. The shape measuring device according to claim 15, wherein
as one of the texture image capturing conditions in capturing a plurality of texture images with the texture-image acquiring section, an exposure time is common to the partial regions, and
as one kind of the partial region measurement setting in generating a plurality of stereoscopic shape data with the stereoscopic-shape-data generation processing, the exposure time is adjustable by the control section.

17. The shape measuring device according to claim 15, wherein the optical-axis-direction driving section independently adjusts relative positions in an optical axis direction of the stage in capturing a plurality of texture images with the texture-image acquiring section and relative positions in the optical axis direction of the stage in generating a plurality of stereoscopic shape data with the stereoscopic-shape-data generation processing.

18. The shape measuring device according to claim 1, further comprising:
a determination processing section configured to determine, on the basis of the stereoscopic shape data acquired by the stereoscopic-shape-data generating section, according to predetermined determination conditions, whether an unmeasured region not having height information is present in the depth measurement range;
a focal-position changing section configured to control the optical-axis-direction driving section to change the focal position of the light receiving section when it is determined by un-measurement determination processing by the determination processing section that the unmeasured region is present; and
a synthesis processing section configured to generate a synthesized stereoscopic shape data obtained by combining a plurality of stereoscopic shape data generated by automatically repeating stereoscopic-shape-data acquisition processing by the stereoscopic-shape-data generating section, the un-measurement determination processing by the determination processing section, and focal-position changing processing by the focal-position changing section until it is determined by the un-measurement determination processing by the determination processing section that an unmeasured region is absent or a predetermined end condition is satisfied.

19. A shape measuring device comprising:
a stage on which a measurement object is placed;
a light projecting section configured to irradiate pattern light on the measurement object placed on the stage;
a light receiving section configured to receive the pattern light irradiated from the light projecting section and reflected from the measurement object and output light reception data;
an optical-axis-direction driving section configured to relatively move the stage in an optical axis direction with respect to the light receiving section to thereby adjust a focal position of the light receiving section;
a stage-plane-direction driving section configured to relatively move the stage in a stage plane direction orthogonal to an optical axis direction of the light receiving section;
a coupled-region setting section configured to set, as a region where a relative position of the stage in the stage plane direction is moved by the stage-plane-direction driving section, a coupled region formed by a plurality of partial regions;
a stereoscopic-shape-data generating section configured to generate, in the partial regions set by the coupled-region setting section, according to the measurement setting set by the measurement setting section, on the basis of the light reception data output by the light receiving section, stereoscopic shape data indicating a shape of the measurement object with a pattern projection method;
a measurement setting section for setting, as partial region measurement setting, for each of the partial regions, measurement setting including light projection setting for the pattern light of the light projecting section and light reception setting for a pattern image of the light receiving section;
a measurement-setting saving section for saving, in association with the partial regions, partial region measurement setting for the partial regions set by the measurement setting section; and
a stereoscopic-shape-data coupling section configured to couple, according to the measurement setting for the partial regions saved in the measurement-setting saving section, the stereoscopic shape data of the partial regions generated again by the stereoscopic-shape-data generating section and generate coupled stereoscopic shape data corresponding to the coupled region.

20. A shape measuring method for performing measurement of a shape of a measurement object, the shape measuring method comprising:
dividing an image showing a measurement object placed on a stage into a plurality of partial regions and relatively moving the stage with a stage-plane-direction driving section in a stage plane direction orthogonal to an optical axis direction of a light receiving section to a first region, which is one of the plurality of divided partial regions;
projecting pattern light on the measurement object from a light projecting section according to first region measurement setting, which is measurement setting including light projection setting for the pattern light of the light projecting section and light reception setting of the light receiving section in the first region, receiving the pattern light reflected from the measurement object with the light receiving section and acquiring first light reception data, and generating, on the basis of the first light reception data, with a stereoscopic-shape-data generating section, first stereoscopic shape data indicating a shape of the first region with a pattern projection method;
saving the first stereoscopic shape data or the first light reception data in a storing section in association with the first region and automatically adjusting, with a measurement-setting automatically adjusting section, the first region measurement setting to optimized first region adjusted measurement setting on the basis of the first stereoscopic shape data or the first light reception data;

relatively moving the stage with a stage-plane-direction driving section to a second region, which is another one of the partial regions;

projecting the pattern light on the measurement object from the light projecting section according to second region measurement setting, which is measurement setting including light projection setting for the pattern light of the light projecting section and light reception setting of the light receiving section in the second region, receiving the pattern light reflected from the measurement object with the light receiving section and acquiring second light reception data, and generating, on the basis of the second light reception data, with the stereoscopic-shape-data generation processing, second stereoscopic shape data indicating a shape of the second region with the pattern projection method;

saving the second stereoscopic shape data or the second light reception data in the storing section in association with the second region and automatically adjusting, with a control section, the second region measurement setting to optimized second region adjusted measurement setting on the basis of the second stereoscopic shape data or the second light reception data; and coupling, according to a positional relation among the partial regions, a plurality of stereoscopic shape data including the first stereoscopic shape data and the second stereoscopic shape data saved in the storing section and generating, with a stereoscopic-shape-data coupling section, coupled stereoscopic shape data corresponding to the coupled region.

* * * * *